(12) United States Patent
Kimura et al.

(10) Patent No.: US 11,785,321 B2
(45) Date of Patent: Oct. 10, 2023

(54) IMAGING DEVICE

(71) Applicant: SONY SEMICONDUCTOR SOLUTIONS CORPORATION, Kanagawa (JP)

(72) Inventors: Katsuji Kimura, Kanagawa (JP); Hirokazu Seki, Kanagawa (JP); Yuki Urano, Kanagawa (JP); Rei Takamori, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/287,671

(22) PCT Filed: Oct. 7, 2019

(86) PCT No.: PCT/JP2019/039444
§ 371 (c)(1),
(2) Date: Apr. 22, 2021

(87) PCT Pub. No.: WO2020/090355
PCT Pub. Date: May 7, 2020

(65) Prior Publication Data
US 2021/0400176 A1 Dec. 23, 2021

(30) Foreign Application Priority Data
Oct. 29, 2018 (JP) .................. 2018-203249

(51) Int. Cl.
H04N 23/55 (2023.01)
G02B 7/28 (2021.01)
(Continued)

(52) U.S. Cl.
CPC ............... *H04N 23/55* (2023.01); *G02B 7/28* (2013.01); *H04N 23/54* (2023.01); *H04N 23/68* (2023.01)

(58) Field of Classification Search
CPC .... H04N 5/23248; G02B 7/04; G01D 5/2006; G01D 5/2013
See application file for complete search history.

(56) References Cited

U.S. PATENT DOCUMENTS 6,085,024 A 7/2000 Kakiuchi et al.
2005/0195287 A1 9/2005 Uenaka
(Continued)

FOREIGN PATENT DOCUMENTS

CN 108061509 A 5/2018
FR 2661582 A1 10/1991
(Continued)

OTHER PUBLICATIONS

International Search Report and Written Opinion of PCT Application No. PCT/JP2019/039444, dated Dec. 3, 2019, 09 pages of ISRWO.

Primary Examiner — Noam Reisner
(74) Attorney, Agent, or Firm — CHIP LAW GROUP

(57) ABSTRACT

Provided is an imaging device that includes a first coil that moves a lens that collects light from a subject, in an optical axis direction of the light in accordance with a first magnetic field and that moves together with the lens, a second coil for moving the lens in a direction perpendicular to the optical axis in accordance with a second magnetic field, and a third coil for detecting the first magnetic field. The second coil and the third coil are arranged on a same substrate.

11 Claims, 32 Drawing Sheets

(51) Int. Cl.
*H04N 23/54* (2023.01)
*H04N 23/68* (2023.01)

(56) References Cited

U.S. PATENT DOCUMENTS

| | | |
|---|---|---|
| 2005/0244152 A1 | 11/2005 | Seo |
| 2015/0365568 A1* | 12/2015 | Topliss .................. G02B 7/08 |
| | | 348/360 |
| 2017/0118408 A1* | 4/2017 | Gregory ............... G02B 27/646 |
| 2018/0128649 A1 | 5/2018 | Terajima |
| 2019/0162562 A1* | 5/2019 | Min ........................ G03B 3/10 |

FOREIGN PATENT DOCUMENTS

| | | | |
|---|---|---|---|
| GB | 2245406 | A | 1/1992 |
| JP | 4-006973 | A | 1/1992 |
| JP | 04-006974 | A | 1/1992 |
| JP | 2000-295832 | A | 10/2000 |
| JP | 2005-292795 | A | 10/2005 |
| JP | 2005-316222 | A | 11/2005 |
| JP | 2006-178362 | A | 7/2006 |
| JP | 2011-022563 | A | 2/2011 |
| JP | 2018-077223 | A | 5/2018 |

\* cited by examiner

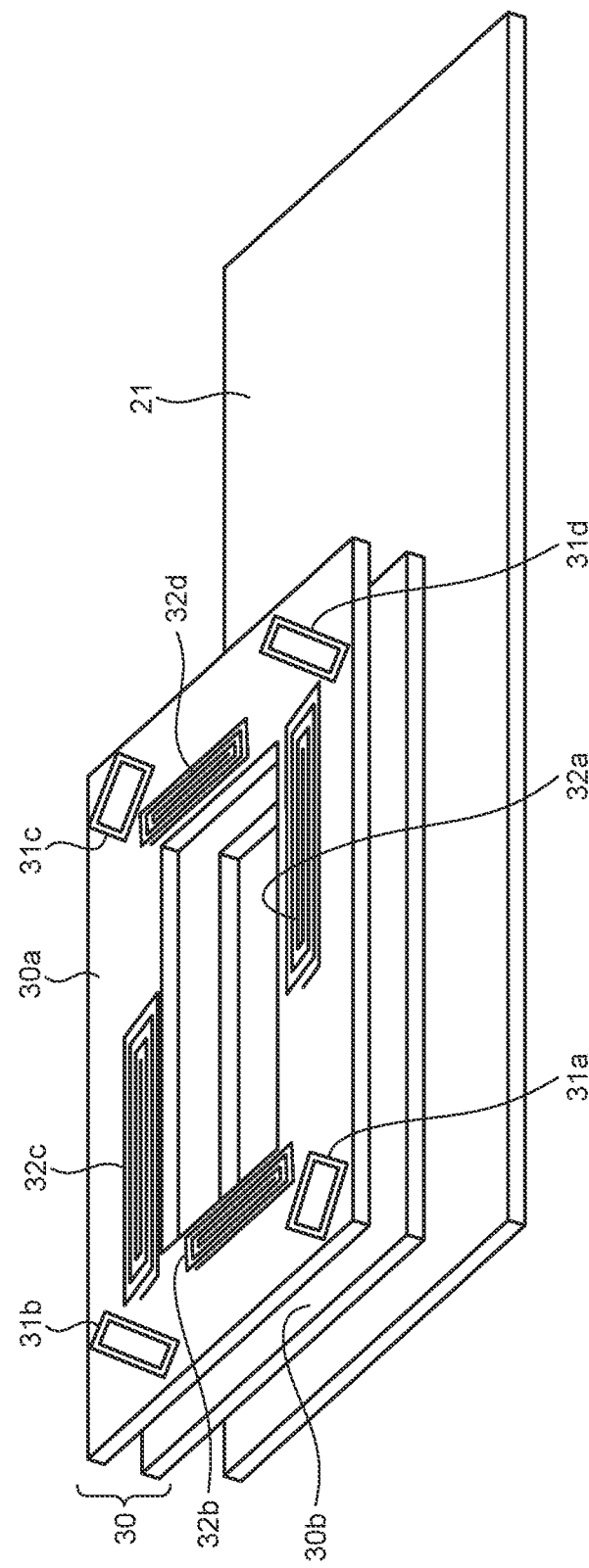

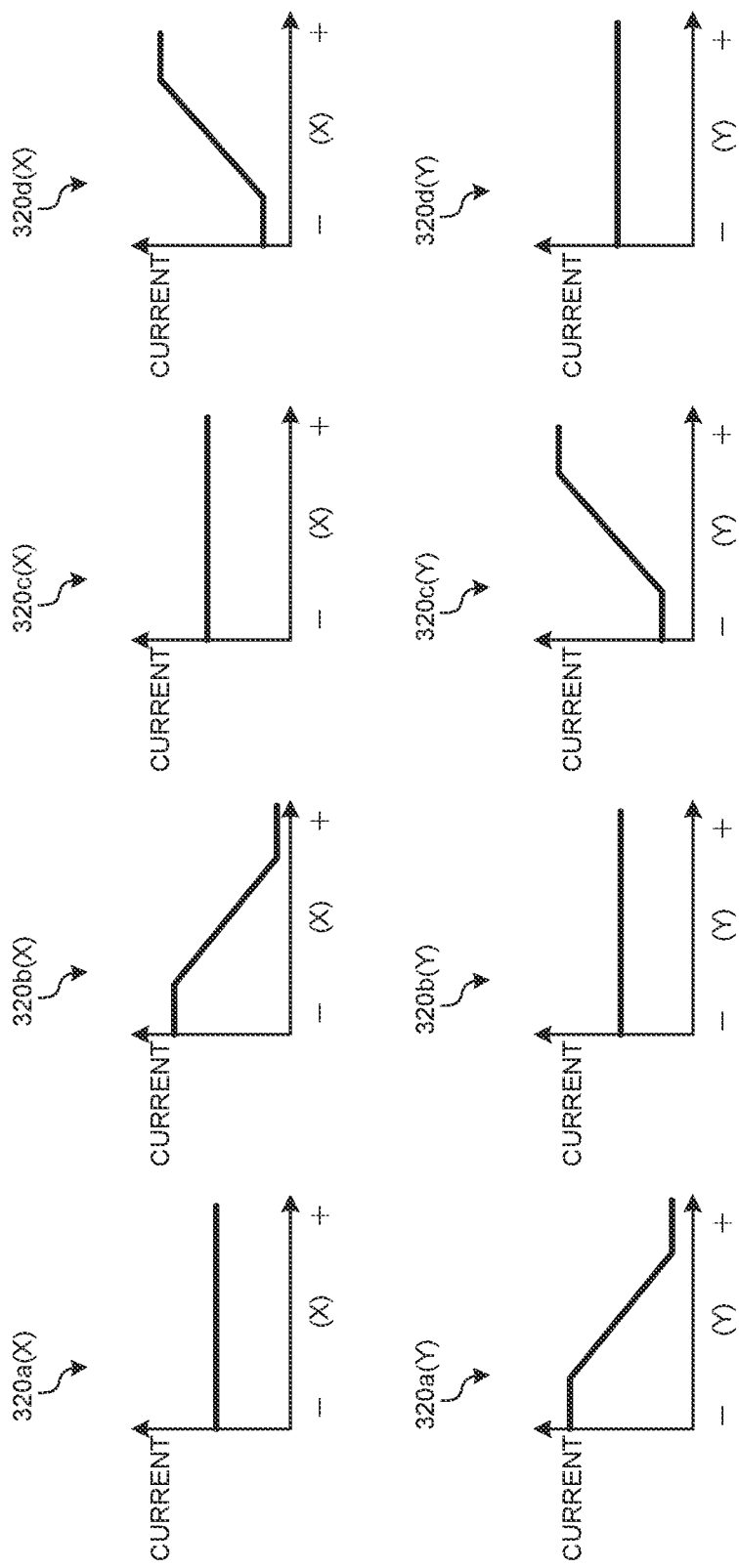

FIG.14A
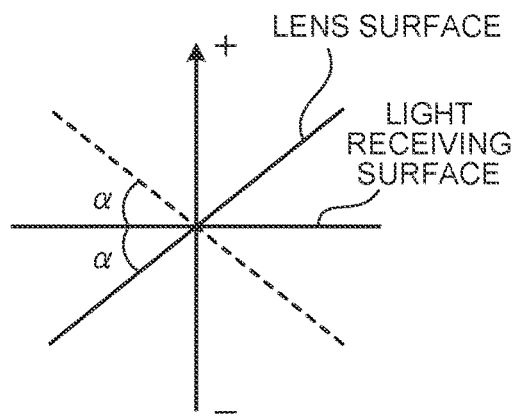
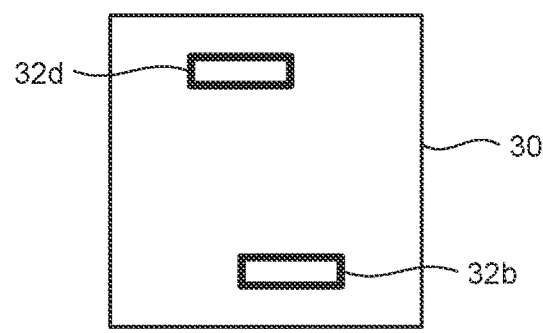
FIG.14B
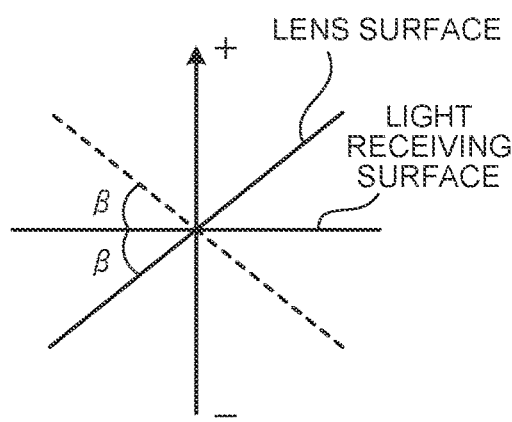
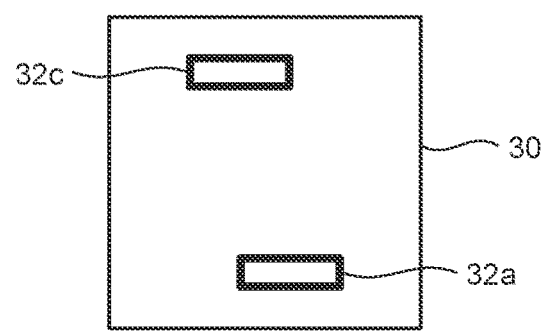

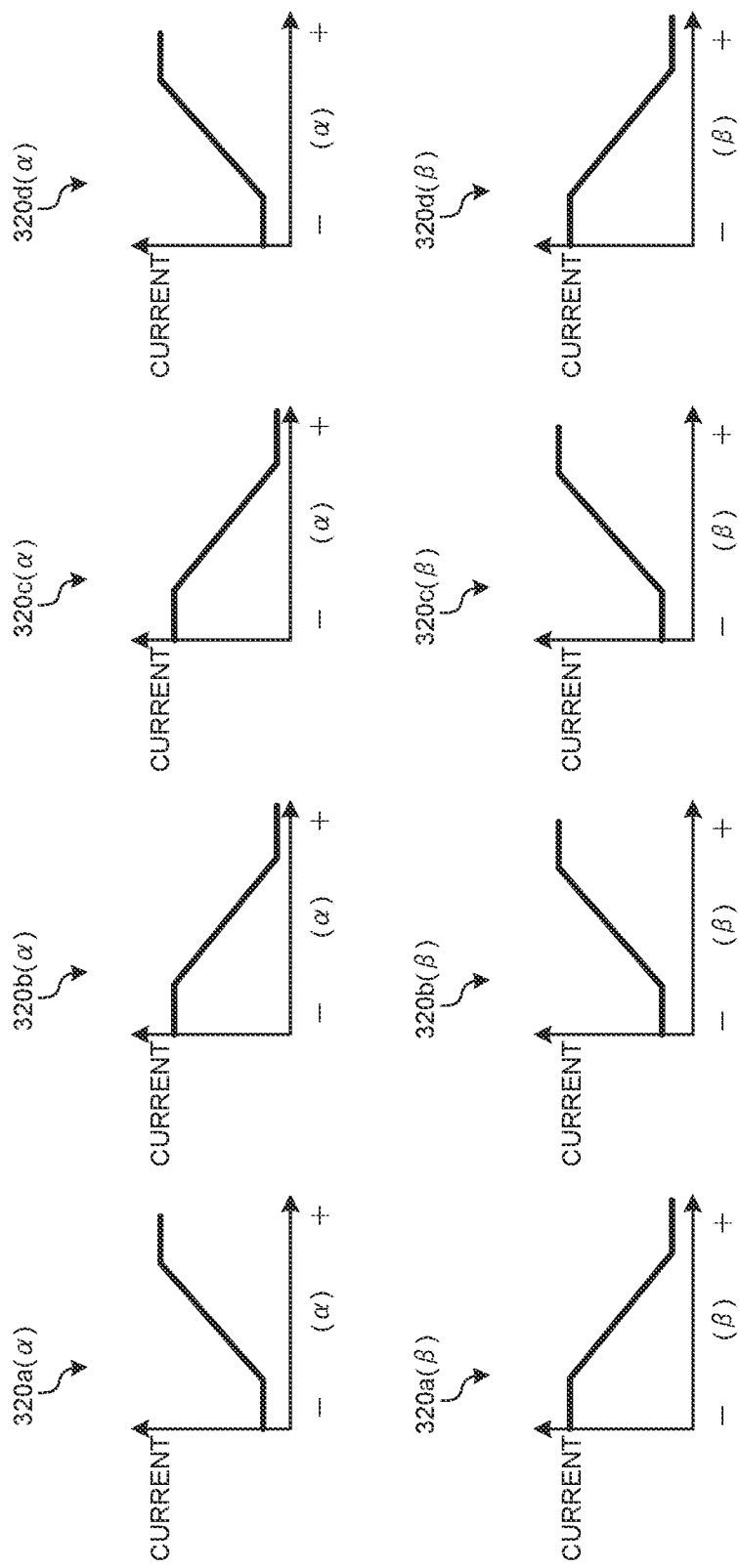

FIG.20

| ITEMS | CONDITIONS | CALCULATION FORMULA |
|---|---|---|
| X-AXIS TILT | $(X_1 > C_A \wedge X_1 < C_B \wedge X_1 < C_C \wedge X_1 > C_D)$ $\vee$ $(X_1 < C_A \wedge X_1 > C_B \wedge X_1 > C_C \wedge X_1 < C_D)$ | $\{(C_A - X_1) + (X_1 - C_B) + (X_1 - C_C) + (C_D - X_1)\} \times X_2$ |
| Y-AXIS TILT | $(X_1 < C_A \wedge X_1 > C_B \wedge X_1 > C_C \wedge X_1 < C_D)$ $\vee$ $(X_1 > C_A \wedge X_1 < C_B \wedge X_1 < C_C \wedge X_1 > C_D)$ | $\{(X_1 - C_A) + (C_B - X_1) + (C_C - X_1) + (X_1 - C_D)\} \times X_3$ |
| X-AXIS DIRECTION MOVEMENT AMOUNT | (NO CONDITIONS) | $\{(C_B - X_1) + (X_1 - C_D)\} \times X_4 - X_{tilt} \times X_5$ |
| Y-AXIS DIRECTION MOVEMENT AMOUNT | (NO CONDITIONS) | $\{(C_A - X_1) + (X_1 - C_C)\} \times X_6 - Y_{tilt} \times X_7$ |
| AF MOVEMENT | (NO CONDITIONS) | $(C_A + C_B + C_C + C_D) \times X_8$ |

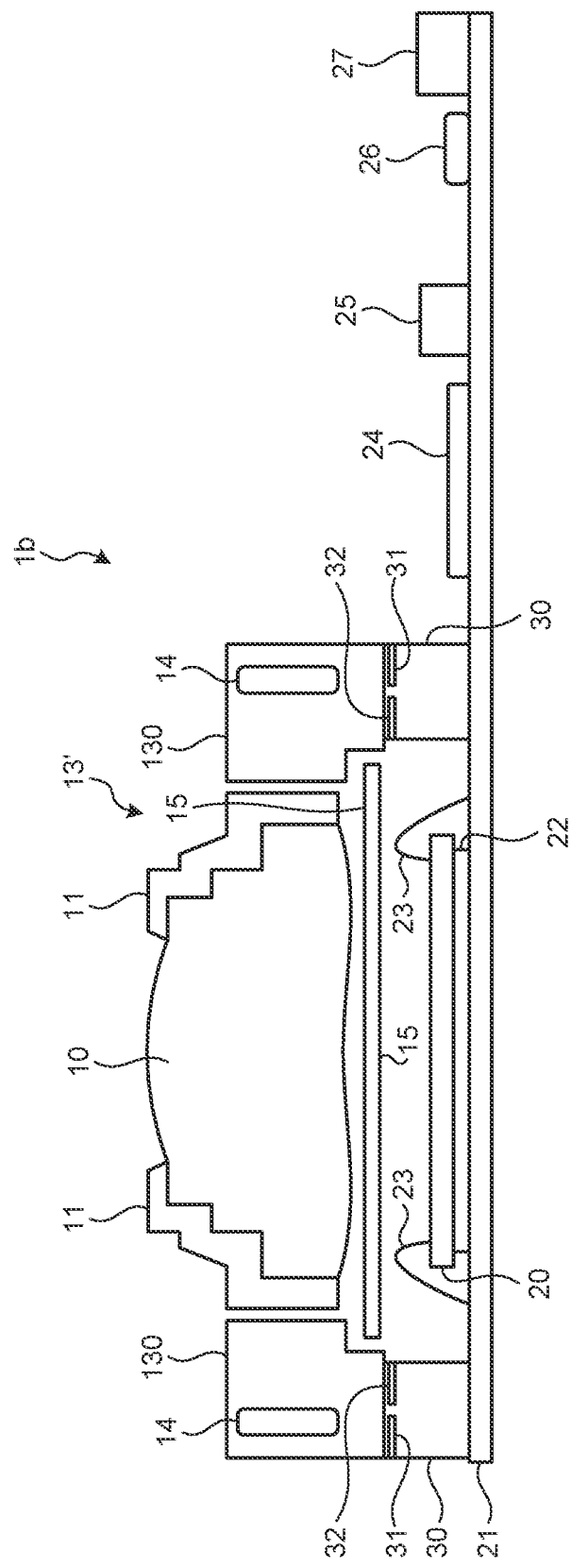

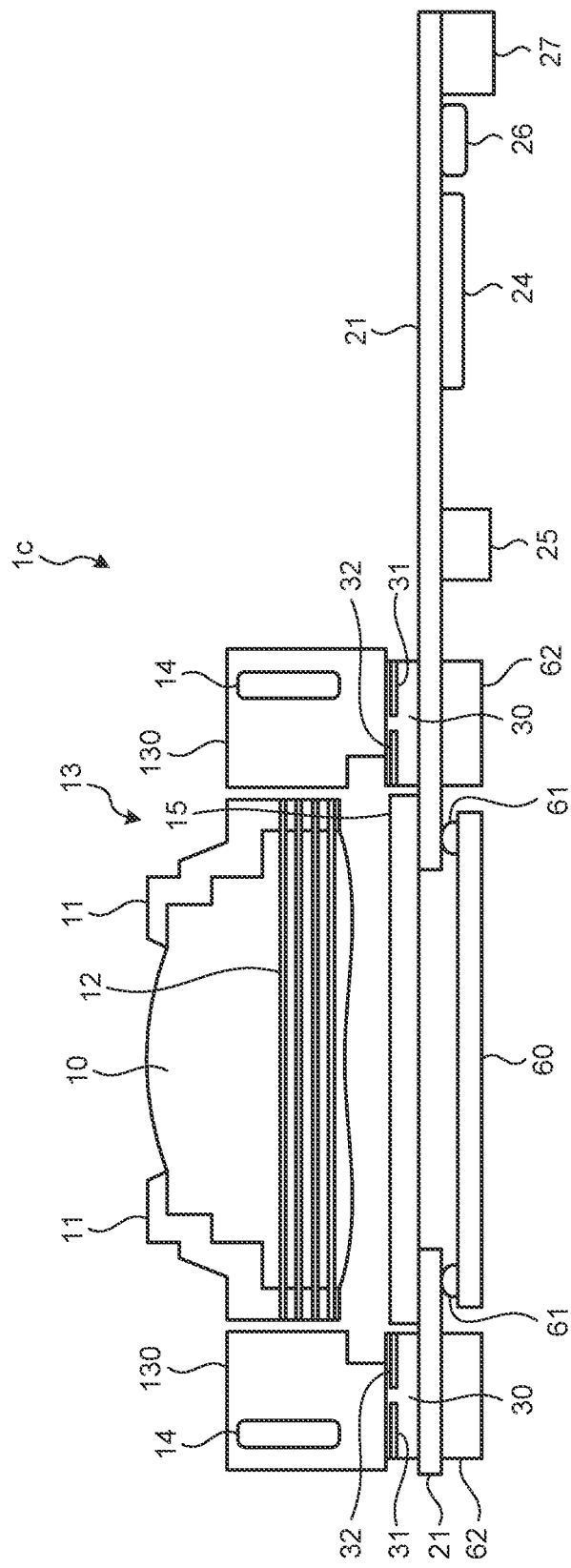

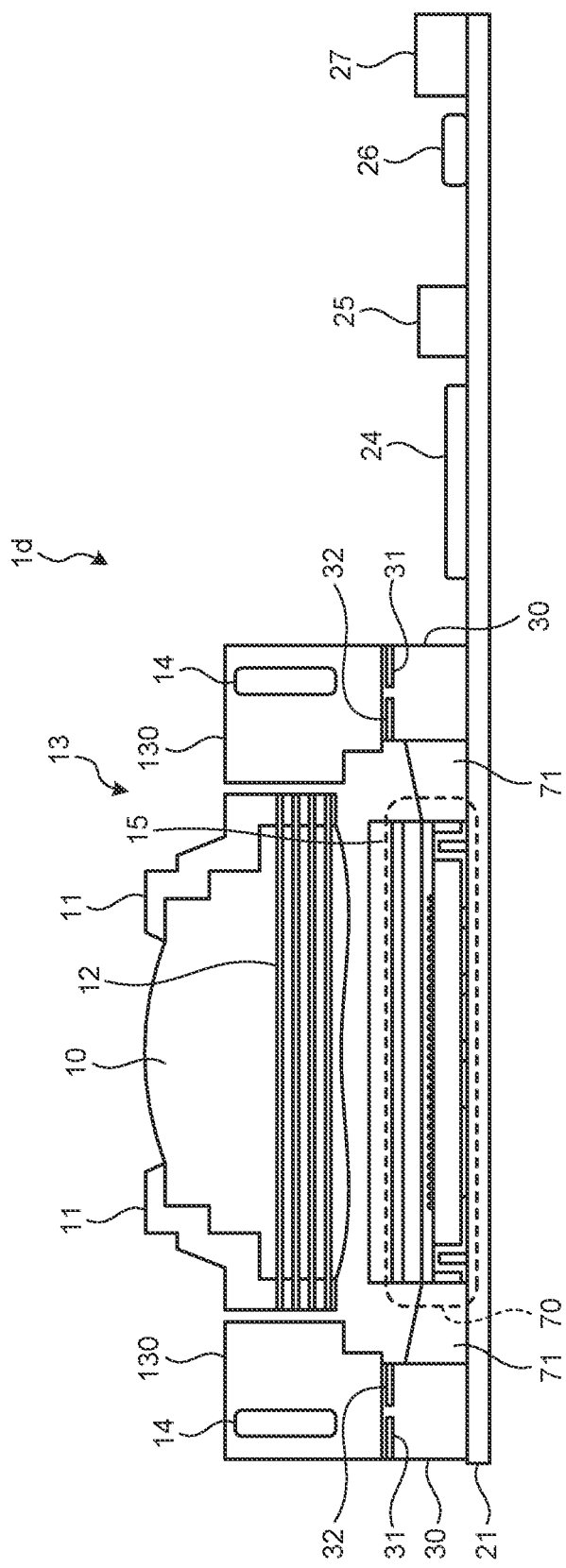

IMAGING DEVICE

CROSS REFERENCE TO RELATED APPLICATIONS

This application is a U.S. National Phase of International Patent Application No. PCT/JP2019/039444 filed on Oct. 7, 2019, which claims priority benefit of Japanese Patent Application No. JP 2018-203249 filed in the Japan Patent Office on Oct. 29, 2018. Each of the above-referenced applications is hereby incorporated herein by reference in its entirety.

FIELD

The present invention relates to an imaging device.

BACKGROUND

In recent years, there has been a demand for higher resolution, higher performance, and miniaturization for the functionality as an imaging device mounted on a digital still camera or a multifunctional mobile phone terminal having an imaging function. As one of the higher performance in the functionality as an imaging device, there is known a technique of constantly detecting the focal position of a lens and moving the lens at high speed to a position where subject light is focused.

For example, there is known a technique in which an element for detecting a lens position such as a Hall element is mounted on an actuator for driving a lens and whereby the position of the lens is output to the outside. Furthermore, Patent Literature 2 discloses a technique of detecting the position of a lens based on the phase of electromotive force in parallel movement of an exciting coil for driving the position of the lens and a detection coil disposed on the operating lens side.

CITATION LIST

Patent Literature

Patent Literature 1: JP 2011-022563 A
Patent Literature 2: JP 2000-295832 A

SUMMARY

Technical Problem

However, according to Patent Literature 1, it is necessary to mount a Hall element on the actuator, making it difficult to achieve miniaturization. Furthermore, with the configuration disclosed in Patent Literature 2, miniaturization is possible. However, in this configuration, the lens position is detected by a detection coil arranged parallel to the moving direction of the lens, and thus, it would be difficult to apply this technique to recent actuator structures in which an exciting coil for driving the lens is disposed on the outside of the lens perpendicular to the direction of movement of the lens.

An object of the present disclosure is to provide an imaging device capable of further miniaturization.

Solution to Problem

For solving the problem described above, an imaging device according to one aspect of the present disclosure has a first coil that moves a lens that collects light from a subject, in an optical axis direction of the light in accordance with a first magnetic field and that moves together with the lens; a second coil for moving the lens in a direction perpendicular to the optical axis in accordance with a second magnetic field; and a third coil for detecting the first magnetic field, wherein the second coil and the third coil are arranged on a same substrate.

BRIEF DESCRIPTION OF DRAWINGS

FIG. 5 is a view illustrating an exemplary structure of a spacer applicable to the first embodiment.

FIG. 10 is a diagram illustrating an example of a transition of an induced electromotive force in each of position detection coils when the lens moves in an X-Y plane, which is applicable to the first embodiment.

FIG. 14A is a diagram illustrating lens tilt detection according to the second embodiment.

FIG. 14B is a diagram illustrating lens tilt detection according to the second embodiment.

FIG. 15 is a diagram illustrating an example of a transition of an induced electromotive force in each of position detection coils when the lens has inclination, which is applicable to the second embodiment.

FIG. 20 is a diagram illustrating an example of calculation conditions and calculation formulas for X-axis tilt amount, Y-axis tilt amount, X-axis direction movement amount, Y-axis direction movement amount, and AF movement amount according to the fourth embodiment.

FIG. 21 is a view illustrating an exemplary configuration of an imaging device according to a fifth embodiment.

FIG. 22 is a view illustrating an example of an imaging device by using flip chip bonding according to a sixth embodiment.

FIG. 23 is a view illustrating an exemplary configuration of an imaging device using an imaging element having a CSP structure according to a seventh embodiment.

DESCRIPTION OF EMBODIMENTS

Embodiments of the present disclosure will be described below in detail with reference to the drawings. In each of the following embodiments, the same parts are denoted by the same reference symbols, and a repetitive description thereof will be omitted.

First Embodiment

Figure 1:
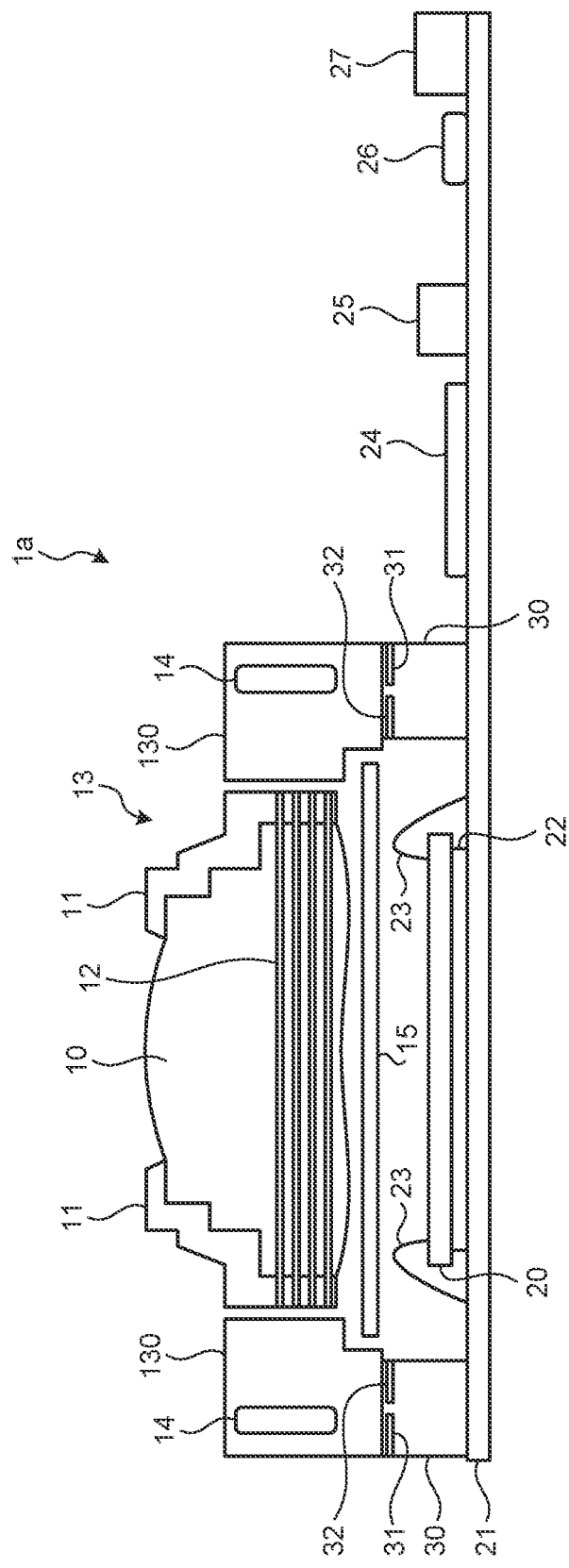
FIG. 1 is a view illustrating a configuration of an example of an imaging device according to a first embodiment.

A first embodiment of the present disclosure will be described. FIG. 1 is a view illustrating an exemplary configuration of an imaging device according to the first embodiment. In FIG. 1, an imaging device 1a includes: a lens 10 that collects light from a subject; and an imaging element 20 that is provided with the light collected by the lens 10 and outputs a pixel signal based on the provided light. The imaging element 20 can be constituted with applying a Charge Coupled Device (CCD) sensor or a Complementary Metal Oxide Semiconductor (CMOS) image sensor.

Although there is no specific limitation in usage, the imaging device 1a is applicable to a portable information processing device such as a multifunctional mobile phone terminal (smartphone) and a tablet personal computer.

Between the lens 10 and the imaging element 20, the imaging device 1a includes an infrared light cut-off filter 15 that cuts off light in the infrared region. After removal of the wavelength component in the infrared region by the infrared light cut-off filter 15 from the light from the subject focused by the lens 10, the light is applied to a light receiving surface of the imaging element 20.

The imaging device 1a includes an actuator 13 for moving the lens 10 in an optical axis direction of the light flux incident on the lens 10 as well as moving the lens 10 to a plane perpendicular to the optical axis direction. The lens 10 is integrally formed with a lens holder 11 that internally holds the lens 10, and is provided with an autofocus coil 12 (hereinafter, AF coil 12) on a side surface of the lens holder 11. The AF coil 12 is wound on the side surface of the lens holder 11 in a direction perpendicular to the optical axis direction of the light flux incident on the lens 10. The lens holder 11 is stored in an OIS holder 130 so as to be movable in the optical axis direction. The OIS holder 130 is movably arranged in a plane perpendicular to the optical axis direction, with respect to the spacer 30.

Hereinafter, the optical axis direction of the light flux incident on the lens 10 is referred to as a Z-axis direction, and a plane perpendicular to the optical axis direction is referred to as an X-Y plane. The X-Y plane is also a plane horizontal to the light receiving surface of the imaging element 20. The axes orthogonal to each other in the X-Y plane are called an X-axis and a Y-axis. Furthermore, the direction in which light is incident on the lens 10 is defined as an upper direction or upward, and the direction in which light is emitted from the lens 10 is defined as a lower direction or downward.

The actuator 13 includes a configuration that moves the lens 10. For example, the actuator 13 includes an AF coil 12 provided on the lens 10, a magnet 14 provided in the OIS holder 130, and an OIS coil 31 acting on the magnet 14 to move the OIS holder 130. The actuator 13 has a voice coil motor structure, in which the AF coil 12 has a structure supported by the OIS holder 130 by a spring (not illustrated). When a current is passed through the AF coil 12, a force is generated in the Z-axis direction by the action with the magnetic force of the magnet 14. This generated force moves the lens 10 held by the lens holder 11 in the positive or negative direction of the Z-axis, and this movement changes the distance between the lens 10 and the imaging element 20. Such a mechanism actualizes autofocus (AF).

The imaging device 1a includes a gyro sensor 25 as a vibration sensing means that senses the vibration of the imaging device 1a. Furthermore, the imaging device 1a includes an autofocus/OIS driver 24 for externally controlling the actuator 13. The autofocus/OIS driver 24 outputs a signal modulated by Pulse Width Modulation (PWM) (hereinafter, PWM signal) to the actuator 13. A PWM signal is a signal in which a high state and a low state are switched at a predetermined cycle. In the actuator 13, the AF coil 12 is driven by the PWM signal to move the lens 10 in the Z-axis direction.

Together with spacers 30, the imaging element 20, bonded by an adhesive 22, is fixedly disposed on a circuit substrate 21. The imaging element 20 is electrically connected to a circuit pattern formed on the circuit substrate 21 by a metal wire 23. The autofocus/OIS driver 24, the gyro sensor 25, as described above, together with a storage unit 26, and a connector 27, are further disposed onto the circuit substrate 21.

The OIS holder 130 (actuator 13) described above is disposed on the spacer 30. At this time, the OIS holder 130 is disposed on the spacer 30 so that the OIS holder 130 can be moved on upper surface of the spacer 30 in the X-Y plane.

The OIS coil 31 described above as well as the position detection coil 32 are disposed on the OIS holder 130 side surface of the spacer 30. The position detection coil 32 generates a current by an induced electromotive force corresponding to a change in a magnetic field generated by the AF coil 12 by a current flowing through the AF coil 12 due to a PWM signal, for example. The position of the AF coil 12, that is, the lens 10 can be detected based on the current generated by the induced electromotive force of the position detection coil 32. The OIS coil 31 and the position detection coil 32 may be embedded inside the spacer 30.

The autofocus/OIS driver 24 further drives the OIS coil 31 to adjust the position of the lens 10 on the X-Y plane. That is, by applying a current through the OIS coil 31, the autofocus/OIS driver 24 can generate a force on the X-Y plane between the magnet 14 and the OIS coil 31 by the action with the magnetic force of the magnet 14. This moves the lens 10 in a plane parallel to the light receiving surface of the imaging element 20, leading to implementation of an optical camera shake correcting function. The mechanism for implementation of this optical camera shake correcting function is called an Optical Image Stabilizer (OIS).

More specifically, the OIS performs a process of correction in the optical system for reducing the influence of camera shake in the imaging device 1a. The OIS senses vibration during imaging in the imaging device 1a by a vibration sensing means, for example, and adjusts the position of the lens 10 on the X-Y plane in accordance with the direction and amount of the vibration. Not limited to this, OIS may implement the correction by adjusting the position of the imaging element 20 in accordance with vibration. In the first embodiment, the position of the lens 10 on the X-Y plane is adjusted by the OIS, thereby performing camera shake correction.

The storage unit 26 is non-volatile memory (or Electrically Erasable and Programmable Read-Only Memory (EEPROM)), for example, and preliminarily stores data for correcting variations in the imaging device 1a. For example, the amount of power obtained by the induced electromotive force in the position detection coil 32 for adjusting the lens position changes depending on the number of turns and size of the AF coil 12 of the actuator 13, the formation state of the position detection coil 32, or the like. Accordingly, the variation in the induced electromotive force occurring from the position detection coil 32 is measured in advance at the time of manufacturing the imaging device 1a, or the like. In addition, adjustment values used for adjusting the measured variation can be preliminarily stored in the storage unit 26. This makes it possible to correct the variation in individual imaging devices 1a by using the adjustment value stored in the storage unit 26 at the time of actual control.

The connector 27 is provided to output the pixel signal supplied from the imaging element 20 via the circuit substrate 21 to the outside. The connector 27 also functions as a terminal used for communication between the autofocus/OIS driver 24, the gyro sensor 25, and the storage unit 26 with the outside.

Figure 2:
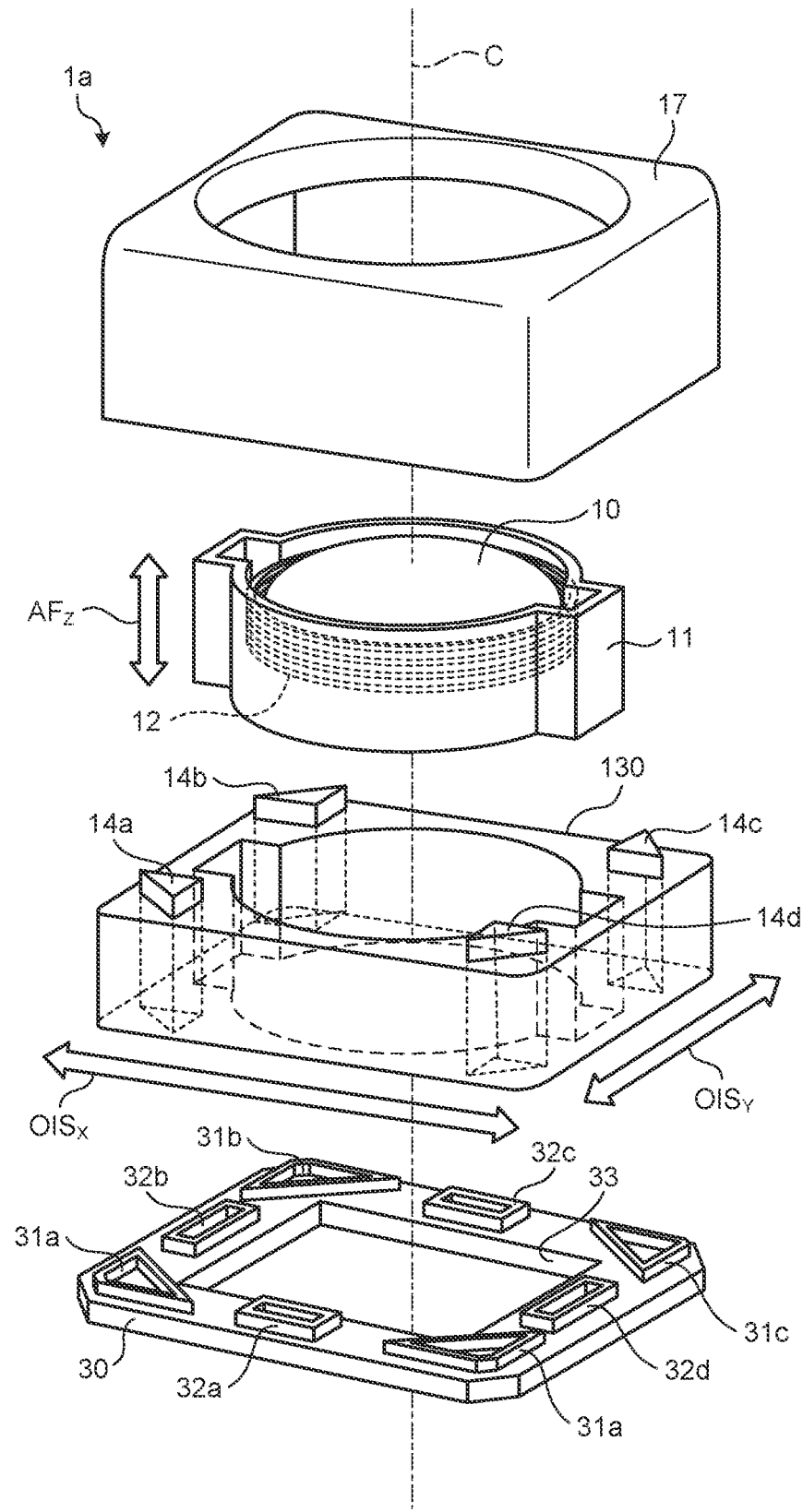
FIG. 2 is an exemplary structural view illustrating a structure of the imaging device according to the first embodiment.

FIG. 2 is an exemplary structural view illustrating the structure of the imaging device 1a according to the first embodiment. Note that FIG. 2 omits illustrations of the circuit substrate 21 and the imaging element 20. In FIG. 2, the imaging device 1a has a configuration in which the spacer 30, the OIS holder 130, and the lens 10 (lens holder 11) are assembled to be aligned with the center line C penetrating the center of the lens 10 in the Z-axis direction and the entire pieces are covered with a cover 17, for example.

In this example, the OIS holder 130 has magnets 14a, 14b, 14c and 14d embedded in four corners. The lens 10 (lens holder 11) is movable up and down inside the OIS holder 130 in the Z-axis direction as indicated by an arrow AFz.

For example, the upper surface of the spacer 30 is provided with four OIS coils 31a, 31b, 31c and 31d and four position detection coils 32a, 32b, 32c and 32d. The OIS coils 31a, 31b, 31c and 31d are disposed at four corners of the spacer 30 corresponding to the positions of the magnets 14a, 14b, 14c and 14d, respectively. With respect to these, the position detection coils 32a, 32b, 32c and 32d are disposed at positions corresponding to four sides when the spacer 30 is regarded as a rectangle.

At the center of the spacer 30, an opening 33 corresponding to the size of the imaging element 20 is provided.

By applying a current through each of the OIS coils 31a, 31b, 31c and 31d, a force is generated in the X and Y directions in the X-Y plane by the action with the magnetic force of each of the magnets 14a, 14b, 14c and 14d. The generated force moves the OIS holder 130 in the X-Y plane, as illustrated by arrows OISx and OISy in FIG. 2. Together with the movement of the OIS holder 130, the lens 10 (lens holder 11) stored in the OIS holder 130 is moved in the X-Y plane. By moving the lens 10 in the X-Y plane in a direction that reduces the influence of disturbance caused by camera shake or the like, it is possible to actualize camera shake correction.

(Position Detection According to First Embodiment)

Figure 3:
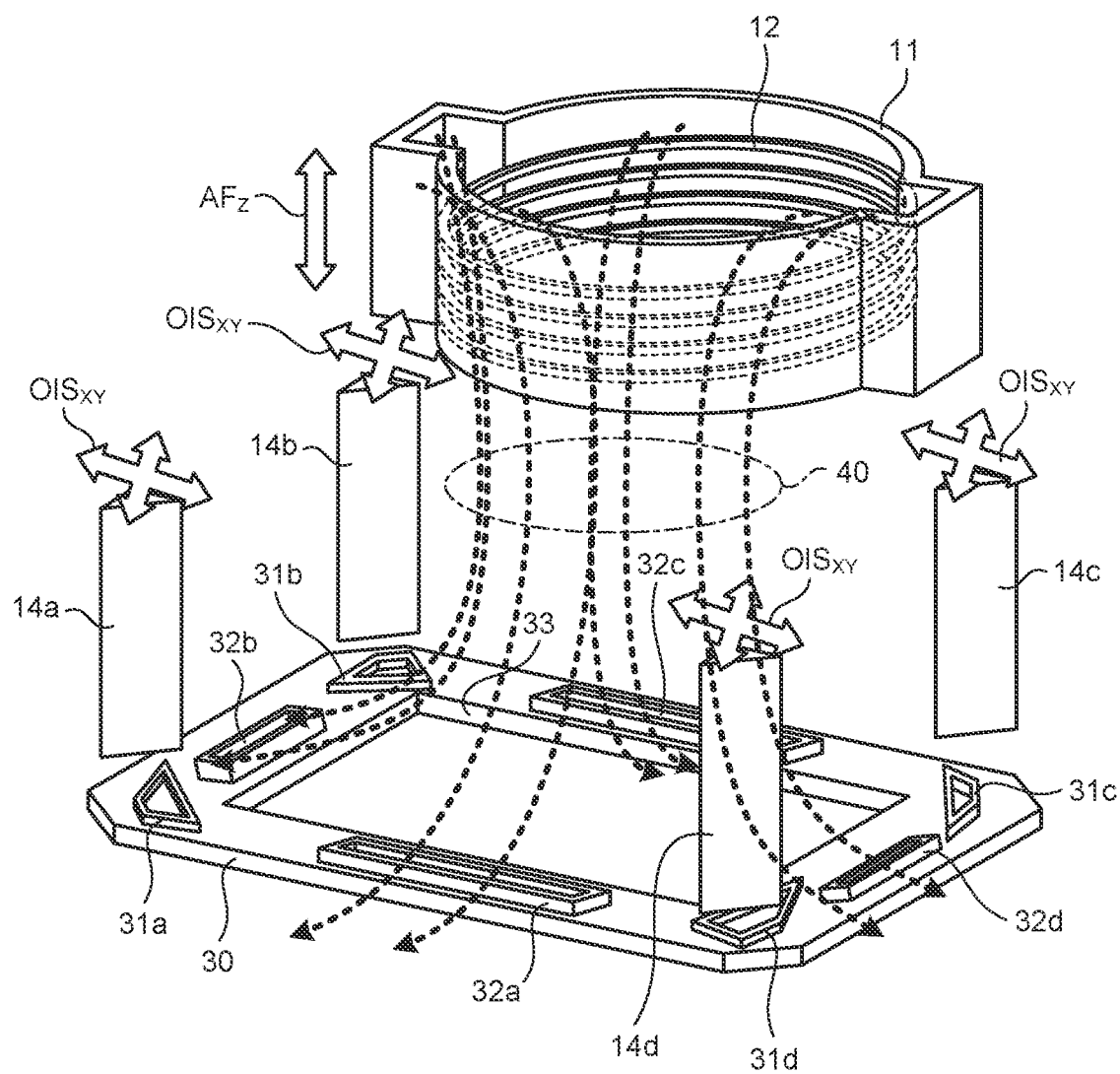
FIG. 3 is a view illustrating a position detection process according to the first embodiment.

Next, a position detection process of detecting the position of the lens 10 (lens holder 11) according to the first embodiment will be described. FIG. 3 is a view illustrating the position detection process according to the first embodiment. FIG. 3 illustrates magnetic force lines 40 due to the magnetic field generated in the AF coil 12, and the following will describe the induced electromotive forces generated in the position detection coils 32a, 32b, 32c and 32d due to the change in the magnetic force indicated in the magnetic force lines 40.

In the following, for the sake of explanation, the magnetic force line 40 will be described as a magnetic field 40 as appropriate.

By applying an electric current through the AF coil 12, the AF coil 12 moves up and down in the Z-axis direction as illustrated by the arrow AFz due to the action with the electric current and the magnetic force of the magnets 14a to 14d. At this time, power consumption can be reduced more when the current to be applied to the AF coil 12 is a current having the PWM signal, that is, the signal in which the high state and the low state are switched at a predetermined cycle as compared with the case where the current applied is a current with a signal having a constant voltage value, that is, a signal that constantly maintains a high state.

Accordingly, when the PWM signal is used as the signal supplied to the AF coil 12 in order to reduce the power consumption, the magnetic field 40 is generated by the AF coil 12. For example, as illustrated in dotted arrows in FIG. 3, the magnetic field 40 penetrates through the inside of the AF coil 12 in a direction perpendicular to the winding direction of the AF coil 12, goes around while expanding in the winding surface outside the AF coil 12, and returns to the inside of the AF coil 12. In the example of FIG. 3, the magnetic field 40 generated in the AF coil 12 is generated in a direction from the upper side of the AF coil 12 toward the position detection coil 32 side.

Note that the magnetic field 40 is generated in a direction different from the direction indicated by the dotted arrows in FIG. 3 depending on the direction of the current flowing through the AF coil 12. For the sake of explanation, the following will describe an exemplary case where the magnetic field 40 is generated in the direction indicated by the dotted arrows in FIG. 3.

The magnetic field 40 generated by the AF coil 12 is transmitted through the imaging element 20 (refer to FIG. 1). Therefore, the magnetic field 40 might influence the image captured by the imaging element 20. For example, noise might occur in the imaging element 20 under the influence of the magnetic field 40, and a pixel signal (image) including the noise might be output from the imaging element 20.

By achieving synchronization between the drive by the PWM signal and the drive of the imaging element 20 so as to suppress the generation of the magnetic field 40 during the drive period that causes noise to the imaging element 20, it is possible to reduce the influence of the noise from the magnetic field 40 onto the imaging element 20. With such synchronization, it is possible to output the pixel signal in which the influence of the magnetic field 40 is suppressed, from the imaging device 1a.

The magnetic field 40 generated by supplying the PWM signal to the AF coil 12 also reaches each of the position detection coils 32a to 32d. By detecting the strength of the magnetic field reaching each of the position detection coils 32a to 32d, it is possible to detect the position of the lens 10 (lens holder 11) in the Z-axis direction and the X-Y plane.

Next, a position detection function of the lens 10 using the position detection coils 32a to 32d according to the first embodiment will be described.

As illustrated in FIGS. 1 to 3, each of the OIS coils 31a to 31d and each of the position detection coils 32a to 32d are formed in the spacer 30 formed of an organic substrate or the like. Each of the position detection coils 32a to 32d is provided at a position where the magnetic field 40 generated in the AF coil 12 driven by the PWM signal can be transmitted. This generates, in each of the position detection coils 32a to 32d, an induced electromotive force according to the change in the magnetic field 40. Based on the magnitude of this induced electromotive force, it is possible to detect the position of the lens 10 (lens holder 11) in the Z-axis direction, the X-axis direction, and the Y-axis direction.

By enabling detection of the position of the lens 10 (lens holder 11) in this manner, it is possible to achieve high-performance lens drive, that is, camera shake correction.

With reference to FIG. 3, the OIS coils 31a to 31d are provided on a surface (X-Y plane) that is horizontal to the light receiving surface of the imaging element 20 with respect to the spacer 30. In addition, the magnets 14a to 14d are provided at positions facing the OIS coils 31a to 31d, respectively. Furthermore, the position detection coils 32a to 32d are provided with respect to the spacer 30 so as not to overlap with the OIS coils 31a to 31d, respectively.

Figure 4:
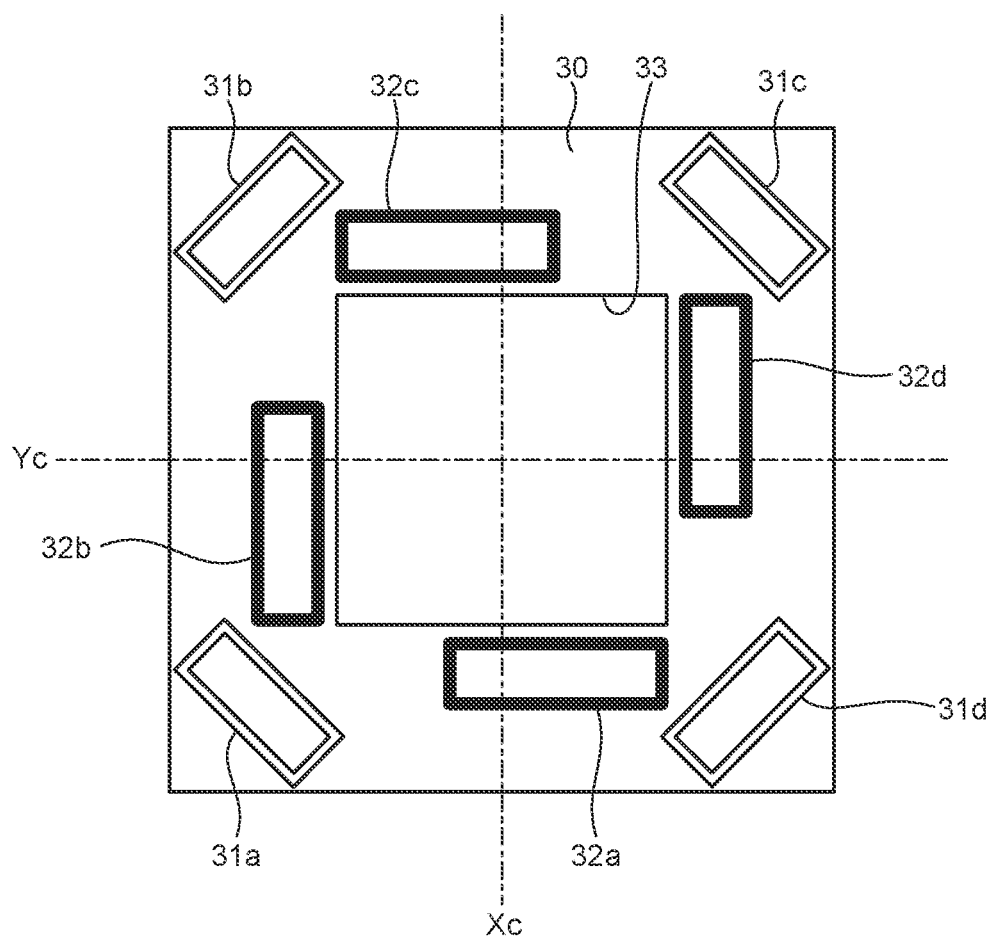
FIG. 4 is a diagram illustrating an exemplary arrangement of each of position detection coils applicable to the first embodiment.

FIG. 4 is a diagram illustrating an exemplary arrangement of each of position detection coils 32a to 32d applicable to the first embodiment. FIG. 4 illustrates an X-Y plane in the spacer 30 in which the position detection coils 32a to 32d are arranged. Furthermore, in the example of FIG. 4, each of the OIS coils 31a to 31d is illustrated as being disposed on the same X-Y plane as each of the position detection coils 32a to 32d.

Here, the spacer 30 is assumed to be rectangular. Although not illustrated, the lens 10 is arranged so as to set the center of the lens 10 aligned with the center of the opening 33 of the spacer 30 and cover substantially the entire opening 33, for example, in a state where there is no camera shake. That is, the spacer 30 is configured as a rectangular shape including a region corresponding to the lens 10.

Each of the OIS coils 31a to 31d is respectively disposed at a position corresponding to each of the magnets 14a to 14d provided in the OIS holder 130 disposed above the spacer 30. In the example of FIG. 4, each of the OIS coils 31a to 31d is disposed at four corners of the rectangular spacer 30.

The position detection coils 32a to 32d are disposed at positions close to the opening 33 (imaging element 20) with respect to the OIS coils 31a to 31d. This is because the position detection coils 32a to 32d are preferably arranged below the AF coil 12 in order to facilitate the detection of the induced electromotive force corresponding to the change in the magnetic field 40 of the AF coil 12. Furthermore, as described above, the position detection coils 32a to 32d are disposed so as not to overlap with the OIS coils 31a to 31d. In the example of FIG. 4, the OIS coils 31a to 31d are disposed at four corners of the rectangular spacer 30, whereas the position detection coils 32a to 32d are disposed at positions corresponding to the four sides of the spacer 30.

Specifically, in FIG. 4, the coils are each disposed at positions at which the position detection coil 32a corresponds to the lower side of the spacer 30, the position detection coil 32b corresponds to the left side of the spacer 30, the position detection coil 32c corresponds to the upper side of the spacer 30, and the position detection coil 32d corresponds to the right side of the spacer 30. Furthermore, in the example of FIG. 4, each of the position detection coils 32a to 32d is disposed close to the opening 33 of the spacer 30.

In this manner, by providing the position detection coils 32a to 32d in the direction perpendicular to the magnetic field 40 generated in the coils driven by the PWM signal, an induced electromotive force is generated by the magnetic field 40 in each of the position detection coils 32a to 32d. The position of the lens 10 (lens holder 11) in the Z-axis direction and the positions in the X-axis direction and the Y-axis direction (positions in the X-Y plane) can be detected by the magnitude of the induced electromotive force generated in each of the position detection coils 32a to 32d.

The center of each of the OIS coils 31a to 31d and the center of each of the magnets 14a to 14d are substantially aligned with the center of the lens 10 in a case where the lens 10 is positioned in a normal position in a stationary state. In contrast, the position detection coils 32a to 32d are arranged so as to be offset from the center of the lens 10 when the lens 10 is positioned at a normal position in a stationary state, not horizontally and vertically symmetrically.

The arrangement of the position detection coils 32a to 32d will be described more specifically with reference to FIG. 4. In FIG. 4, it is assumed that an intersection of a center line $X_C$ in the X-axis direction of the spacer 30 and a center line $Y_C$ in the Y-axis direction is aligned with the center of the lens 10 in a case where the lens is in a normal position in a stationary state. In this case, for example, the position detection coils 32a and 32c provided corresponding to the sides facing each other are arranged at positions where their centers are point-symmetrical with respect to the intersection of the center lines $X_C$ and $Y_C$, and where there centers do not come on the center line $X_C$. Similarly, the position detection coils 32b and 32d are arranged at positions where their centers are point-symmetrical with respect to the intersection and do not come on the center line $Y_C$.

By arranging the position detection coils 32a to 32b at positions corresponding to individual sides of the spacer 30 in this manner, it is possible to detect the position of the lens 10, that is, the AF coil 12, in at least one of the Z-axis direction, the X-axis direction, and the Y-axis direction. Furthermore, by arranging the position detection coils 32a to 32d at positions point-symmetrical with respect to the corresponding center lines $X_C$ and $Y_C$ by shifting, it is possible to detect an inclination angle (tilt angle) of the lens 10 with respect to the X-Y plane.

FIG. 5 is a view illustrating an exemplary structure of the spacer 30 applicable to the first embodiment. The spacer 30 composed of a single organic substrate might have lower rigidity, leading to the possibility of warpage, bending, or distortion in the spacer 30 when the spacer 30 is mounted on the actuator 13 in the manufacturing process of the imaging device 1a. To avoid this, in the first embodiment, as illustrated in FIG. 5, the spacer 30 is formed to have a two-layer structure in which a first spacer substrate 30a and a second spacer substrate 30b are connected with each other to increase the rigidity.

More specifically, each of the position detection coils 32a to 32d generates the induced electromotive force in accordance with the line width formed, but there is a possibility of occurrence of warpage, bending, or distortion because of low rigidity. Warpage, bending, or distortion in each of the position detection coils 32a to 32d would influence the accuracy of position detection.

To cope with this, in the first embodiment, in order to increase the rigidity, the spacer 30 is formed to have a two-layer structure. Specifically, the upper first spacer substrate 30a is constituted with an organic substrate or the like, and the OIS coils 31a to 31d and the position detection coils 32a to 32d are arranged on the upper surface of the first spacer substrate 30a, for example. It is also allowable to dispose other circuit components or the like on the first spacer substrate 30a. In addition, the second spacer substrate 30b on the lower side is formed of a high rigidity material such as a ceramic material, and is connected to the lower surface of the first spacer substrate 30a. The surface of the second spacer substrate 30b opposite to the surface connected to the first spacer substrate 30a is connected to the circuit substrate 21. This makes it possible to realize a structure of the spacer 30 having high rigidity and a high degree of freedom in design, such as the line width or the like in each of the position detection coils 32a to 32d.

Although FIG. 5 illustrates an example in which the first spacer substrate 30a is disposed on the upper side, the arrangement is not limited to this example. For example, the second spacer substrate 30b may be arranged on the upper side, the first spacer substrate 30a may be arranged on the lower side, and the first spacer substrate 30a and the circuit substrate 21 may be connected to each other. Furthermore, in the example of FIG. 5, the spacer 30 has a two-layer structure of the first spacer substrate 30a and the second spacer substrate 30b. Alternatively, however, the spacer 30 may have a structure of three or more layers, not limited to this example.

In the imaging device 1a according to the first embodiment, the OIS coils 31a to 31d and the position detection coils 32a to 32d are formed on a same substrate. Here, for example, there is a conceivable case where four OIS coils 31a to 31d are joined onto the spacer 30 by using a technique such as a Surface Mount Technology (SMT). In this case, there is a possibility of occurrence of misalignment between the centers of the OIS coils 31a to 31d and the positions of the magnets 14a to 14d corresponding to the OIS coils 31a to 31d. The occurrence of the misalignment would make it difficult to drive the lens 10 (lens holder 11) by the OIS coils 31a to 31d with high accuracy.

To avoid this, in the first embodiment, the OIS coils 31a to 31d are formed on the substrate, reducing the positional deviation or misalignment due to reasons of formation accuracy or position accuracy at the time of mounting components. Furthermore, joining elements for position detection (Hall elements or coils) onto the spacer 30 by a technique such as SMT as described above leads to a possible occurrence of a deviation from a desired position, which might cause deterioration in the position detection accuracy. In the first embodiment, the position detection coils 32a to 32d are formed on the same substrate (spacer 30) as that for the OIS coils 31a to 31d described above. This makes it possible to reduce the deterioration in the position detection accuracy due to the positional deviation or misalignment of the element for position detection.

Here, the OIS coils 31a to 31d and the position detection coils 32a to 32b can be formed as a circuit pattern on the first spacer substrate 30a. This circuit pattern may be formed by etching or the like, or may be formed by printing.

For example, the position detection coil 32a can be formed by a loop-shaped (spiral) circuit pattern. At this time, the circuit pattern forming the position detection coil 32a has a start point and an end point, in which the start point and the end point are connected to a detection circuit described below. Similarly, each of the other position detection coils 32b to 32d also has a start point and an end point, in which the start point and the end point are connected to the detection circuit. Furthermore, each of the OIS coils 31a to 31d also has a start point and an end point, in which the start points and end points are connected to the autofocus/OIS driver 24.

Next, the configuration of each of the OIS coils 31a to 31d and the position detection coils 32a to 32d in the spacer 30 will be described by taking the position detection coil 32a as an example.

Here, this is a conceivable exemplary case where the spacer 30 has a one-layer structure. In this case, the start point of the position detection coil 32a is a point located outside the position detection coil 32a, for example, and the end point is a point inside (central portion) of the position detection coil 32a. When a connecting line is drawn from the end point in the central portion of the position detecting coil 32a, it would be difficult to form the connecting line so that there is no overlapping portion with the position detection coil 32a already formed. By forming the start point and the end point of the position detection coil 32a on mutually different surfaces, it is possible to easily draw the connecting line individually from the start point and the end point.

In the first embodiment, the spacer 30 on which the position detection coil 32a is disposed is constituted with a plurality of layers, in which the start point and the end point of the position detection coil 32a are formed in different layers.

Figure 6A:
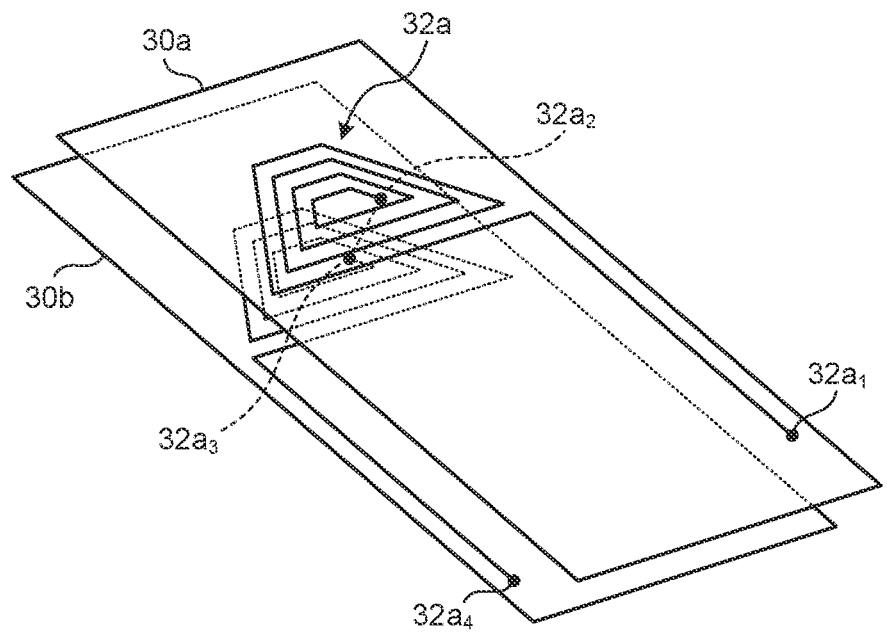
FIG. 6A is a view illustrating an example of a configuration of a position detection coil in a spacer having a two-layer structure applicable to the first embodiment.

FIG. 6A is a view illustrating an example of a configuration of the position detection coil 32a in the spacer 30 having a two-layer structure applicable to the first embodiment. In FIG. 6A, the position detection coil 32a on the spacer 30 is separated to be formed on the first spacer substrate 30a and the second spacer substrate 30b. Not limited to this, the position detection coil 32a may be separated to be formed on both surfaces of the first spacer substrate 30a. Each of the separated coils is arranged on the first spacer substrate 30a and the second spacer substrate 30b to be aligned with each other so as to function as one position detection coil 32a as a whole.

A start point $32a_1$ of the position detection coil 32a is formed on the first spacer substrate 30a. Using a circuit pattern connected to the start point $32a_1$, the coil is formed on the first spacer substrate 30a by a loop from the outside to the inside. A terminating edge $32a_2$ of this loop is connected to a starting edge $32a_3$ of the loop of the second spacer substrate 30b via the first spacer substrate 30a. On the second spacer substrate 30b, a coil is formed by a loop from the starting edge $32a_3$ to the outside, and the coil is connected to an end point $32a_4$ at the end of the loop.

Such a configuration of the position detection coil 32a for the spacer 30 having a two-layer structure can be similarly applied to the other position detection coils 32b to 32d and the OIS coils 31a to 31d.

Figure 6B:
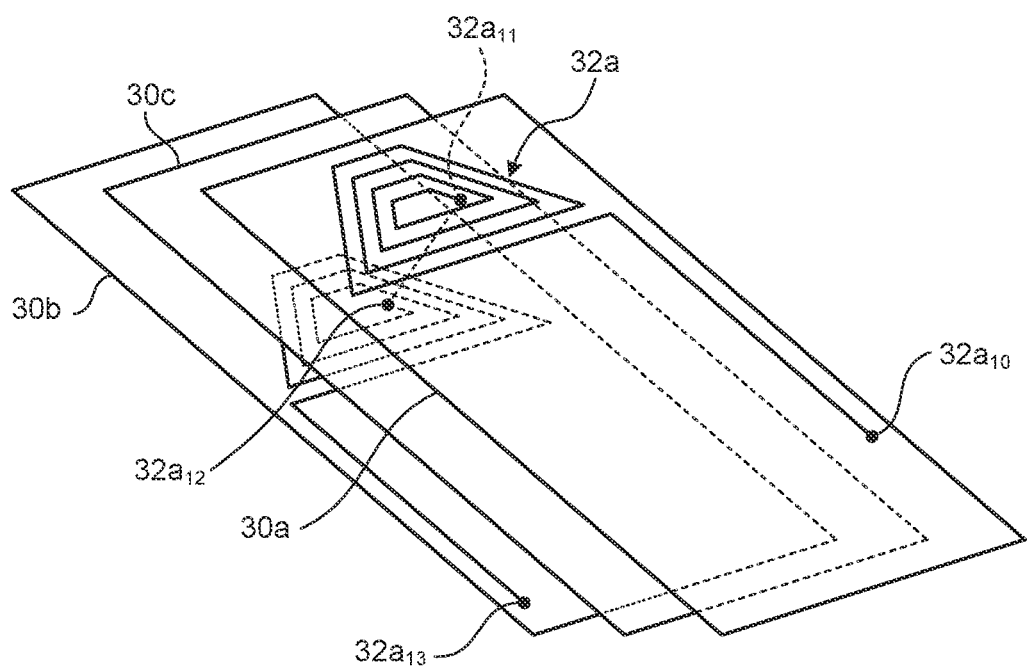
FIG. 6B is a view illustrating an example in which the spacer has a three-layer structure, applicable to the first embodiment.

FIG. 6B is a view illustrating an example in which the spacer 30 has a three-layer structure, applicable to the first embodiment. In FIG. 6B, the spacer 30 has a three-layer structure including a first spacer substrate 30a, a second spacer substrate 30b, and a third spacer substrate 30c disposed between and the first spacer substrate 30a and the second spacer substrate 30b.

In the example of FIG. 6B, a start point $32a_{10}$ of the position detection coil 32a is formed on the first spacer substrate 30a. Using a circuit pattern connected to the start point $32a_{10}$, the coil is formed on the first spacer substrate 30a by a loop from the outside to the inside. A terminating edge $32a_{11}$ of this loop is connected to a starting edge $32a_{12}$ of the loop of the second spacer substrate 30b via the first spacer substrate 30a and the third spacer substrate 30c. On the second spacer substrate 30b, a coil is formed by a loop from the starting edge $32a_{12}$ to the outside, and the coil is connected to an end point $32a_{13}$ at the end of the loop.

In the example of FIG. 6B, the position detection coil 32a is not formed on the third spacer substrate 30c located in the middle, out of the first spacer substrate 30a, the second spacer substrate 30b, and the third spacer substrate 30c. The third spacer substrate 30c can be used to form, for example, wiring or a circuit for outputting a pixel signal from the imaging element 20 to the outside. Note that the third spacer substrate 30c has a connecting line formed to connect the terminating edge $32a_{11}$ of the coil formed on the first spacer substrate 30a with the starting edge $32a_{12}$ of the coil formed on the second spacer substrate 30b.

Although the above description is examples in which the spacer 30 has a two-layer structure and a three-layer structure, the spacer structure is not limited to these examples. That is, it is also possible to form the spacer 30 to have four or more layers and to form the position detection coil 32a to three or more separated layers out of the four layers.

Here, each of the OIS coils 31a to 31d drives the OIS holder 130 following the Fleming's left-hand rule related to the magnetic force of the corresponding magnets 14a to 14d. The driving force used to drive the OIS holder 130 by each of the OIS coils 31a to 31d is determined based on the inductance determined by the number of turns of each of the OIS coils 31a to 31d, or the like. Therefore, the number of layers of the spacer 30 is determined based on the size and number of turns of each of the OIS coils 31a to 31d, that is, the formation conditions on the organic substrate. Furthermore, the size and the number of turns of the position detection coils 32a to 32d are determined, similarly to the OIS coils 31a to 31d, so as to be able to effectively detect the induced electromotive force corresponding to the change in the magnetic field 40 generated by the AF coil 12.

A magnetic field 40, which is generated when a current flows through the AF coil 12, runs into these position detection coils 32a to 32d (for example, the position detection coil 32a). As a result, an induced electromotive force is generated in the position detection coil 32a. The generated induced electromotive force can be obtained by Faraday's law.

When the magnetic flux penetrating the coil with the number of turns N (N is an integer of 1 or more) changes by a magnetic flux ΔΦ[Wb] during the time Δt[s], the induced electromotive force V[V] generated in the coil is expressed by Formula (1).

$$V = -N \times \Delta \Delta \Phi / \Delta t \tag{1}$$

From Formula (1), it can be seen that the more the number of turns N, the greater the induced electromotive force becomes. Here, as described above, the number of turns can be increased by forming the position detection coil 32a over a plurality of layers of the spacer 30. This makes it possible to increase the induced electromotive force generated by the position detection coil 32a, leading to achievement of a configuration capable of easily detecting the generated induced electromotive force.

Figure 7:
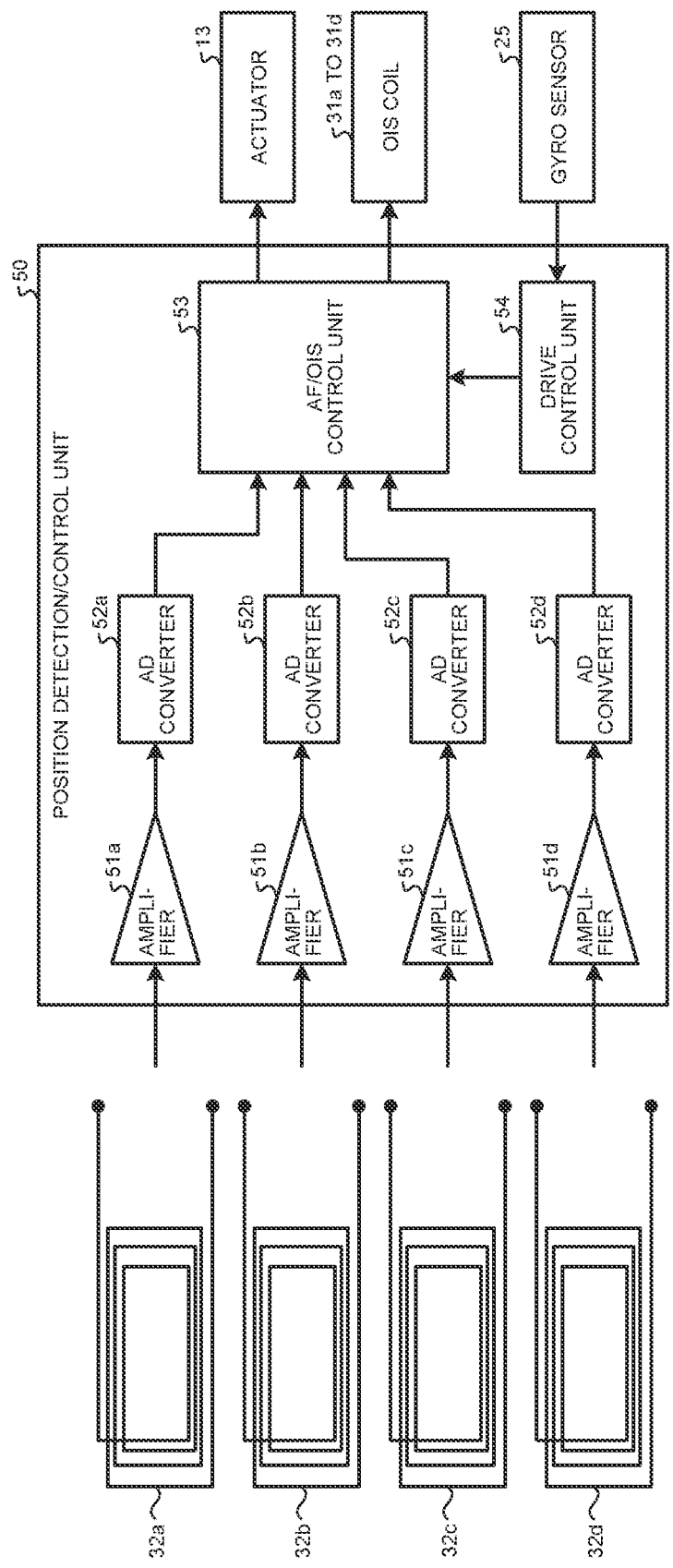
FIG. 7 is a block diagram illustrating a configuration of an example of a position detection/control unit as a detection circuit applicable to the first embodiment.

Next, a configuration for detecting the position of the lens 10 (lens holder 11) based on the outputs of the position detection coils 32a to 32d described above will be described. FIG. 7 is a block diagram illustrating a configuration of an example of a position detection/control unit as a detection circuit applicable to the first embodiment. In FIG. 7, a position detection/control unit 50 includes amplifiers 51a, 51b, 51c and 51d and Analog-to-Digital (AD) converters 52a, 52b, 52c and 52 corresponding to the number of position detection coils 32a to 32d. The position detection/control unit 50 further includes an AF/OIS control unit 53 and a drive control unit 54.

The position detection coils 32a to 32d output the current generated by the induced electromotive force corresponding to the change in the magnetic field 40 generated by the current flowing through the AF coil 12. The currents output from the position detection coils 32a to 32d are supplied to the amplifiers 51a to 51d, respectively. The amplifiers 51a to 51d convert individual current supplied from the position detection coils 32a to 32d into a voltage for amplification. Each voltage amplified by each of the amplifiers 51a to 51d is converted into a digital value by each of the AD converters 52a to 52d. Each of digital values converted by each of the AD converters 52a to 52d is supplied to the AF/OIS control unit 53.

The AF/OIS control unit 53 detects the position and tilt amount of the lens 10 (lens holder 11) based on the digital values supplied individually from the AD converters 52a to 52d.

Although a specific example will be described below, the AF/OIS control unit 53 can detect the position of the lens (lens holder 11) in the Z-axis direction based on the digital values supplied from individual AD converters 52a to 52d, that is, based on an integrated value obtained by each of the digital values corresponding to the output current of each of the position detection coils 32a to 32d. Furthermore, in a case where each of the digital values satisfies a predetermined condition, the AF/OIS control unit 53 can detect tilt amounts in the X-axis direction and the Y-axis direction based on a difference between each of digital values supplied from each of the AD converters 52*a* to 52*d* and each of digital values at a reference position.

Furthermore, the AF/OIS control unit 53 can detect the position of the lens 10 (lens holder 11) in the X-axis direction based on the difference between each of the digital values corresponding to the position detection coils 32*b* and 32*d* facing each other in the X-axis direction and each of the digital values at the reference position, and based on the tilt amount in the X-axis direction. Still further, the AF/OIS control unit 53 can detect the position of the lens 10 (lens holder 11) in the Y-axis direction based on the difference between each of the digital values corresponding to the position detection coils 32*a* and 32*c* facing each other in the Y-axis direction and each of the digital values at the reference position, and based on the tilt amount in the Y-axis direction.

The AF/OIS control unit 53 can generate a PWM signal to drive the lens 10 (lens holder 11) in the Z-axis direction, based on the position of the lens 10 (lens holder 11) detected based on the digital values individually supplied from the AD converters 52*a* to 52*d*. The AF/OIS control unit 53 supplies the generated drive signal to the actuator 13.

In addition, the AF/OIS control unit 53 can generate a drive signal to move the lens 10 (lens holder 11) within the X-Y plane, based on the position of the lens 10 (lens holder 11) detected based on the digital values individually supplied from the AD converters 52*a* to 52*d*. The AF/OIS control unit 53 supplies the generated drive signal to the OIS coils 31*a* to 31*d*.

When a vibration is sensed by the gyro sensor 25 and an occurrence of camera shake is determined, the drive control unit 54 determines whether there is a need to perform correction in the Z-axis direction and in the X-Y plane. When the drive control unit 54 has determined that correction is necessary, that is, it determines that the lens 10 (lens holder 11) needs to be moved in the Z-axis direction, the X-axis direction, and the Y-axis direction by camera shake correction, the drive control unit 54 generates a control signal instructing operations for executing the correction and supplies the generated control signal to the AF/OIS control unit 53. In response to the control signal, the AF/OIS control unit 53 generates a PWM signal for driving the AF coil 12 and a drive signal for driving the OIS coils 31*a* to 31*d*.

The position detection/control unit 50 may be mounted inside the imaging device 1*a* as one integrated circuit, or may be mounted outside the imaging device 1*a*. Alternatively, the unit may be actualized as a program for operating a Central Processing Unit (CPU), instead of an integrated circuit. In this case, for example, it is conceivable to store the unit in Read Only Memory (ROM) or the like of an electronic device (such as a digital still camera) including the imaging device 1*a*, as a program running on a CPU for controlling the operation of the electronic device.

In the present disclosure, there is provided a function of detecting an induced electromotive force occurring with a change in the magnetic field of the AF coil 12, and a function of adjusting, by using the induced electromotive force, both the position of the lens 10 in the Z-axis direction (focus of the lens 10) and the position of the lens 10 within the X-Y plane. In addition, as described above, not merely the case where these functions are implemented by an integrated circuit or a program, but also the case where they are implemented by other methods are to be included within the scope of the present disclosure.

Next, a position detection method according to the first embodiment will be described more specifically. Here, among the position detection coils 32*a* to 32*d*, the position detection coil 32*b* at the end of the X-Y plane in the X-axis direction will be described as an example.

For example, there is a conceivable case where the lens 10 (lens holder 11) moves in the X-axis direction due to the influence of disturbance or the like. In this case, the distance between the AF coil 12 provided on the lens holder 11 and the position detection coil 32*b* changes. When the influence of the disturbance is great, this change will be great. The influence of the magnetic field 40 generated by the current flowing through the AF coil 12 on the position detection coil 32*b* changes such that the shorter the distance between the lens 10/the AF coil 12 and the position detection coil 32*b*, the greater the influence. Accordingly, when the lens 10 and the AF coil 12 are located close to the position detection coil 32*b*, the induced electromotive force generated by the position detection coil 32*b* will be great. In contrast, when the lens 10 and the AF coil 12 are located far from the position detection coil 32*b*, the induced electromotive force generated by the position detection coil 32*b* will be small.

Figure 8:
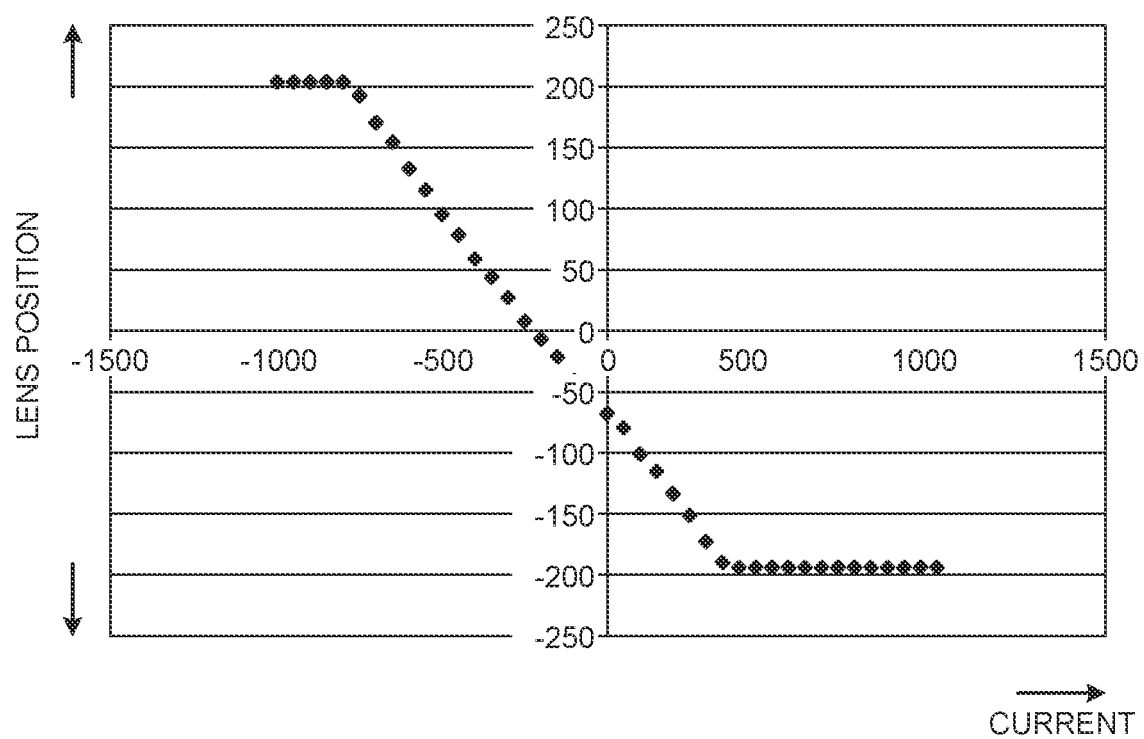
FIG. 8 is a graph illustrating an example of a relationship between the position of the lens and the induced electromotive force generated by the position detection coil in accordance with the position of the lens, which is applicable to the first embodiment.

FIG. 8 is a graph illustrating an example of a relationship between the position of the lens 10 and the induced electromotive force generated by the position detection coils 32*a* to 32*d* (in this case, the position detection coil 32*a*) in accordance with the position of the lens 10, which is applicable to the first embodiment.

In FIG. 8, the vertical axis illustrates the distance of the lens 10 (AF coil 12) with respect to the position detection coil 32*a* as a value relative to a predetermined position. That is, the distance in FIG. 8 is a negative value when the AF coil 12 is closer to the position detection coil 32*a* than the predetermined position, and is a positive value when the AF coil 12 is farther than the predetermined position. The horizontal axis illustrates an example of the current value generated by the induced electromotive force in the position detection coil 32*a*. The current value is defined as "+ (positive)" when it flows in a predetermined direction, and as "− (negative)" when it flows in an opposite direction of the predetermined direction.

FIG. 8 indicates that the induced electromotive force generated in the position detection coil 32*a* changes linearly. In FIG. 8, the region where there is no positional change in the AF coil 12 with respect to the current value indicates that the AF coil 12 is in a position where no further movement is allowed. Excluding this region, it can be seen that the induced electromotive force generated in the position detection coil 32*a* and the distance between the AF coil 12 and the position detection coil 32*a* have a one-to-one correspondence.

Here, the AF coil 12 moves together with the lens holder 11, and the lens holder 11 holds the lens 10. Accordingly, the above-described "the induced electromotive force generated in the position detection coil 32*a* and the distance between the AF coil 12 and the position detection coil 32*a* have a one-to-one correspondence" means that the induced electromotive force and the position of the lens 10 have a one-to-one correspondence. With this correspondence, it is possible to detect the position of the lens 10 by detecting the current generated by the induced electromotive force in each of the position detection coils 32*a* to 32*d*.

By utilizing such a relationship, for example, a position R of the position of the lens 10 after the AF/OIS control unit 53 controls to move the lens 10 to a desired position Q can be detected by the position detection/control unit 50. Furthermore, when there is deviation between the desired position Q and the detected position R, the amount of the deviation can be detected by the current output from the position detection coils 32a to 32d. The position of the lens 10 can be corrected based on the detected amount of deviation, and the lens 10 can be moved to the desired position Q. Therefore, the lens movement can be actualized with higher accuracy.

(Position Detection of Lens in X-Y Plane)

Figure 9:
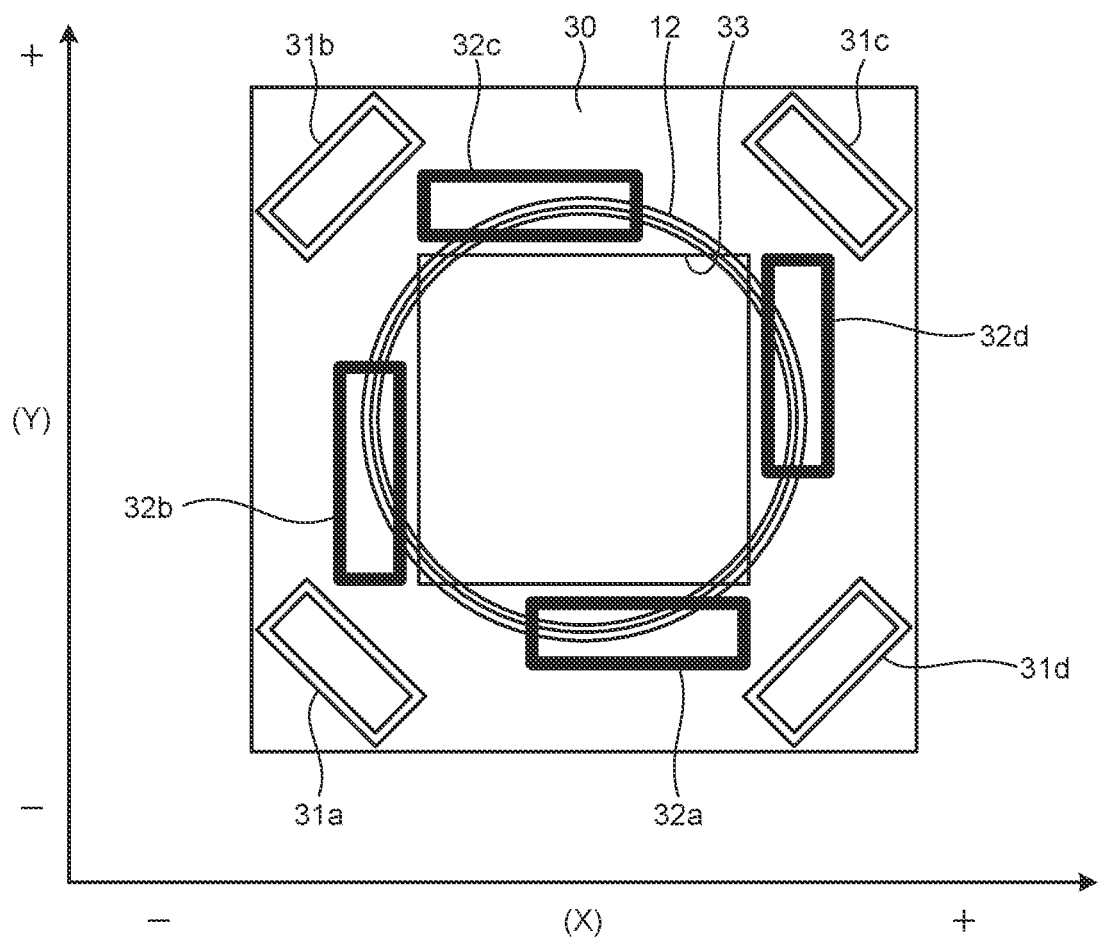
FIG. 9 is a diagram illustrating definitions of the X direction and the Y direction for each of position detection coils applicable to the first embodiment.

Next, the position detection of the lens 10 in the X-Y plane according to the first embodiment will be described. FIG. 9 is a diagram illustrating definitions of the X direction and the Y direction for each of the position detection coils 32a to 32d, which are applicable to the first embodiment. As illustrated in FIG. 9, the AF coil 12 (lens 10) is located in the central portion of the spacer 30, the position detection coils 32a and 32c are disposed to face each other in the Y-axis direction, while the position detection coils 32b and 32d are disposed to face each other in the X-axis direction.

FIG. 10 is a diagram illustrating an example of a transition of an induced electromotive force in each of the position detection coils 32a to 32d when the lens 10 moves by the camera shake correction, for example, in an X-Y plane, which is applicable to the first embodiment. In FIG. 10, graphs 320a (X) and 320a (Y) illustrate the transition of the induced electromotive force (output current) in the position detection coil 32a. Graphs 320b (X) and 320b (Y) illustrate the transition of the induced electromotive force in the position detection coil 32b. Graphs 320c (X) and 320c (Y) illustrate the transition of the induced electromotive force in the position detection coil 32c. Furthermore, graphs 320d (X) and 320d (Y) illustrate the transition of the induced electromotive force in the position detection coil 32d.

The graphs 320a (X), 320a (Y), 320b (X), 320b (Y), 320c (X), 320c (Y), 320d (X) and 320d (Y) in FIG. 10 are graphs obtained by the setting in FIG. 9 described above, in which with the horizontal direction as the X-axis direction and the center of the lens 10 as 0, the left side is defined as the negative direction (−X side), the right side is the positive direction (+X side), while with the vertical direction set as the Y-axis direction, the upper side is defined as the positive direction (+Y side) and the lower side is defined as the negative direction (−Y side).

Furthermore, in each of the graphs 320a (X), 320a (Y), 320b (X), 320b (Y), 320c (X), 320c (Y), 320d (X) and 320d (Y) in FIG. 10, the vertical axis indicates the induced electromotive force (current value) generated in the position detection coils 32a to 32d. The horizontal axis indicates the position of the lens 10. In this case, each of the graphs 320a (X), 320b (X), 320c (X) and 320d (X) indicates the position in the X direction, and represents a graph of the induced electromotive force in a case where the lens 10 moves from the −X side to the +X side. Furthermore, each of the graphs 320a (Y), 320b (Y), 320c (Y) and 320d (Y) indicates the position in the Y direction, and represents a graph of the induced electromotive force in a case where the lens 10 moves from the −Y side to the +Y side.

A current is constantly applied through the AF coil 12 in order to hold the lens 10 in a predetermined position. When there is no change in the position of the lens 10, the induced electromotive force generated in each of the position detection coils 32a to 32d will have no change either. In contrast, when the AF coil 12, that is, the lens 10 moves due to camera shake correction, for example, the distance between the AF coil 12 and each of the position detection coils 32a to 32d changes, and an induced electromotive force is generated in each of the position detection coils 32a to 32d in accordance with the change in the magnetic field 40 based on the change in the distance.

As an example, referring to the graphs 320b (X) and 320b (Y) related to the position detection coil 32b, when the lens 10 moves from the −X side to the +X side, the position detection coil 32b changes from a closer state toward a farther state. When such a change occurs, as illustrated in the graph 320b (X), the induced electromotive force generated in the position detection coil 32b gradually decreases as the lens 10 moves from the −X side to the +X side.

Meanwhile, when the lens 10 moves from the −Y side to the +Y side, the induced electromotive force generated in the position detection coil 32b has substantially no change. In this case, as illustrated in the graph 320b (Y), the induced electromotive force generated in the position detection coil 32b has substantially no change even when the lens 10 moves from the −Y side to the +Y side.

Moreover, referring to the graphs 320d (X) and 320d (Y) related to the position detection coil 32d, when the lens 10 moves from the −X side to the +X side, the position detection coil 32d changes from a farther state toward a closer state. When such a change occurs, as illustrated in graph 320d (X), the induced electromotive force generated in the position detection coil 32d gradually increases as the lens 10 moves from the −X side to the +X side.

Meanwhile, when the lens 10 moves from the −Y side to the +Y side, the induced electromotive force generated in the position detection coil 32d has substantially no change. In this case, as illustrated in the graph 320d (Y), the induced electromotive force generated in the position detection coil 32d has substantially no change even when the lens 10 moves from the −Y side to the +Y side.

Moreover, referring to the graphs 320c (X) and 320c (Y) related to the position detection coil 32c, when the lens 10 moves from the −X side to the +X side, the induced electromotive force generated in the position detection coil 32c has substantially no change. In this case, as illustrated in the graph 320c (X), the induced electromotive force generated in the position detection coil 32c has substantially no change even when the lens 10 moves from the −X side to the +X side.

In contrast, when the lens 10 moves from the −Y side to the +Y side, the position detection coil 32c changes from a farther state toward a closer state. When such a change occurs, as illustrated in graph 320c (Y), the induced electromotive force generated in the position detection coil 32c gradually increases as the lens 10 moves from the −Y side to the +Y side.

Furthermore, referring to the graphs 320a (X) and 320a (Y) related to the position detection coil 32a, when the lens 10 moves from the −X side to the +X side, the induced electromotive force generated in the position detection coil 32a has substantially no change. In this case, as illustrated in the graph 320a (X), the induced electromotive force generated in the position detection coil 32a has substantially no change even when the lens 10 moves from the −X side to the +X side.

In contrast, when the lens 10 moves from the −Y side to the +Y side, the position detection coil 32a changes from a closer state toward a farther state. When such a change occurs, as illustrated in graph 320a (Y), the induced electromotive force generated in the position detection coil 32a gradually decreases as the lens 10 moves from the −Y side to the +Y side.

From the above, the movement amount of the lens 10 (lens holder 11) in the X-axis direction and the Y-axis direction can be obtained based on the induced electromotive force generated in each of the position detection coils 32a to 32d.

For example, based on the induced electromotive force in the position detection coil 32a, the position of the lens 10 in the X-axis direction can be obtained as illustrated in the graphs 320a (X) and 320a (Y) of FIG. 10. Furthermore, based on the induced electromotive force in the position detection coil 32b, the position of the lens 10 in the Y-axis direction can be obtained as illustrated in the graphs 320b (X) and 320b (Y) of FIG. 10. Therefore, based on the induced electromotive force in these position detection coils 32a and 32b, it is possible to obtain two pieces of position information for detecting the position of the lens 10 in the X-axis direction or the Y-axis direction.

That is, based on the two induced electromotive forces of the position detection coils 32a and 32b, for example, predetermined calculations are performed such as obtaining absolute values of the values calculated by performing multiplication, addition, or subtraction on the two induced electromotive forces. From the calculation result, it is possible to detect at least one of the positions in the X-axis direction and the Y-axis direction of the lens 10.

More specifically, the movement amount in the X-axis direction is calculated by first obtaining the induced electromotive force (current value) in a state where the lens 10 is in an ideal position, that is, a state where the optical center of the lens 10 and the center of the light receiving surface of the imaging element 20 are aligned with each other, for each of the two position detection coils 32b and 32d arranged in the X-axis direction, as a reference value for each of the position detection coils 32b and 32d. When a difference between each of the current values based on the induced electromotive force and each of the reference values is obtained for each of the position detection coils 32b and 32d, it is possible to detect the movement amount of the lens 10 in the X-axis direction based on each of the differences.

The similar applies to the movement amount of the lens 10 in the Y-axis direction. That is, the movement amount in the Y-axis direction is obtained by first obtaining reference values for the two position detection coils 32a and 32c arranged in the Y-axis direction, as described above. When a difference between each of the current value based on the induced electromotive force and each of the reference values is obtained for each of the position detection coils 32a and 32c, it is possible to detect the movement amount of the lens 10 in the Y-axis direction based on each of the differences.

By utilizing the relationship between the position of the lens 10 and the induced electromotive force in each of the position detection coils 32a to 32d as described with reference to FIG. 10, for example, it is possible to detect the position R being the position of the lens 10 after the AF/OIS control unit 53 controls to move the lens 10 to the desired position Q, by using the position detection/control unit 50.

Furthermore, when there is a deviation between the desired position Q and the detected position R, it is possible to correct the deviation and move the position to the desired position Q. Therefore, it is possible to move the lens 10 with high accuracy.

The first embodiment employs a configuration in which the position detection coils 32a to 32d are provided along the four sides of the spacer 30. Therefore, even when the induced electromotive force generated in each of the position detection coils 32a to 32d is small, the position detection accuracy can be improved by using the detection result of the induced electromotive force in the position detection coils 32a and 32d provided along two different sides.

(Other Examples of Arrangement of Individual Position Detection Coils)

The arrangement of the position detection coils 32a to 32d applicable to the first embodiment is not limited to the arrangement described with reference to FIG. 4. That is, it is possible to similarly use other arrangements as long as the position detection coils 32a to 32d are arranged so as to be offset from the center of the lens 10 when the lens 10 is positioned at a normal position in a stationary state, not horizontally and vertically symmetrically.

Figure 11A:
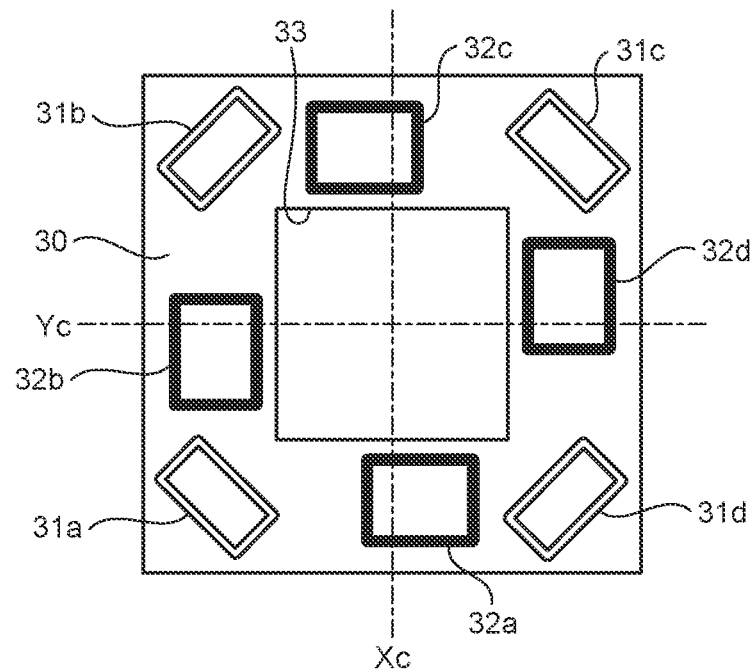
FIG. 11A is a diagram illustrating another example of arrangement of each of position detection coils applicable to the first embodiment.
Figure 11B:
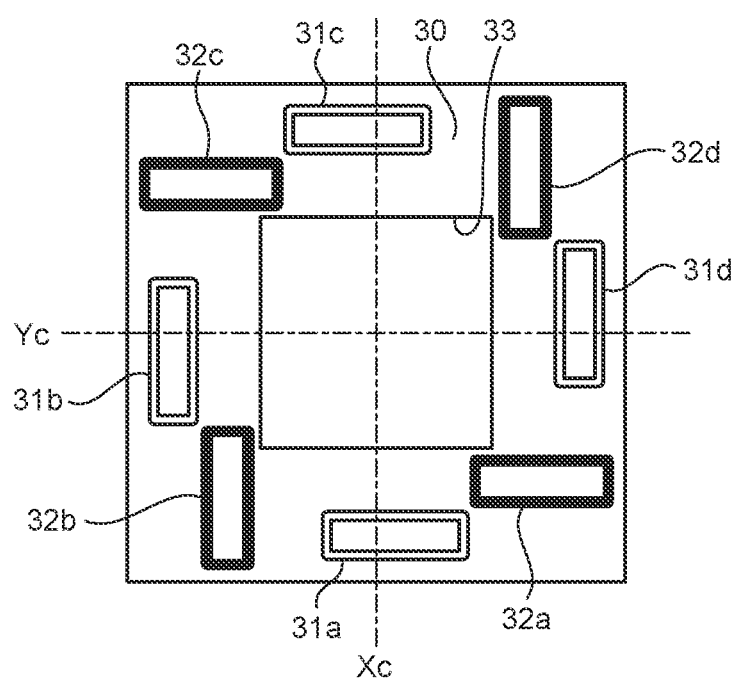
FIG. 11B is a diagram illustrating another example of arrangement of each of position detection coils applicable to the first embodiment.
Figure 11C:
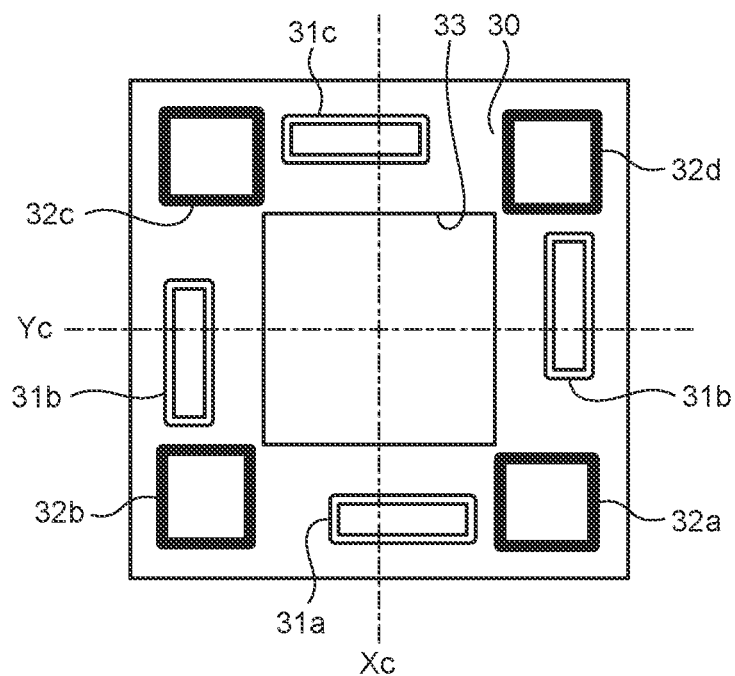
FIG. 11C is a diagram illustrating another example of arrangement of each of position detection coils applicable to the first embodiment.

With reference to FIGS. 11A, 11B and 11C, other examples of the arrangement of the position detection coils 32a to 32d applicable to the first embodiment will be described. FIG. 11A is an example in which the areas of the position detection coils 32a to 32d are increased compared to the example described with reference to FIG. 4. The spacer 30 can be used to mount components for circuits and controls. In this case, when the circuit on which the spacer 30 is mounted is small or the number of components to be mounted is small, the area of each of the position detection coils 32a to 32d can be increased to execute the position detection of the lens 10 with higher accuracy.

FIGS. 11B and 11C are diagrams illustrating an example of the position detection coils 32a to 32d in a case where the magnets 14a to 14d arranged at the four corners of the OIS holder 130 in FIG. 2 are arranged on the four sides of the OIS holder 130. For example, in FIG. 11B, the OIS coils 31a to 31d are arranged on the four sides of the spacer 30 corresponding to the positions of the magnets 14a to 14d, with the position detection coils 32a to 32d being arranged on the four corners of the spacer 30. In this case, the movement amount on the X-axis and the Y-axis described with reference to FIG. 10 is individually obtained as the movement amount with respect to the axis tilted by 45°. Note that, similarly to FIG. 11A, FIG. 11C is an example in which the area of each of the position detection coils 32a to 32d is increased as compared to the example of FIG. 11B.

In this manner, the imaging device 1a according to the first embodiment has a configuration in which the position detection coils 32a to 32d for detecting the position and tilt amount of the lens 10 (lens holder 11) and the OIS coils 31a to 31d for moving the lens 10 (lens holder 11) in the X-Y directions are arranged on the same substrate (spacer 30). This makes it possible to reduce the size and height of the imaging device 1a.

Modification of First Embodiment

Next, a modification of the first embodiment will be described. In the first embodiment described above, four position detection coils 32a to 32d are used to detect the position of the lens 10. In contrast, the modification of the first embodiment is an example in which the position of the lens 10 is detected by using two position detection coils.

Figure 12A:
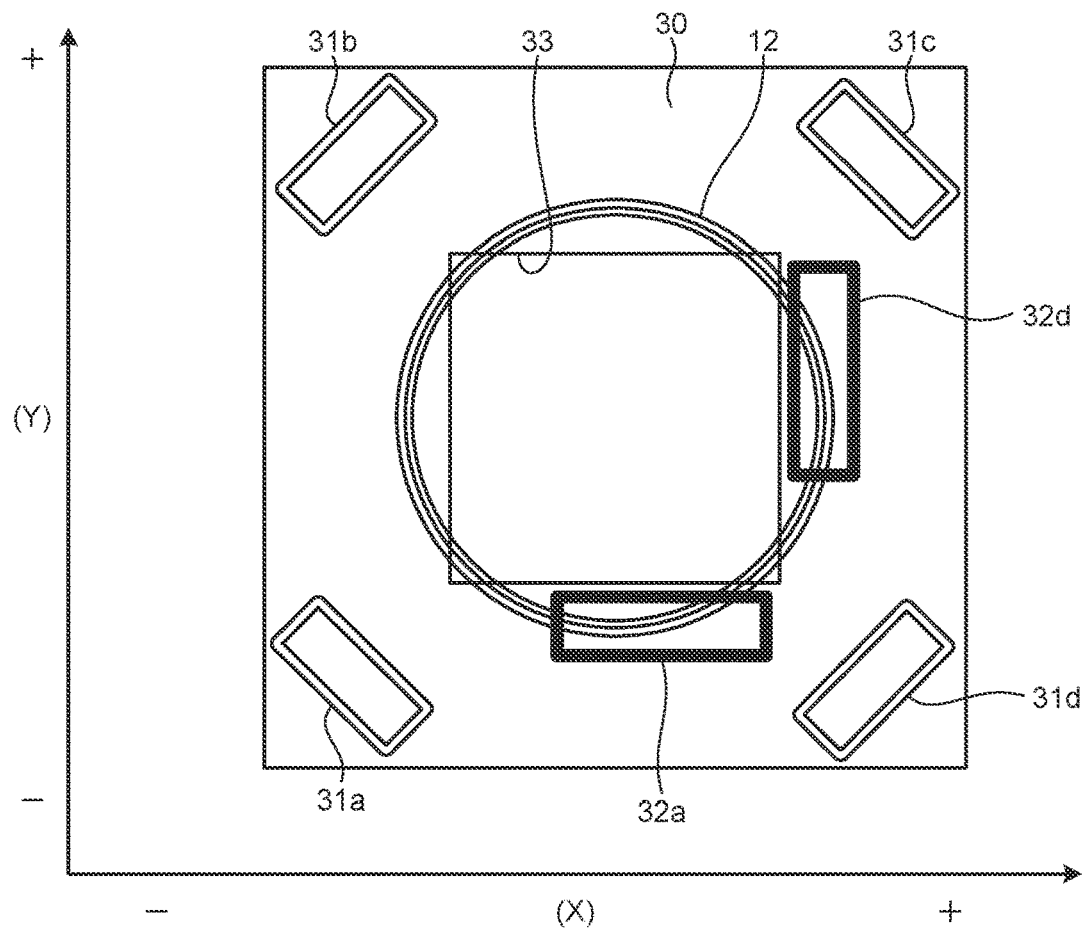
FIG. 12A is a diagram illustrating an arrangement example of position detection coils according to a modification of the first embodiment.

FIG. 12A is a diagram illustrating an arrangement example of position detection coils according to the modification of the first embodiment. In the example of FIG. 12A, among the four position detection coils 32a to 32d described with reference to FIG. 4, the position detection coil 32a for detecting the movement amount in the X-axis direction and the position detection coil 32d for detecting the movement amount in the Y-axis direction are disposed in the spacer 30.

Figure 12B:
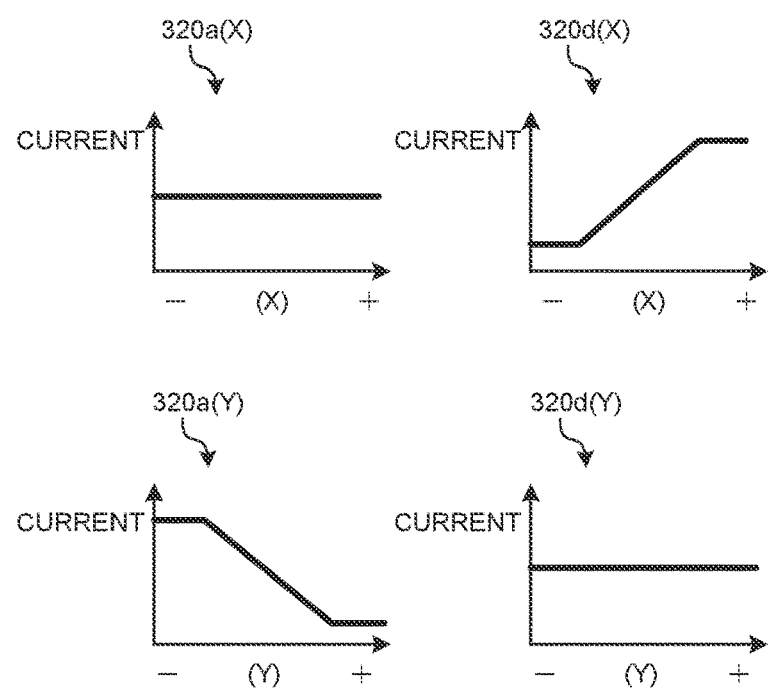
FIG. 12B is a diagram illustrating an example of a transition of an induced electromotive force in each of position detection coils when the lens moves in an X-Y plane, which is applicable to a modification of the first embodiment.

FIG. 12B is a diagram illustrating an example of a transition of an induced electromotive force in each of the position detection coils 32a and 32d when the lens 10 moves by the camera shake correction, for example, in an X-Y plane, which is applicable to the modification of the first embodiment. In FIG. 12B, graphs 320a (X) and 320a (Y) illustrate the transition of the induced electromotive force (output current) in the position detection coil 32a, and are same as the graphs 320a (X) and 320a (Y) in FIG. 10 described above. Furthermore, the graphs 320d (X) and 320d (Y) illustrate the transition of the induced electromotive force in the position detection coil 32d, and are the same as the graphs 320d (X) and 320d (Y) in FIG. 10 described above.

That is, as illustrated in graph 320a (Y), the induced electromotive force generated in the position detection coil 32a gradually decreases as the lens 10 moves from the −Y side to the +Y side. The position of the lens 10 in the Y-axis direction can be detected by using this change in the induced electromotive force. Furthermore, as illustrated in the graph 320a (X), the induced electromotive force generated in the position detection coil 32a has substantially no change with the movement of the lens 10 from the −X side to the +X side. The position of the lens 10 in the X-axis direction can be detected by using this change in the induced electromotive force.

Similarly, as illustrated in the graph 320d (X), the induced electromotive force generated in the position detection coil 32d gradually increases as the lens 10 moves from the −X side to the +X side. The position of the lens 10 in the X-axis direction can be detected by using this change in the induced electromotive force. Furthermore, as illustrated in the graph 320d (Y), the induced electromotive force generated in the position detection coil 32d has substantially no change with the movement of the lens 10 from the −Y side to the +Y side. The position of the lens 10 in the Y-axis direction can be detected by using this change in the induced electromotive force.

For example, the position of the lens 10 in the Y-axis direction can be detected from the measurement result of the induced electromotive force generated in the position detection coil 32a, while the position of the lens 10 in the X-axis direction can be detected from the measurement result of the induced electromotive force generated in the position detection coil 32d.

While the above description is the case where the position detection coils 32a and 32d are provided on the spacer 30 has been described as an example, the present disclosure is not limited to this example. For example, application is possible also with any of configurations having coils on the spacer 30, such as a configuration having the position detection coils 32b and 32c, a configuration having the position detection coils 32b and 32d, a configuration having the position detection coils 32b and 32a, and a configuration having the position detection coils 32b and 32a, so as to be applied as a configuration of a modification of the first embodiment.

When the configuration using the two position detection coils 32a and 32d according to the modification of the first embodiment is adopted, it is possible to reduce the cost as compared with the case where the configuration using the four position detection coils 32a to 32d according to the first embodiment is adopted. Furthermore, in the configuration according to the modification of the first embodiment, it is possible to dispose circuits and members on two sides where no position detection coils 32a and 32d are disposed, enabling achievement of an effect of miniaturization of the device.

On the other hand, when using only two position detection coils 32a and 32d, there is a possibility of deterioration of position detection accuracy as compared to the case of using the four position detection coils 32a to 32d according to the first embodiment described above. To handle this, using a configuration in which the number of turns of the two position detection coils 32a and 32d is increased or the positions of the position detection coils 32a and 32d are arranged as close to the OIS coils 31a and 31d as possible, for example, it would be possible to improve the position detection accuracy.

In addition, it is also possible to change configurations as appropriate for the usage. For example, it is possible to adopt the configuration including the two position detection coils 32a and 32d according to the modification of the first embodiment in a case where no high-accuracy position detection is required, and possible to adopt the configuration including the four position detection coils 32a to 32d according to the first embodiment described above in a case where high-accuracy position detection is required.

Second Embodiment

Next, a second embodiment will be described. The second embodiment is an example of detecting the inclination (tilt) of the lens 10 by using the configuration according to the first embodiment described above. The first embodiment described above has assumed that the lens 10 has no inclination, that is, the light receiving surface of the lens 10 and the imaging element 20 are kept parallel to each other. However, in practice, the lens 10 (lens holder 11) might have an inclination.

That is, the ideal positional relationship between the lens 10 and the imaging element 20 is that the optical axis of the light passing through the lens 10 and the light receiving surface of the imaging element 20 are perpendicular to each other. Here, when at least one of the lens 10, the actuator 13 (OIS holder 130), or the imaging element 20 is mounted with an inclination or has an inclination during use, there is a possibility that the optical axis of light passing through the lens 10 and the light receiving surface of the imaging element 20 would not be perpendicular to each other.

Inclination of the lens 10 might cause an occurrence of distortion in the image captured by the imaging element 20. To handle this, the inclination of the lens 10 is detected based on the induced electromotive force generated in the position detection coils 32a to 32d, enabling the inclination to be corrected based on the detection result.

Figure 13:
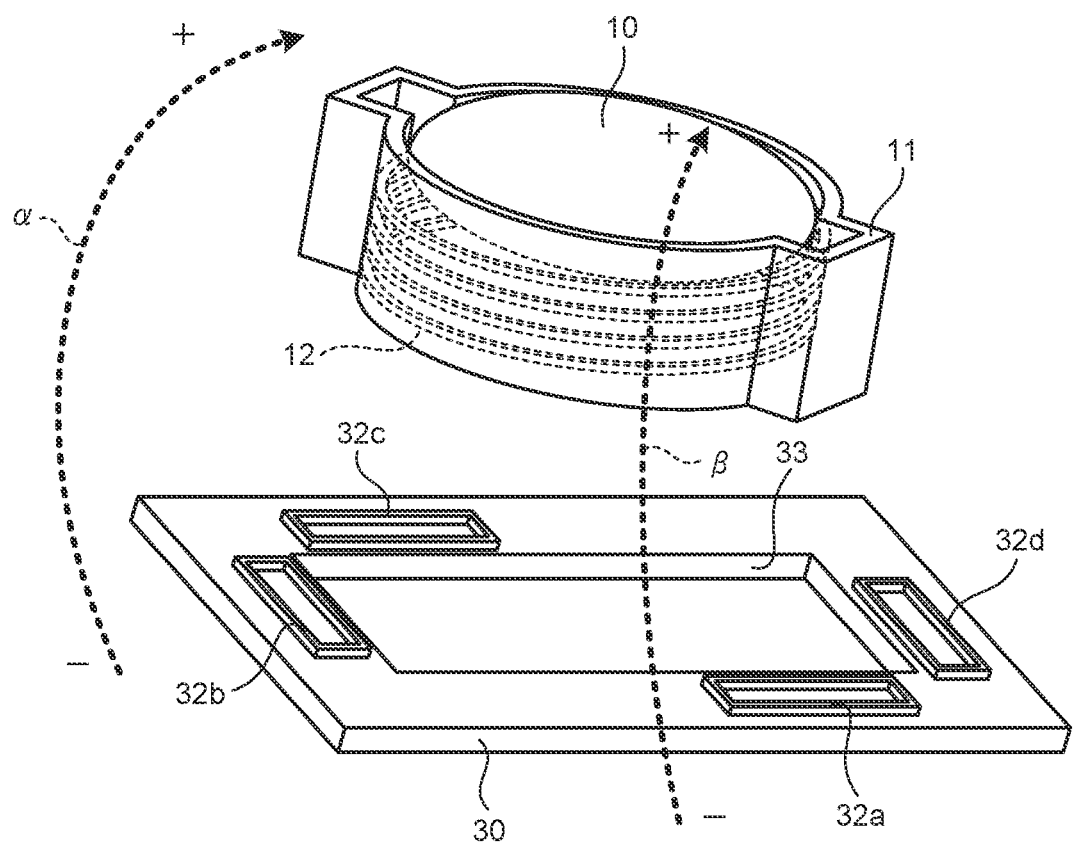
FIG. 13 is a diagram illustrating lens tilt detection according to a second embodiment.

FIGS. 13, 14A and 14B are diagrams illustrating the tilt detection of the lens 10 according to the second embodiment. FIG. 13 schematically illustrates a state in which the lens 10 is inclined with respect to the spacer 30 (imaging element 20). More specifically, in FIG. 13, the lens 10 has an inclination in which the left side (position detection coil 32b side) of FIG. 13 is higher in position compared with the right side (position detection coil 32d side).

The state illustrated in FIG. 13 is a state in which the distances from the AF coil 12 to the position detection coils 32a and 32d are shorter than the distances to the position detection coils 32b and 32c. Therefore, in such a state, the induced electromotive force generated by the position detection coils 32a and 32d would be greater than the induced electromotive force generated by the position detection coils 32b and 32c.

The case where the induced electromotive force generated in the position detection coils 32a to 32d differs depending on the relative positional relationship between the AF coil 12 and the position detection coils 32a to 32d is similar to the case described with reference to FIGS. 9 and 10, for example.

Here, inclination α and inclination β of the lens 10 are defined as illustrated in FIG. 13, 14A and 14B. In addition, in FIGS. 14A and 14B, the lens surface indicates a surface when the lens 10 is assumed to be a flat plate.

The inclination α is inclination in the X-axis direction, and is defined as a positive state when the lens 10 is inclined toward the position detection coil 32*d* while it is defined as a negative state when the lens 10 is inclined toward the position detection coil 32*b*, in the position detection coils 32*b* and 32*d*. In other words, an angle formed by a line segment connecting the position detection coil 32*b* and the position detection coil 32*d*, and the light receiving surface of the imaging element 20, is defined as the inclination α. In addition, the state where the position detection coil 32*b* is inclined toward the side closer to the AF coil 12 is defined as positive, while the state where it is inclined toward the side closer to the position detection coil 32*b* is defined as positive (refer to FIG. 14A).

Similarly, the inclination β is inclination in the Y-axis direction, and is defined as a positive state when the lens 10 is inclined toward the position detection coil 32*a* while it is defined as a negative state when the lens 10 is inclined toward the position detection coil 32*c*, out of the position detection coils 32*a* and 32*c*. In other words, an angle formed by a line segment connecting the position detection coil 32*a* and the position detection coil 32*c*, and the light receiving surface of the imaging element 20, is defined as the inclination β. In addition, the state where the position detection coil 32*a* is inclined toward the side closer to the AF coil 12 is defined as positive, while the state where it is inclined toward the side closer to the position detection coil 32*c* is defined as negative (refer to FIG. 14B).

FIG. 15 is a diagram illustrating an example of a transition of the induced electromotive force in each of the position detection coils 32*a* to 32*d* when the lens 10 has inclination, which is applicable to the second embodiment. In FIG. 15, graphs 320*a* (α) and 320*a* (β) illustrate the transitions of the induced electromotive force in the position detection coil 32*a*. Graphs 320*b* (α) and 320*b* (β) illustrate the transitions of the induced electromotive force in the position detection coil 32*b*. Graphs 320*c* (α) and 320*c* (β) illustrate the transitions of the induced electromotive force in the position detection coil 32*c*. Graphs 320*d* (α) and 320*d* (β) illustrate the transitions of the induced electromotive force in the position detection coil 32*d*.

Vertical and horizontal axes of each graph 320*a* (α), 320*a* (β), 320*b* (α), 320*b* (β), 320*c* (α), 320*c* (β), 320*d* (α) and 320*d* (β) in FIG. 15 have the same meaning as the graphs in FIG. 10 described above, the description here will be omitted.

As an example, referring to the graph 320*a* (α) related to the position detection coil 32*a*, when the inclination a changes from negative to positive, in other words, when the position detection coil 32*a* is inclined in the direction approaching the AF coil 12, the induced electromotive force increases. Furthermore, referring to the graph 320*a* (β) related to the position detection coil 32*a*, when the inclination β changes from negative to positive, in other words, when the position detection coil 32*a* is inclined in the direction away from the AF coil 12, the induced electromotive force decreases.

Furthermore, referring to the graph 320*b* (α) related to the position detection coil 32*b*, when the inclination α changes from negative to positive, in other words, when the position detection coil 32*b* is inclined in the direction away from the AF coil 12, the induced electromotive force decreases. Furthermore, referring to the graph 320*b* (β) related to the position detection coil 32*b*, when the inclination β changes from negative to positive, in other words, when the position detection coil 32*b* is inclined in the direction approaching the AF coil 12, the induced electromotive force increases.

Furthermore, referring to the graph 320*c* (α) related to the position detection coil 32*c*, when the inclination α changes from negative to positive, in other words, when the position detection coil 32*c* is inclined in the direction away from the AF coil 12, the induced electromotive force decreases. Furthermore, referring to the graph 320*c* (β) related to the position detection coil 32*c*, when the inclination β changes from negative to positive, in other words, when the position detection coil 32*c* is inclined in the direction approaching the AF coil 12, the induced electromotive force increases.

Furthermore, referring to the graph 320*d* (α) related to the position detection coil 32*d*, when the inclination α changes from negative to positive, in other words, when the position detection coil 32*d* is inclined in the direction approaching the AF coil 12, the induced electromotive force increases. Furthermore, referring to the graph 320*d* (β) related to the position detection coil 32*d*, when the inclination β changes from negative to positive, in other words, when the position detection coil 32*d* is inclined in the direction away from the AF coil 12, the induced electromotive force decreases.

For example, the induced electromotive force when the lens 10 has no inclination in the X-axis direction (when the inclination α=0) is defined as a reference (reference value). When the absolute value of the difference between the induced electromotive force of the position detection coil 32*a* and the reference value is equal to the absolute value of the difference between the induced electromotive force of the position detection coil 32*c* and the reference value, it can be determined that there is no inclination in the X-axis direction. When the values are not equal, it can be determined that there is an inclination in the X-axis direction.

In addition, when it is determined that there is an inclination, the position of the AF coil 12 with respect to the position detection coil 32*a* and the position of the AF coil 12 with respect to the position detection coil 32*c* can be obtained from the magnitude of the induced electromotive force, making it possible to calculate the inclination α based on the positional relationship. Furthermore, after acquisition of the inclination α, it is possible to calculate a correction amount for canceling the inclination α, and also possible to correct the inclination based on the correction amount.

While the above description is an example of a method of detecting the inclination a of the lens 10 in the X-axis direction using the two position detection coils 32*a* and 32*c* disposed in the X-axis direction, the present disclosure is not limited to this example. That is, the inclination α may be detected by using another method (calculation) based on the induced electromotive force of the position detection coils 32*a* and 32*c*. Furthermore, while the above description uses the combination of the two position detection coils 32*a* and the position detection coil 32*c* disposed in the X-axis direction, the present disclosure is not limited to this example. That is, in order to detect the inclination α, it is allowable to use a combination of the position detection coils 32*b* and 32*d*, a combination of the position detection coils 32*b* and 32*c*, and a combination of the position detection coils 32*a* and 32*d*.

The inclination β in the Y-axis direction can also be detected similarly to the case of the inclination α described above. In this case, the inclination β in the Y-axis direction can be detected and corrected based on the induced electromotive forces of the two position detection coils 32*b* and 32*d* disposed in the Y-axis direction. Furthermore, not limited to the combination of the position detection coils 32b and 32d, it is allowable to use, for example, a combination of the position detection coils 32a and 32c, a combination of the position detection coils 32b and 32c, and a combination of the position detection coils 32a and 32d.

In this manner, according to the second embodiment, the positions of the lens 10 in the X-axis direction, the Y-axis direction, and the Z-axis direction and the inclination of the lens 10 can be detected, individually. Therefore, camera shake correction can be performed not only in the X-Y direction but also as the tilt correction, making it possible to provide a more sophisticated imaging device 1a.

Furthermore, the above-described inclination detection can be executed at the time of manufacturing the imaging device 1a. When an inclination is detected, correction can be performed. Furthermore, when the detected inclination is a predetermined level or more, it would be possible to take measures such as removing the faulty product from the manufacturing line. This makes it possible to improve the problem of the optical axis misalignment in the performance test after manufacturing, and leading to suppression of the manufacturing cost.

Third Embodiment

Next, a third embodiment will be described. The third embodiment is an example of detecting the position of the lens 10 in the Z-axis direction by using the configuration according to the first embodiment described above.

Figure 16:
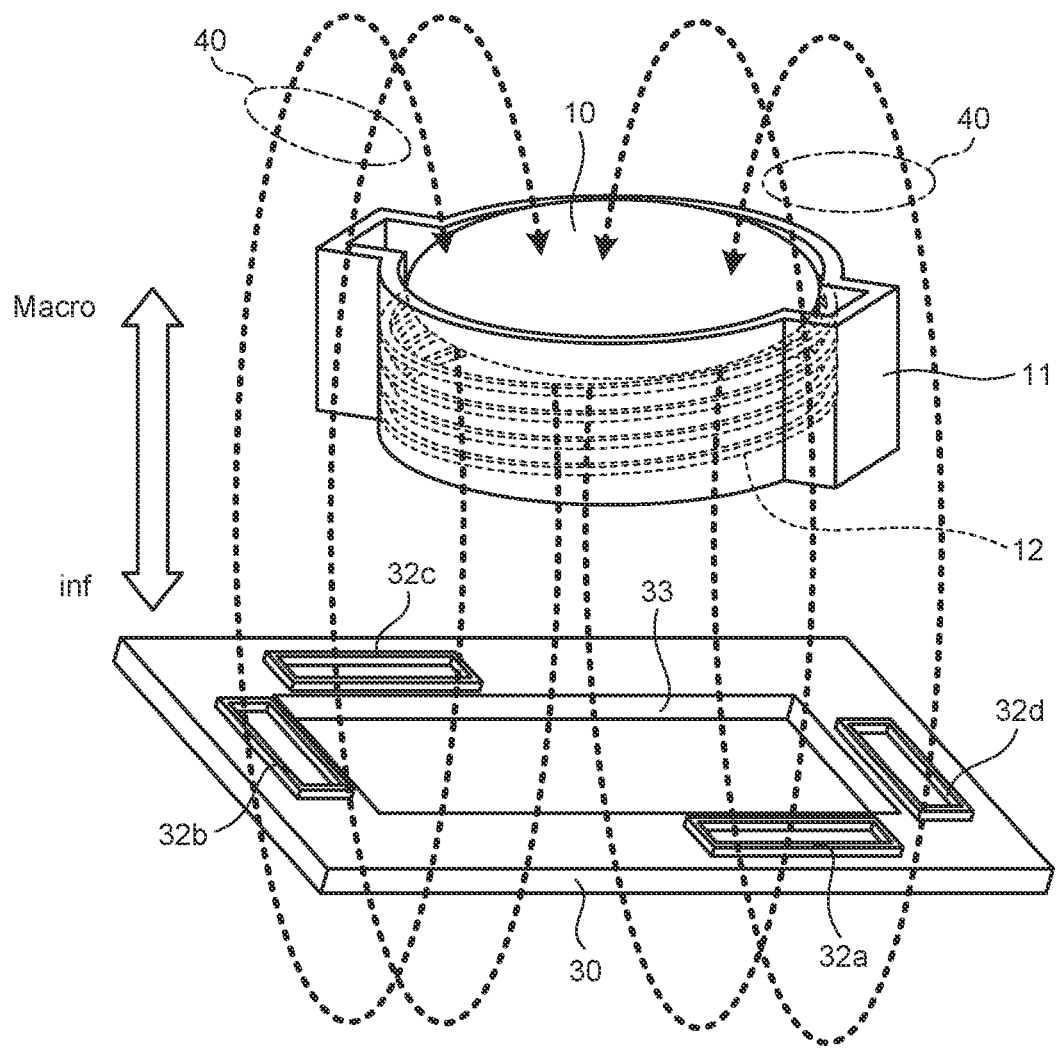
FIG. 16 is a diagram illustrating position detection in the Z-axis direction according to a third embodiment.
Figure 17:
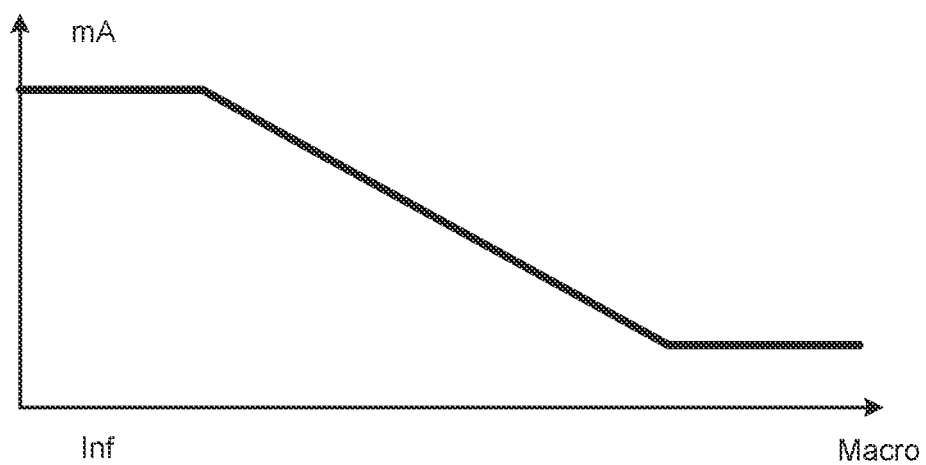
FIG. 17 is a diagram illustrating position detection in the Z-axis direction according to the third embodiment.

FIGS. 16 and 17 are diagrams illustrating position detection in the Z-axis direction according to the third embodiment. First, with reference to FIG. 16, the magnetic field 40 generated by the AF coil 12 with the current generated by the PWM signal, and the induced electromotive force generated by the position detection coils 32a to 32d due to the magnetic field 40, will be described. When a current is applied through the AF coil 12 formed on the side surface of the lens holder 11, a force is generated in the up-down direction (Z-axis direction) in FIG. 16. This generated force moves the lens holder 11 (the lens 10 held by the lens holder 11) in the upper direction or the lower direction, and this movement changes the distance between the lens 10 and the imaging element 20. With such a mechanism, autofocus is implemented. More specifically, the direction in which the lens 10 moves upward and away from the imaging element 20 is a macro direction, while the direction in which the lens 10 moves downward and approaches the imaging element 20 is an infinity (Inf) direction.

When the magnetic field 40 generated by the AF coil 12 reaches the position detection coils 32a to 32d, dielectric electromotive force caused by the magnetic field 40 generated by the AF coil 12 is generated in each of the position detection coils 32a to 32d. Also in this case, when the AF coil 12 and the position detection coils 32a to 32d are far away from each other, the dielectric electromotive force generated by the position detection coils 32a to 32d is small. When the AF coil 12 and the position detection coils 32a to 32d are close to each other, the dielectric electromotive force generated by the position detection coils 32a to 32d is great.

By measuring each of the dielectric electromotive forces generated by each of the position detection coils 32 to 32d and integrating the measured values, it is possible to detect the position of the lens 10 in the Z-axis direction. The macro macro direction illustrated in FIG. 16, that is, the direction in which the lens 10 goes away from the imaging element 20 (not illustrated) is defined as positive (+Z side), and the infinity (Inf) direction, that is, the direction in which the lens 10 approaches the imaging element 20 is defined as negative (−Z side).

FIG. 17 is a diagram illustrating an example of the relationship between the position of the lens 10, that is, the AF coil 12 in the Z-axis direction, and the integrated value of the induced electromotive force generated by the position detection coils 32a to 32d. As illustrated in FIG. 17, when the lens (AF coil 12) moves in the macro direction, that is, from the −Z side to the +Z side, in other words, when the lens 10 changes from the state closer to the position detection coils 32 to 32d to the state moving away from the coils, the dielectric electromotive force gradually decreases.

In this manner, according to the third embodiment, by measuring the dielectric electromotive force generated in each of the position detection coils 32a to 32d and calculating the integrated value, it is possible to detect the position of the lens 10 in the Z-axis direction.

Fourth Embodiment

Next, a fourth embodiment will be described. The fourth embodiment is an example of a combination of the first embodiment, the second embodiment, and the third embodiment described above. That is, the fourth embodiment is an example of detecting the positions of the lens 10 in the X, Y, and Z axis directions and the tilt amount of the lens 10 by using the configuration according to the first embodiment described above.

Figure 18:
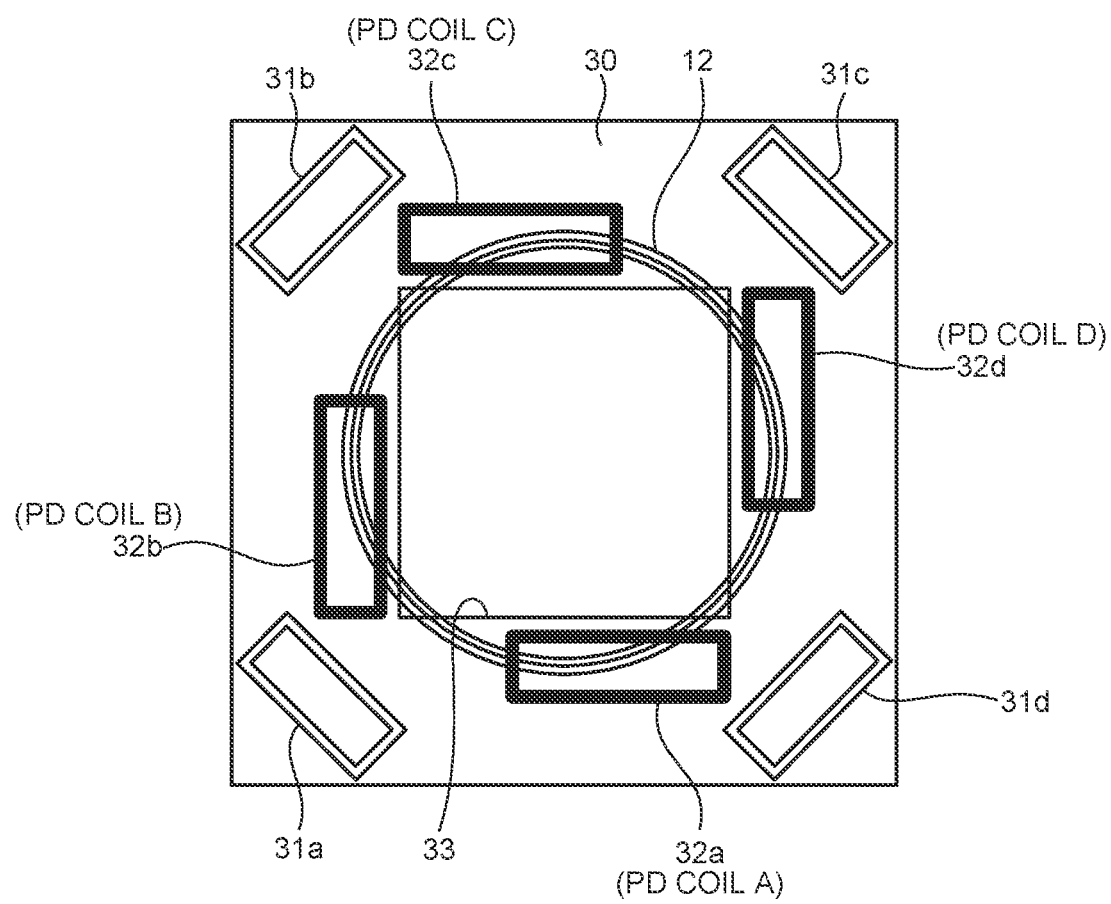
FIG. 18 is a diagram illustrating an example of arrangement of each of position detection coils used in the description of a fourth embodiment.

FIG. 18 is a diagram illustrating an example of arrangement of the position detection coils 32a to 32d used in the description of the fourth embodiment. As illustrated in FIG. 18, the following is an example in which the position detection coils 32a to 32d are arranged at positions corresponding to the individual sides of the spacer 30 described with reference to FIG. 4 in the first embodiment. In FIG. 18, each of the position detection coils 32a to 32d is defined as a PD coil A, a PD coil B, a PD coil C, and a PD coil D, and current values regarding the currents output from the four coils in accordance with the induced electromotive force are defined as values $C_A$, $C_B$, $C_C$ and $C_D$, respectively.

Figure 19:
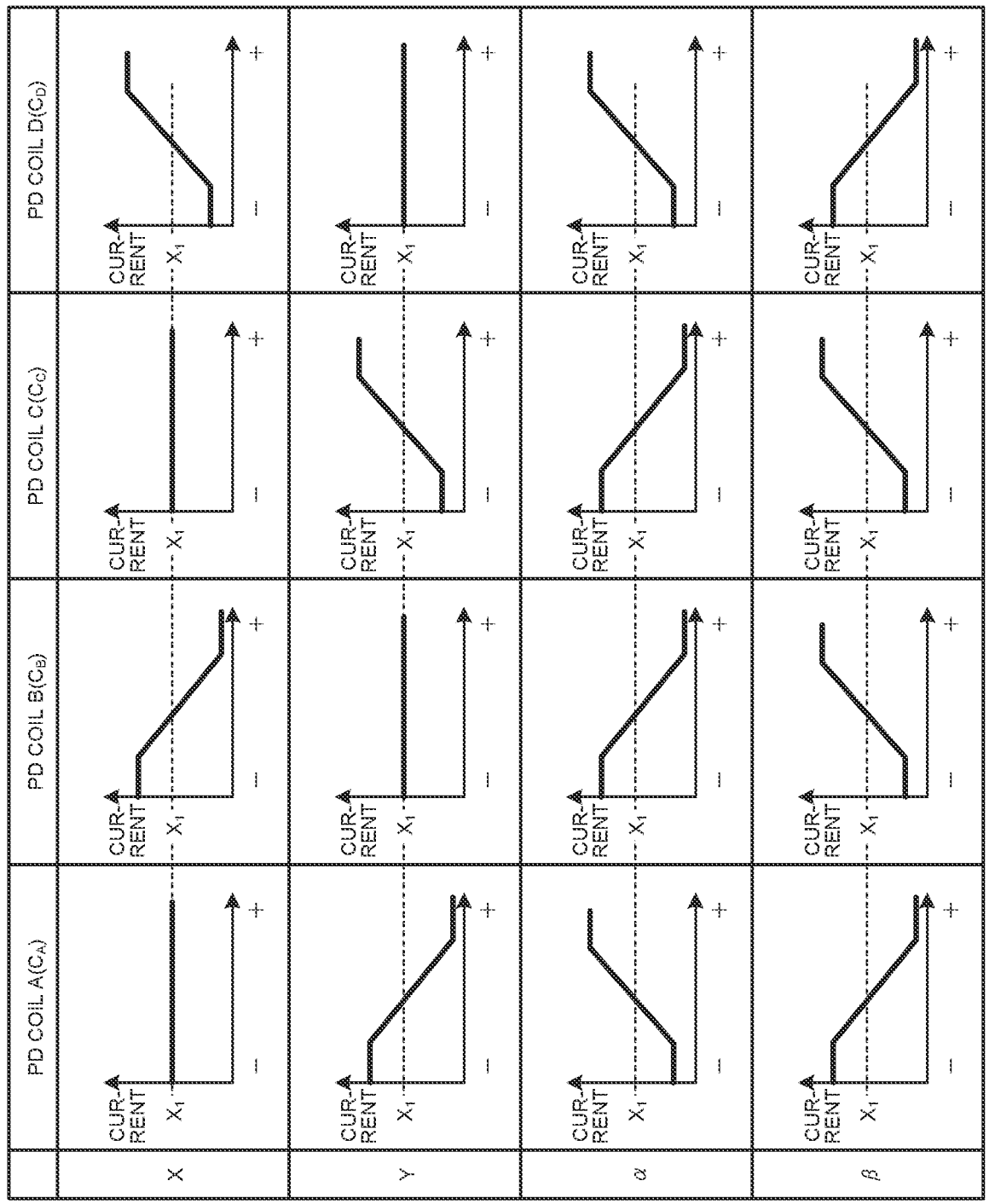
FIG. 19 is a diagram summarizing each of graphs according to the fourth embodiment for each of position detection coils in a column direction and for each of detection targets in a row direction.

FIG. 19 is a diagram including the graphs illustrated in FIGS. 10 and 15 described above according to the fourth embodiment, having the position detection coils 32a to 32d illustrated in the column direction and the detection targets (X-axis direction, Y-axis direction, inclination α, and inclination β) illustrated in the row direction. In FIG. 19, individual graphs in the column of the PD coil A correspond to graphs 320a (X), 320a (Y), 320a (α), and 320a (β) from the top row, individually. Individual graphs in the column of the PD coil B correspond to graphs 320b (X), 320b (Y), 320b (α), and 320b (β) from the top row, individually. Individual graphs in the column of the PD coil C correspond to graphs 320c (X), 320c (Y), 320c (U), and 320c (β) from the top row, individually. Individual graphs in the column of the PD coil D correspond to graphs 320d (X), 320d (Y), 320d (α), and 320d (β) from the top row, individually.

Note that a value $X_1$ on the vertical axis of each of the graphs in FIG. 19 represents an output current based on the induced electromotive force of each of the position detection coils 32a to 32d in a state of the ideal position of the lens 10, that is, where the optical center position of the lens 10 is aligned with the center position of the light receiving surface of the imaging element 20. Here, the output current at the ideal position of the lens 10 might be different in each of the position detection coils 32a to 32d. Each of the graphs indicates, for example, a value normalized by the output current at the ideal position of the lens 10 in each of the position detection coil 32a to 32d. Not limited to this, the values $X_1$ corresponding to the position detection coils 32a to 32d may be different values. In the following, unless otherwise specified, the value $X_1$ will be described as the reference value $X_1$.

FIG. 20 is a diagram illustrating an example of calculation conditions and calculation formulas for X-axis tilt amount (inclination α), Y-axis tilt amount (inclination β), X-axis direction movement amount, Y-axis direction movement amount, and AF movement amount (Z-axis direction movement amount) according to the fourth embodiment.

In the position detection/control unit 50 (refer to FIG. 7), the AF/OIS control unit 53 performs each of calculations in FIG. 20 based on digital values corresponding to the output currents of the position detection coils 32a to 32d supplied from the AD converters 52a to 52d, respectively. At this time, the AF/OIS control unit 53 executes calculation from the upper row in FIG. 20 in the order of X-axis tilt amount, Y-axis tilt amount, X-axis direction movement amount, Y-axis direction movement amount, and AF movement amount, for example. In this order, the order of calculation for the X-axis and the Y-axis is interchangeable. The AF movement amount can be calculated in any order.

The AF/OIS control unit 53 can execute each calculation illustrated in FIG. 20 at a regular cycle. In addition, the AF/OIS control unit 53 can execute each of calculations in FIG. 20 in accordance with the sensing of vibration by the gyro sensor 25.

A calculation method of the X-axis tilt amount will be described. The AF/OIS control unit 53 determines that the X-axis tilt has occurred in a case where the values $C_A$, $C_B$, $C_C$ and $C_D$ based on the output currents of the position detection coils 32a to 32d satisfy the following Formula (2). Note that, in Formula (2) and Formula (4) described below, the symbol "∧" represents a logical product and the symbol "∨" represents a logical sum.

$$(X_1 > C_A \wedge X_1 < C_B \wedge X_1 < C_C \wedge X_1 > C_D) \vee \\ (X_1 < C_A \wedge X_1 > C_B \wedge X_1 > C_C \wedge X_1 < C_D) \quad (2)$$

When the AF/OIS control unit 53 has determined that the X-axis tilt has occurred based on Formula (2), the AF/OIS control unit 53 calculates an X-axis tilt amount $X_{tilt}$ by the following Formula (3). More specifically, the AF/OIS control unit 53 obtains differences between the output current values of the position detection coils 32a to 32d and the reference value $X_1$ and then, calculates the sum of the obtained differences. The X-axis tilt amount $X_{tilt}$ is calculated by multiplying the sum of the obtained differences by a coefficient $X_2$ for calculating the X tilt amount (angle) from the induced electromotive force.

$$X_{tilt} = \{(C_A - X_1) + (X_1 - C_B) + (X_1 - C_C) + (C_D - X_1)\} \times X_2 \quad (3)$$

A calculation method of the Y-axis tilt amount will be described. The AF/OIS control unit 53 determines that the Y-axis tilt has occurred in a case where the values $C_A$, $C_B$, $C_C$ and $C_D$ based on the output currents of the position detection coils 32a to 32d satisfy the following Formula (4).

$$(X_1 < C_A \wedge X_1 > C_B \wedge X_1 > C_C \wedge X_1 < C_D) \vee \\ (X_1 > C_A \wedge X_1 < C_B \wedge X_1 < C_C \wedge X_1 > C_D) \quad (4)$$

When the AF/OIS control unit 53 has determined that the Y-axis tilt has occurred based on Formula (2), the AF/OIS control unit 53 calculates a Y-axis tilt amount $Y_{tilt}$ by the following Formula (5). More specifically, the AF/OIS control unit 53 obtains differences between the output current values of the position detection coils 32a to 32d and the reference value $X_1$ and then, calculates the sum of the obtained differences. The Y-axis tilt amount $Y_{tilt}$ is calculated by multiplying the sum of the obtained differences by a coefficient $X_3$ for calculating the Y tilt amount (angle) from the induced electromotive force.

$$Y_{tilt} = \{(X_1 - C_A) + (C_B - X_1) + (C_C - X_1) + (X_1 - C_D)\} \times X_3 \quad (5)$$

A calculation method of the movement amount in the X-axis direction will be described. In the calculation of the movement amount in the X-axis direction, there is no particular condition for the output current value of the position detection coils 32a to 32d, and thus, the AF/OIS control unit 53 can execute the calculation at any timing. Based on the values $C_B$ and $C_D$ based on the output currents of the position detection coils 32b and 32d disposed in the X-axis direction and based on the X-axis tilt amount ($X_{tilt}$) calculated by Formula (3), the AF/OIS control unit 53 calculates an X-axis direction movement amount $X_{move}$ by using the following formula (6).

$$X_{move} \{(C_B - X_1) + (X_1 - C_D)\} \times X_4 - X_{tilt} \times X_5 \quad (6)$$

In Formula (6), the coefficient $X_4$ is a coefficient for calculating the movement amount in the X-axis direction from the induced electromotive force. Moreover, the influence of the X-axis tilt is eliminated by subtracting the X-axis tilt amount $X_{tilt}$.

A calculation method of the movement amount in the Y-axis direction will be described. Similarly to the calculation of the X-axis direction movement amount described above, there is no particular condition, in the calculation of the movement amount in the Y-axis direction, for the output current value of the position detection coils 32a to 32d, and thus, the AF/OIS control unit 53 can execute the calculation at any timing. Based on the values $C_A$ and $C_C$ based on the output currents of the position detection coils 32a and 32c arranged in the Y-axis direction and based on the Y-axis tilt amount ($Y_{tilt}$) calculated by Formula (5), the AF/OIS control unit 53 calculates a Y-axis direction movement amount $Y_{move}$ by using the following Formula (7).

$$Y_{move} \{(C_A - X_1) + (X_1 - C_C)\} \times X_6 - Y_{tilt} \times X_7 \quad (7)$$

In Formula (7), the coefficient $X_6$ is a coefficient for calculating the movement amount in the Y-axis direction from the induced electromotive force. Moreover, the influence of the Y-axis tilt is eliminated by subtracting the Y-axis tilt amount $Y_{tilt}$.

A calculation method of the AF movement amount will be described. Similarly to the calculation of the X-axis direction movement amount and the Y-axis direction movement amount described above, there is no particular condition, in the calculation of the AF movement amount, for the output current value of the position detection coils 32a to 32d, and thus, the AF/OIS control unit 53 can execute the calculation at any timing.

As described above, the position of the lens 10 in the Z-axis direction is detected based on the integrated value of the dielectric electromotive force generated in each of the position detection coils 32a to 32d. Based on the output current values $C_A$, $C_B$, $C_C$ and $C_D$ of each of the position detection coils 32a to 32d, the AF/OIS control unit 53 calculates an AF movement amount $AF_{move}$ by using the following Formula (8). In Formula (8), the coefficient $X_8$ is a coefficient for calculating the AF movement amount from the induced electromotive force.

$$AF_{move} = (C_A + C_B + C_C + C_D) \times X_8 \quad (8)$$

The calculation methods of the X-axis tilt amount, the Y-axis tilt amount, the X-axis direction movement amount, the Y-axis direction movement amount, and the AF movement amount described with reference to FIG. 20 are examples, and the present disclosure is not limited to these examples. That is, other methods can be applied as long as the method measures the induced electromotive force of each position detection coil 32a to 32d and performs position detection based on the measured induced electromotive force.

Fifth Embodiment

Next, a fifth embodiment will be described. The fifth embodiment is an example in which the AF coil 12 is not provided on the lens holder 11 as compared to the imaging device 1a according to the first embodiment described with reference to FIGS. 1 and 2. FIG. 21 is a view illustrating an exemplary configuration of an imaging device according to the fifth embodiment.

In FIG. 21, an imaging device 1b has a configuration similar to the imaging device 1a according to the first embodiment described with reference to FIG. 1 except that the lens holder 11 does not include the AF coil 12 in an actuator 13'. That is, the imaging device 1b has a configuration in which the OIS holder 130 is arranged so as to be movable in the X-Y direction with respect to the spacer 30, and the OIS coils 31a to 31d and the position detection coils 32a to 32d are disposed on the spacer 30. As for the arrangement of the OIS coils 31a to 31d and the position detection coils 32a to 32d in the spacer 30, the arrangement described with reference to FIGS. 4, 11A, 11B, and 11C can be applied. It is also allowable to employ the arrangement using two position detection coils as described with reference to FIGS. 12A and 12B.

The imaging device 1b has a configuration in which the OIS coils 31a to 31d are provided so as to face in parallel with the magnets 14a to 14d provided on the OIS holder 130. This configuration makes it possible to implement the camera shake correction function similarly to the case of the first embodiment. In addition, by measuring, with the position detection coils 32a to 32d, the induced electromotive force generated in accordance with the magnetic field generated at execution of the camera shake correction function by each of the OIS coils 31a to 31d, it is possible detect the X-axis direction movement amount and Y-axis direction movement amount of the lens (lens holder 11).

In this manner, similarly to the imaging device 1a of the first embodiment described above, the imaging device 1b according to the fifth embodiment has also a configuration in which the position detection coils 32a to 32d for detecting the position of the lens 10 (lens holder 11) and the OIS coils 31a to 31d for moving the lens 10 (lens holder 11) in the X-Y directions are arranged on the same substrate (spacer 30). This makes it possible to reduce the size and height of the imaging device 1b.

Sixth Embodiment

Next, a sixth embodiment will be described. In the imaging device 1a according to the first embodiment described above, the imaging element 20 is provided on the circuit substrate 21, and the imaging element 20 and the circuit substrate 21 are electrically connected to each other by a metal wire 23 so as to implement the imaging element 20. In contrast, in the sixth embodiment, the imaging element 20 for the circuit substrate 21 is mounted on the circuit substrate 21 by flip chip bonding.

FIG. 22 is a view illustrating an example of an imaging device by using flip chip bonding according to the sixth embodiment. In FIG. 22, an imaging device 1c has a configuration in which an imaging element 60 corresponding to the above-described imaging element 20 is mounted on the circuit substrate 21 using flip chip bonding, and the imaging element 60 and the circuit substrate 21 are electrically connected with each other via bumps 61 which are protruding terminals. Furthermore, the circuit substrate 21 is provided with a protective material 62 that serves as a protection against the imaging element 60 when the imaging element 60 is mounted.

In FIG. 22, similarly to FIG. 1, a spacer 30 is provided on the circuit substrate 21, and an OIS coil 31 and a position detection coil 32 are provided on the spacer 30. On the spacer 30, an OIS holder 130 including a magnet 14 is arranged so as to be movable in the X-Y directions. The OIS holder 130 stores the lens holder 11 that holds the lens 10 and provided with the AF coil 12, movably in the Z-axis direction.

In this manner, even in the configuration including the imaging element 60 mounted with flip chip bonding, it is possible to detect, with the position detection coil 32, the change in the magnetic field 40 generated in the AF coil 12 similarly to the case the first embodiment described above. With this configuration, the imaging device 1c can acquire the X-axis direction movement amount, the Y-axis direction movement amount, the AF movement amount, and the tilt amount of the lens 10 (AF coil 12), and can correct the position of the lens 10 based on each of the acquired values.

In this manner, similarly to the imaging device 1a of the first embodiment described above, the imaging device 1c according to the sixth embodiment has also a configuration in which the position detection coils 32a to 32d for detecting the position and the tilt amount of the lens 10 and the OIS coils 31a to 31d for moving the lens 10 in the X-Y directions are arranged on the same substrate (spacer 30). This makes it possible to reduce the size and height of the imaging device 1c.

Seventh Embodiment

Next, a seventh embodiment will be described. The seventh embodiment is an example using an imaging element having a Chip Size Package (CSP) structure, which is an extremely small package having the substantially same size as a single chip.

FIG. 23 is a view illustrating an exemplary configuration of an imaging device using an imaging element having a CSP structure according to the seventh embodiment. In FIG. 23, an imaging device 1d includes an imaging element 70 having a CSP structure corresponding to the above-described imaging element 20.

The imaging element 70 is formed with two-layer structures including, for example, a first chip in which light receiving elements are arranged in an array, and a second chip including a circuit for controlling the light receiving element and performing signal processing regarding a signal output from the light receiving element. Furthermore, the imaging element 70 includes a glass substrate for fixing the elements and protecting the light receiving surface disposed for the light receiving surfaces arranged in an array. Furthermore, in the example of FIG. 23, an infrared light cut-off filter 15 is disposed for the glass substrate. The imaging element 70 is adhered and fixed to the spacer 30 and the circuit substrate 21 with an adhesive 71.

The other parts of the imaging device 1d illustrated in FIG. 23 are equivalent to the configurations described with reference to FIG. 1. For example, similarly to FIG. 1, the imaging element 70 is adhered to and arranged on the spacer 30 provided on the circuit substrate 21, and the OIS coil 31 and the position detection coil 32 are provided for the spacer 30. On the spacer 30, an OIS holder 130 including a magnet 14 is arranged so as to be movable in the X-Y directions. The OIS holder 130 stores the lens holder 11 that holds the lens 10 and provided with the AF coil 12, movably in the Z-axis direction.

In this manner, even in the case including the imaging element 70 having a CSP structure, it is possible to detect, with the position detection coil 32, the change in the magnetic field 40 generated in the AF coil 12 similarly to the case the first embodiment described above. With this configuration, the imaging device 1d can acquire the X-axis direction movement amount, the Y-axis direction movement amount, the AF movement amount, and the tilt amount of the AF coil 12 (lens 10), and can correct the position of the lens 10 based on each of the acquired values.

Similarly to the imaging device 1a of the first embodiment described above, the imaging device 1d according to the seventh embodiment has also a configuration in which the position detection coils 32a to 32d for detecting the position and the tilt amount of the lens 10 and the OIS coils 31a to 31d for moving the lens 10 in the X-Y directions are arranged on the same substrate (spacer 30). This makes it possible to reduce the size and height of the imaging device 1d.

In addition, by providing the infrared light cut-off filter 15 on the glass substrate of the imaging element 70, the thickness of the infrared light cut-off filter 15 can be reduced. This makes it possible to further reduce the height of the imaging device 1d.

Eighth Embodiment

Next, an eighth embodiment will be described. The eighth embodiment is an example in the seventh embodiment described above in which the lowermost layer lens among the plurality of lenses included in the lens 10 is separated from the lens holder 11 and arranged on the imaging element side of the CSP structure.

Figure 24:
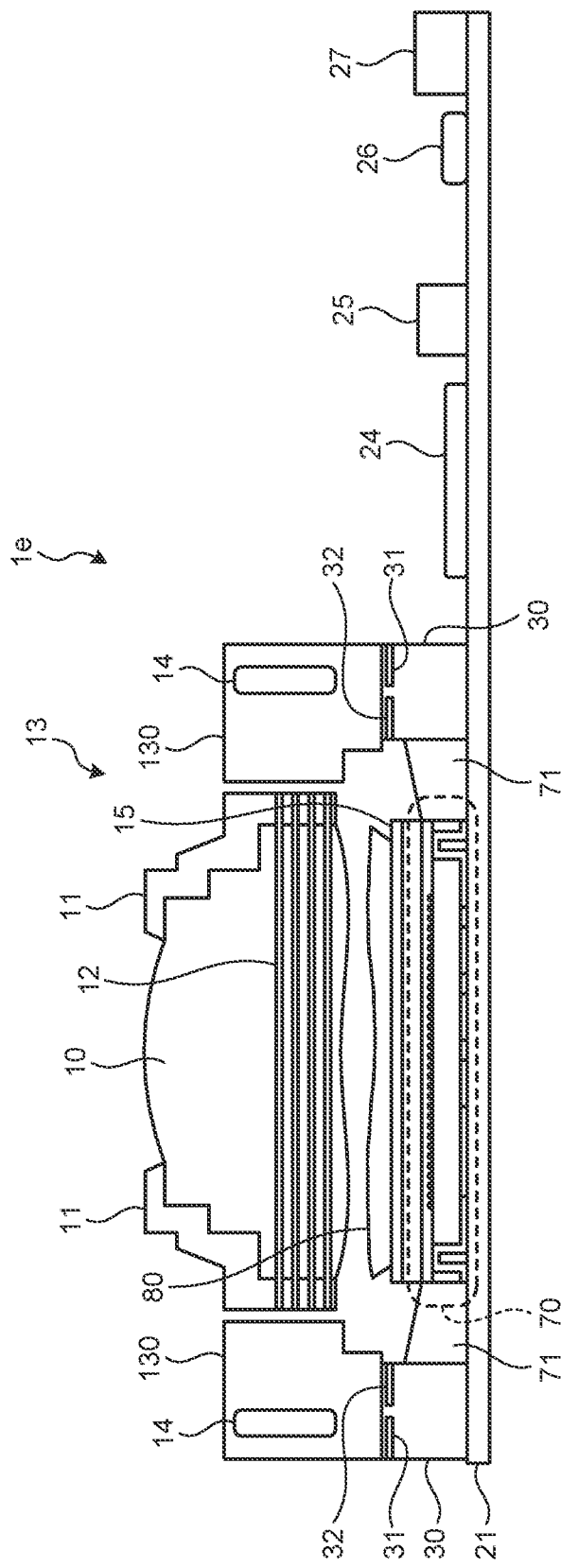
FIG. 24 is a diagram illustrating an exemplary configuration of an imaging device according to an eighth embodiment.

FIG. 24 is a view illustrating an exemplary configuration of an imaging device according to the eight embodiment. In FIG. 24, an imaging device 1e has a configuration in which a lens 80 of the lowermost layer among the plurality of lenses included in the lens 10 is arranged on the infrared light cut-off filter 15 on the imaging element 70. Similarly to the example of FIG. 23, in the imaging device 1d, by providing the infrared light cut-off filter 15 on the glass substrate of the imaging element 70, the thickness of the infrared light cut-off filter 15 can be reduced. This makes it possible to reduce the height of the imaging device 1d. Furthermore, the lens 80 of the lowermost layer among the plurality of lenses included in the lens 10 is arranged on the imaging element 70 side, enabling further reduction in height.

The other parts of the imaging device 1d illustrated in FIG. 24 are equivalent to the configurations described with reference to FIGS. 1 and 7. For example, similarly to FIGS. 1 and 7, the imaging element 70 is adhered to and disposed on the spacer 30 provided on the circuit substrate 21, and the OIS coil 31 and the position detection coil 32 are provided for the spacer 30. On the spacer 30, an OIS holder 130 including a magnet 14 is arranged so as to be movable in the X-Y directions. The OIS holder 130 stores the lens holder 11 that holds the lens 10 and provided with the AF coil 12, movably in the Z-axis direction.

In this manner, even in the case having the lens 80 disposed on the infrared light cut-off filter 15, it is possible to detect, with the position detection coil 32, the change in the magnetic field 40 generated in the AF coil 12 similarly to the case the first embodiment described above. With this configuration, the imaging device 1d can acquire the X-axis direction movement amount, the Y-axis direction movement amount, the AF movement amount, and the tilt amount of the AF coil 12 (lens 10), and can correct the position of the lens 10 based on each of the acquired values.

Similarly to the imaging device 1a of the first embodiment described above, the imaging device 1e according to the eighth embodiment has also a configuration in which the position detection coils 32a to 32d for detecting the position and the tilt amount of the lens 10 and the OIS coils 31a to 31d for moving the lens 10 in the X-Y directions are arranged on the same substrate (spacer 30). This makes it possible to reduce the size and height of the imaging device 1e.

Ninth Embodiment

Next, a ninth embodiment will be described. The ninth embodiment is an example in which any of the above-described first embodiment and its modifications, and any of the imaging devices 1a to 1e according to the second to ninth embodiments is applied to an electronic device. In the following, unless otherwise specified, an example in which the imaging device 1a is applied will be described.

Figure 25:
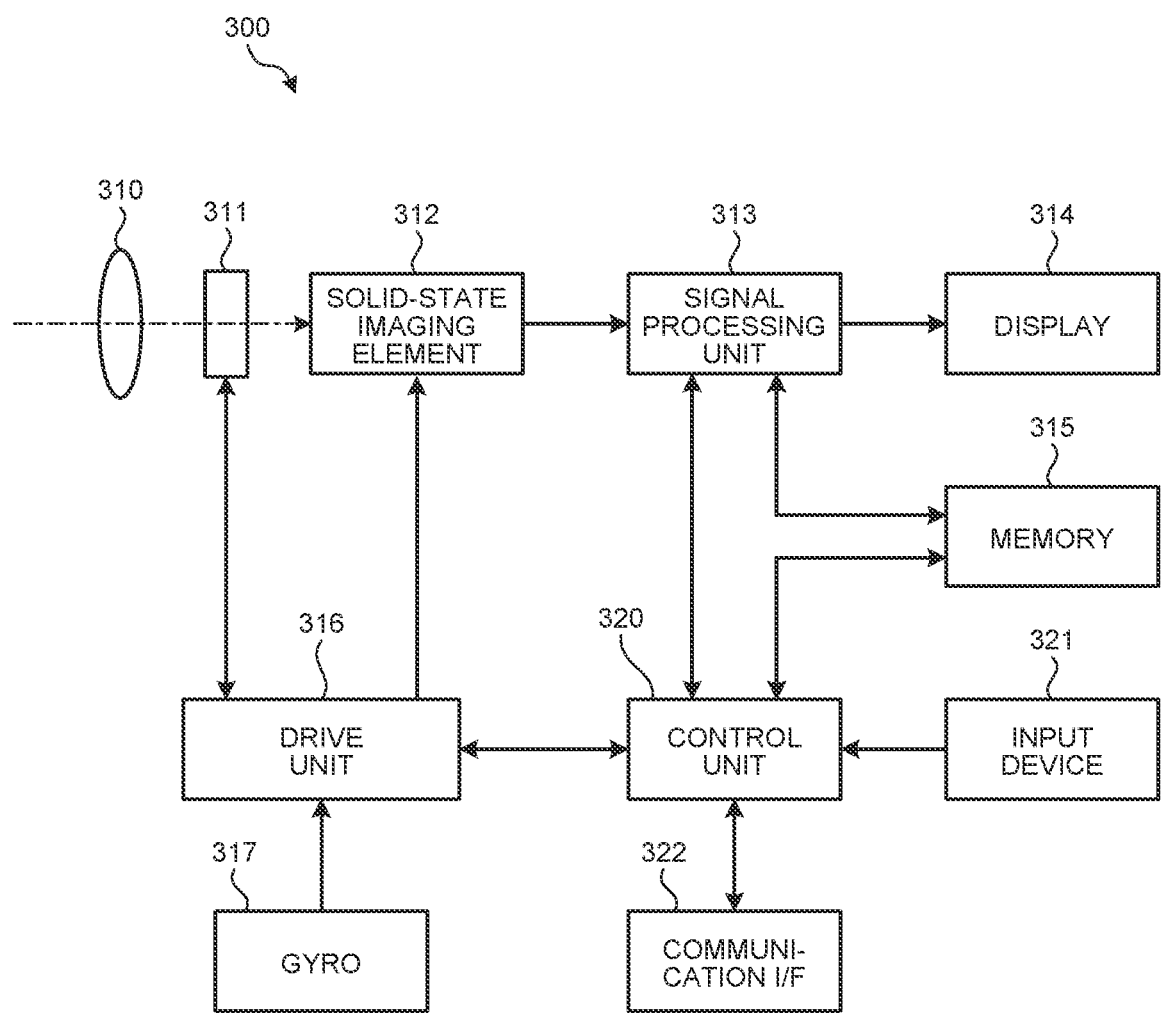
FIG. 25 is a block diagram illustrating an exemplary configuration of a terminal device as an electronic device applicable to a ninth embodiment.

FIG. 25 is a block diagram illustrating an exemplary configuration of a terminal device 300 as an electronic device applicable to the ninth embodiment. The terminal device 300 is, for example, a multifunctional mobile phone terminal (smartphone) and has an imaging function. The terminal device 300 may be applied to another electronic device such as a tablet personal computer as long as it is an electronic device having an imaging function and portability.

In the example of FIG. 25, the terminal device 300 includes an optical system 310, an optical control unit 311, a solid-state imaging element 312, a signal processing unit 313, a display 314, memory 315, a drive unit 316, and a gyro 317. The terminal device 300 further includes a control unit 320, an input device 321 and a communication I/F 322.

The control unit 320 includes a Central Processing Unit (CPU), Read Only Memory (ROM), and Random Access Memory (RAM). The control unit 320 controls the entire operation of the terminal device 300 by a CPU that operates using the RAM as work memory in accordance with a program preliminarily stored in the ROM. The input device 321 receives a user operation and transmits a control signal corresponding to the received user operation to the control unit 320. Under the control of the control unit 320, the communication I/F 322 communicates with the outside by, for example, wireless communication in accordance with a predetermined protocol.

Corresponds to the lens 10 and the lens holder 11 described above, the optical system 310 has a lens group including one or more lenses, and guides light (incident light) from a subject to the solid-state imaging element 312 so as to focus on a light receiving surface of the solid-state imaging element 312. The optical control unit 311 is disposed between the optical system 310 and the solid-state imaging element 312. The optical control unit 311 includes a shutter mechanism that controls a light emission period and a light blocking period of the solid-state imaging element 312 under the control of the control unit 320. Further, the optical control unit 311 includes a part of the actuator 13 described above. For example, the OIS coils 31a to 31d and the position detection coils 32a to 32d are included in the optical control unit 311.

The solid-state imaging element 312 corresponds to the imaging element 20 described above, and accumulates signal charges for a certain period of time in accordance with the light focused on the light receiving surface of the imaging element 20 via the optical system 310 and the optical control unit 311. The signal charge accumulated in the solid-state imaging element 312 is transferred in accordance with the drive signal (timing signal) supplied from the drive unit 316.

Under the control of the control unit 320, the drive unit 316 outputs a drive signal for controlling the transfer operation of the solid-state imaging element 312 and the shutter operation in the shutter mechanism included in the optical control unit 311 so as to drive the solid-state imaging element 312 and the shutter mechanism.

Furthermore, the drive unit 316 includes the position detection/control unit 50 described with reference to FIG. 7. The drive unit 316 drives the OIS coils 31a to 31d included in the optical control unit 311 in response to the signal from the gyro 317 corresponding to the gyro sensor 25 described above, and thereby implements the camera shake correction function. Furthermore, the drive unit 316 can also detect the position of the lens 10 (lens holder 11) based on the outputs of the position detection coils 32a to 32d included in the optical control unit 311, thereby driving the OIS coils 31a to 31d based on the detection result. Alternatively, the position detection/control unit 50 may be included in the control unit 320.

Under the control of the control unit 320, the signal processing unit 313 performs various types of signal processing such as CDS on the signal charge output from the solid-state imaging element 312, and generates image data according to the signal charge. Furthermore, under the control of the control unit 320, the signal processing unit 313 can display the image data obtained by signal processing onto the display 314 and can store the image data in the memory 315.

The control unit 320 can transmit the image data stored in the memory 315 to the outside by the communication I/F 322 in response to the user operation on the input device 321.

The terminal device 300 configured in this manner can apply the above-described imaging devices 1a to 1e as the optical system 310 and the solid-state imaging element 312 so as to detect the position of the optical system 310 by the AF operation or the operation by the camera shake correction function. Here, since the OIS coils 31a to 31d and the position detection coils 32a to 32d are formed on a same substrate, it is possible to reduce the height of the optical system 310 and the optical control unit 311, leading to the reduction of the entire size of the terminal device 300.

Here, the imaging devices 1a to 1e according to the present disclosure have been described as applicable to the terminal device 300 such as a smartphone or a tablet personal computer having an imaging function. Not limited to this example, the imaging devices 1a to 1e according to the present disclosure is also applicable to a digital video camera and a digital still camera. Furthermore, the imaging devices 1a to 1e according to the present disclosure is also applicable to image input cameras such as surveillance cameras and in-vehicle cameras. In addition, the imaging devices 1a to 1e according to the present disclosure can also be used in electronic devices such as scanner devices, facsimile machines, and video calling devices.

Tenth Embodiment

Figure 26:
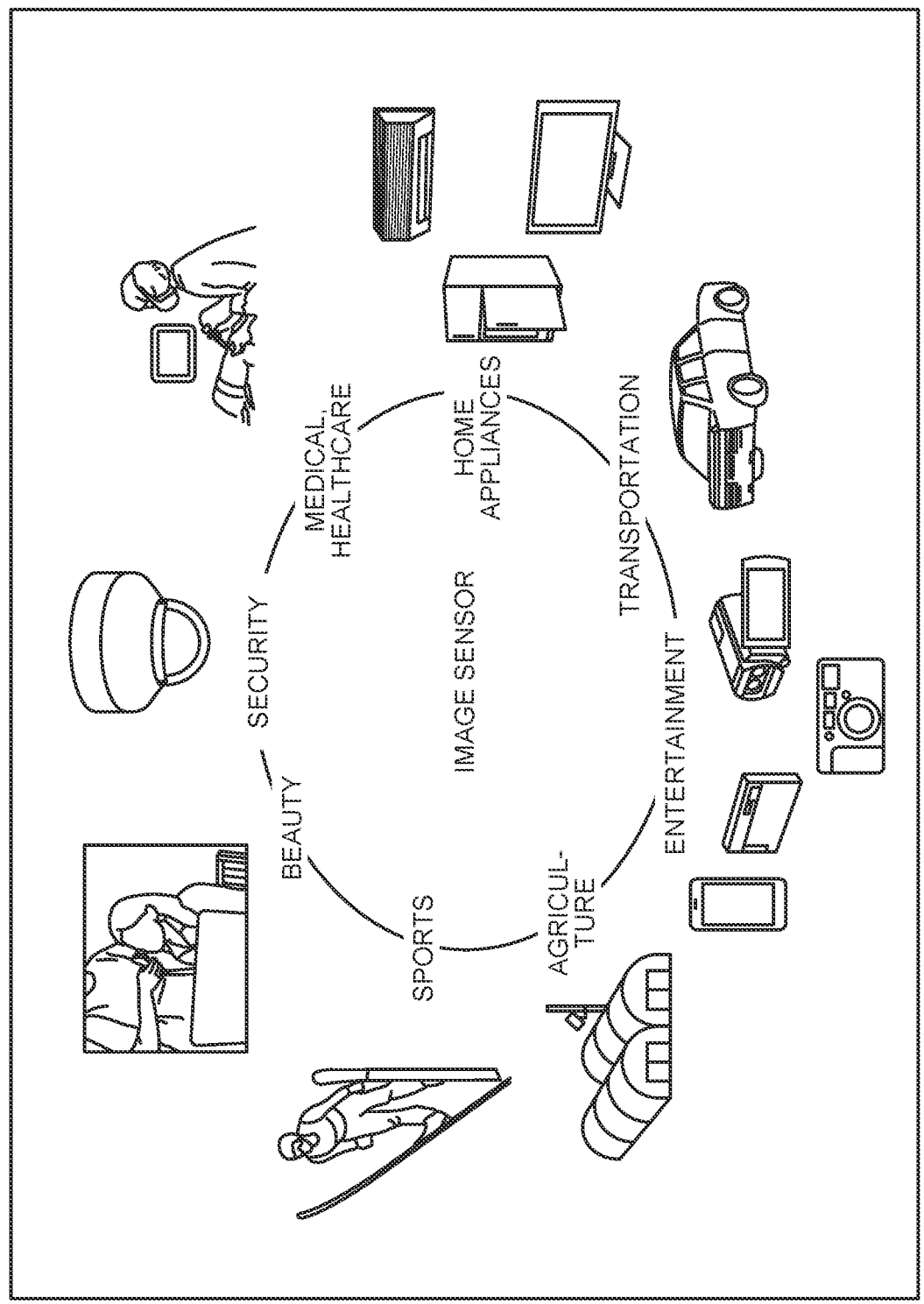
FIG. 26 is a diagram illustrating a usage example of an imaging device to which the technique of the present disclosure is applied.

Next, as a tenth embodiment, application examples of the first embodiment and its modification according to the present disclosure, and of the imaging devices 1a to 1e according to the second to eighth embodiments will be described. FIG. 26 is a diagram illustrating a usage example of the imaging devices 1a to 1e according to the above-described first embodiment, the second embodiment, and their modification.

Each of the imaging devices 1a to 1e described above is applicable to the following various situations in which sensing is performed for light including visual light, infrared light, ultraviolet light, and X-ray, for example.

- A device that captures images used for viewing for entertainment, such as digital cameras and mobile devices with a camera function.
- A device for transportation, such as an in-vehicle sensor that images a front, back, surroundings, interior, or the like, of a vehicle in order to ensure safe driving including automatic stop or the like, and to recognize driver's states, a surveillance camera to monitor traveling vehicles and roads, and a range-finding sensor to perform measurement of a distance between vehicles, or the like.
- A device for household appliances including a TV, a refrigerator, an air conditioner, or the like to image user's gesture and perform operation of the device according to the gesture.
- A device used for medical treatment and healthcare, such as endoscopes and devices that perform angiography by receiving infrared light.
- A device used for security, such as surveillance cameras for crime prevention and cameras for personal authentication.
- A device used for beauty, such as a skin measuring device that images the skin and a microscope that images the scalp.
- A device used for sports, such as action cameras and wearable cameras for sports applications.
- A device used for agriculture, such as cameras for monitoring the conditions of fields and crops.

[Further Application Example of Technology According to the Present Disclosure]

The technology according to the present disclosure (the present technology) is applicable to various products. For example, the techniques according to the present disclosure may be applied to endoscopic surgery systems.

(Example of Application to In-Vivo Information Acquisition System)

Figure 27:
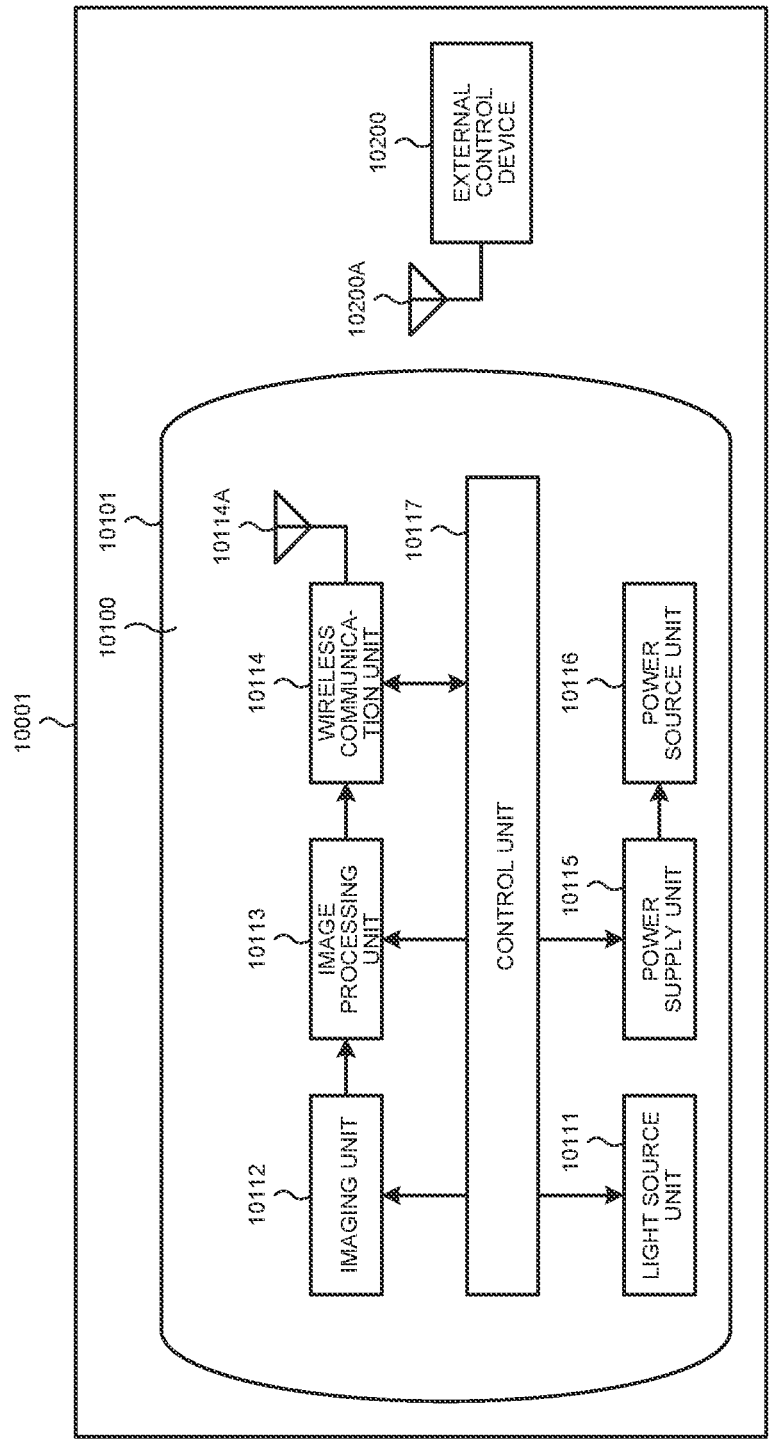
FIG. 27 is a block diagram illustrating an example of a schematic configuration of an in-vivo information acquisition system.

FIG. 27 is a block diagram illustrating an example of a schematic configuration of an in-vivo information acquisition system for a patient using a capsule endoscope to which the technique (the present technology) according to the present disclosure is applicable.

An in-vivo information acquisition system 10001 includes a capsule endoscope 10100 and an external control device 10200.

The capsule endoscope 10100 is swallowed by a patient at the time of examination. The capsule endoscope 10100 has an imaging function and a wireless communication function, and sequentially captures images of internal organs such as the stomach and the intestine (hereinafter, referred to as in-vivo images) with a predetermined interval while moving inside the internal organs by peristaltic movement or the like, until being naturally discharged from the patient. Thereafter, the capsule endoscope 10100 sequentially performs wireless transmission of information regarding the in-vivo images to the external control device 10200, that is, a device outside the body.

The external control device 10200 comprehensively controls the operation of the in-vivo information acquisition system 10001. Furthermore, the external control device 10200 receives information regarding the in-vivo images transmitted from the capsule endoscope 10100, and generates image data to be displayed on a display device (not illustrated) the in-vivo image on the basis of the information regarding the received in-vivo image.

In this manner, the in-vivo information acquisition system 10001 can obtain in-vivo images at any time obtained by imaging the inside of the patient's body from time when the capsule endoscope 10100 is swallowed to time of discharge.

The configuration and function of the capsule endoscope 10100 and the external control device 10200 will be described in more detail.

The capsule endoscope 10100 has a capsule-shaped casing 10101. The casing 10101 includes a light source unit 10111, an imaging unit 10112, an image processing unit 10113, a wireless communication unit 10114, a power supply unit 10115, a power source unit 10116, and a control unit 10117.

The light source unit 10111 includes a light source such as a light emitting diode (LED), for example, and emits light to an imaging view field of the imaging unit 10112.

The imaging unit 10112 includes an optical system including an imaging element and a plurality of lenses provided in front of the imaging element. Reflected light (hereinafter referred to as observation light) of the light emitted to body tissue as an observation target is collected by the optical system and is incident on the imaging element. In the imaging unit 10112, the observation light incident on the imaging element is photoelectrically converted, and an image signal corresponding to the observation light is generated. The image signal generated by the imaging unit 10112 is supplied to the image processing unit 10113.

The image processing unit 10113 includes a processor such as a central processing unit (CPU) and a graphics processing unit (GPU), and performs various types of signal processing on the image signal generated by the imaging unit 10112. The image processing unit 10113 supplies the image signal that has undergone the signal processing as RAW data to the wireless communication unit 10114.

The wireless communication unit 10114 performs predetermined processing such as modulation processing on the image signal that has undergone signal processing by the image processing unit 10113, and transmits the processed image signal to the external control device 10200 via an antenna 10114A. Furthermore, the wireless communication unit 10114 receives a control signal related to drive control of the capsule endoscope 10100 from the external control device 10200 via the antenna 10114A. The wireless communication unit 10114 supplies the control signal received from the external control device 10200 to the control unit 10117.

The power supply unit 10115 includes an antenna coil for receiving power, a power regeneration circuit that reproduces power from the current generated in the antenna coil, a booster circuit, or the like. The power supply unit 10115 generates electric power using the principle of non-contact charging.

The power source unit 10116 includes a secondary battery, and stores electric power generated by the power supply unit 10115. For the sake of avoiding complication of the drawing, FIG. 27 omits illustration of arrows or the like indicating destinations of power supply from the power source unit 10116. However, the power stored in the power source unit 10116 is transmitted to the light source unit 10111, the imaging unit 10112, the image processing unit 10113, the wireless communication unit 10114, and the control unit 10117, so as to be used for driving these units.

The control unit 10117 includes a processor such as a CPU and controls driving of the light source unit 10111, the imaging unit 10112, the image processing unit 10113, the wireless communication unit 10114, and the power supply unit 10115 in accordance with a control signal transmitted from the external control device 10200.

The external control device 10200 includes a processor such as a CPU and GPU, or a microcomputer or a control substrate including a processor and storage elements such as memory in combination. The external control device 10200 transmits a control signal to the control unit 10117 of the capsule endoscope 10100 via an antenna 10200A and thereby controls operation of the capsule endoscope 10100. In the capsule endoscope 10100, for example, a control signal from the external control device 10200 can change the light emission conditions for the observation target in the light source unit 10111. Furthermore, imaging conditions (for example, frame rate in the imaging unit 10112, the exposure value, or the like) can be changed by the control signal from the external control device 10200. Furthermore, the control signal from the external control device 10200 may be used to change the processing details in the image processing unit 10113 and image signal transmission condition (for example, transmission interval, the number of images to be transmitted, etc.) of the wireless communication unit 10114.

In addition, the external control device 10200 performs various image processing on the image signal transmitted from the capsule endoscope 10100, and generates image data for displaying the captured in-vivo image on the display device. Examples of the image processing include various types of known signal processing such as developing processing (demosaicing), high image quality processing (band enhancement processing, super resolution processing, noise reduction processing, and camera shake correction processing, etc.), and enlargement processing (electronic zoom processing) as a single process individually, or a combination of these. The external control device 10200 controls the drive of the display device to display an in-vivo image captured based on the generated image data. Alternatively, the external control device 10200 may control a recording device (not illustrated) to record the generated image data, or may control a printing device (not illustrated) to print out the generated image data.

An example of the in-vivo information acquisition system to which the technology according to the present disclosure can be applied has been described above. The technique according to the present disclosure can be suitably applied to, for example, the imaging unit 10112 among the configurations described above. Specifically, the configuration of the above-described imaging devices 1*a* to 1*e*, in which four or two position detection coils 32 for detecting the position and tilt amount of the lens 10 (lens holder 11), and four or two OIS coils 31 for moving the lens 10 (lens holder 11) in the X-Y directions are arranged on a same substrate (spacer 30) can be applied to the imaging unit 10112. By applying the technique according to the present disclosure to the imaging unit 10112, it is possible to reduce the size and height of the imaging unit 10112, leading to the reduction of the size of the capsule endoscope 10100.

(Example of Application to Endoscopic Surgery System)

Figure 28:
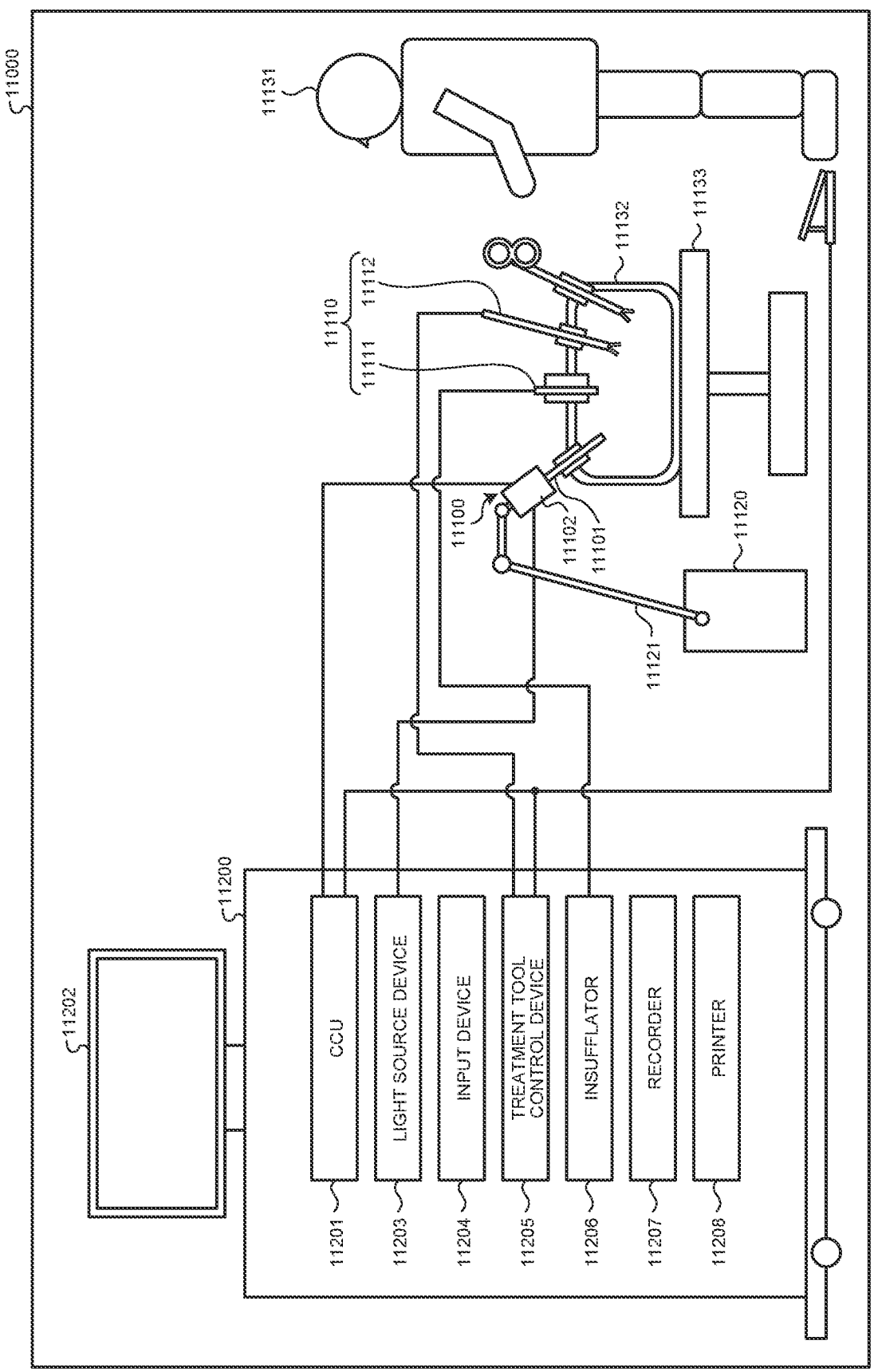
FIG. 28 is a diagram illustrating an example of a schematic configuration of an endoscopic surgery system.

The techniques according to the present disclosure may further be applied to endoscopic surgery systems. FIG. 28 is a view illustrating an example of a schematic configuration of an endoscopic surgery system to which the technique (the present technology) according to the present disclosure is applicable.

FIG. 28 illustrates a scene in which a surgeon (doctor) 11131 is performing surgery on a patient 11132 on a patient bed 11133 using an endoscopic surgery system 11000. As illustrated, the endoscopic surgery system 11000 includes an endoscope 11100, other surgical tools 11110 such as a pneumoperitoneum tube 11111 and an energy treatment tool 11112, a support arm device 11120 that supports the endoscope 11100, and a cart 11200 equipped with various devices for endoscopic surgery.

The endoscope 11100 includes: a lens barrel 11101, a region of a predetermined length from a distal end of which is to be inserted into the body cavity of the patient 11132; and a camera head 11102 connected to a proximal end of the lens barrel 11101. The example in the figure illustrates the endoscope 11100 as a rigid endoscope having the lens barrel 11101 of a rigid type. However, the endoscope 11100 can be a flexible endoscope having a flexible lens barrel.

The distal end of the lens barrel 11101 has an opening to which an objective lens is fitted. The endoscope 11100 is connected to a light source device 11203. The light generated by the light source device 11203 is guided to the distal end of the lens barrel by a light guide extending inside the lens barrel 11101, and the guided light will be emitted toward an observation target in the body cavity of the patient 11132 through the objective lens. The endoscope 11100 may be a forward viewing endoscope, a forward-oblique viewing endoscope, or a side-viewing endoscope.

An optical system and an imaging element are provided inside the camera head 11102. Reflected light (observation light) from the observation target is focused onto the imaging element by the optical system. The observation light is photoelectrically converted by the imaging element so as to generate an electric signal corresponding to the observation light, that is, an image signal corresponding to the observation image. The image signal is transmitted as RAW data to a camera control unit (CCU) 11201.

The CCU 11201 includes CPU, GPU, or the like, and comprehensively controls the operations of the endoscope 11100 and a display device 11202. Furthermore, the CCU 11201 receives an image signal from the camera head 11102, and performs various image processing on the image signal for displaying an image based on the image signal, such as developing processing (demosaicing).

Under the control of the CCU 11201, the display device 11202 displays an image based on the image signal that has undergone image processing by the CCU 11201.

The light source device 11203 includes a light source such as Light Emitting Diode (LED), for example, and supplies the irradiation light for imaging the surgical site or the like to the endoscope 11100.

An input device 11204 is an input interface to the endoscopic surgery system 11000. The user can input various types of information and input instructions to the endoscopic surgery system 11000 via the input device 11204. For example, the user inputs an instruction to change the imaging conditions (type of irradiation light, magnification, focal length, or the like) by the endoscope 11100.

A treatment tool control device 11205 controls the drive of the energy treatment tool 11112 for ablation or dissection of tissue, sealing of blood vessels, or the like. In order to inflate the body cavity of the patient 11132 to ensure a view field for the endoscope 11100 and to ensure a working space of the surgeon, an insufflator 11206 pumps gas into the body cavity via the pneumoperitoneum tube 11111. A recorder 11207 is a device capable of recording various types of information associated with the surgery. A printer 11208 is a device capable of printing various types of information associated with surgery in various forms such as text, images, and graphs.

The light source device 11203 that supplies the endoscope 11100 with irradiation light when imaging a surgical site can be constituted with, for example, an LED, a laser light source, or a white light source with a combination of these. In a case where the white light source is constituted with the combination of the RGB laser light sources, it is possible to control the output intensity and the output timing of individual colors (individual wavelengths) with high accuracy. Accordingly, it is possible to perform white balance adjustment of the captured image on the light source device 11203. Furthermore, in this case, by emitting the laser light from each of the RGB laser light sources to an observation target on the time-division basis and by controlling the drive of the imaging element of the camera head 11102 in synchronization with the light emission timing, it is also possible to capture the image corresponding to each of RGB colors on the time-division basis. According to this method, a color image can be obtained without providing a color filter on the imaging element.

Furthermore, the drive of the light source device 11203 may be controlled so as to change the intensity of the output light at predetermined time intervals. With the control of the drive of the imaging element of the camera head 11102 in synchronization with the timing of the change of the intensity of the light so as to obtain images on the time-division basis and combine the images, it is possible to generate an image with high dynamic range without so called blackout shadows or blown out highlights.

Furthermore, the light source device 11203 may be configured to be able to supply light in a predetermined wavelength band corresponding to special light observation. The special light observation is used to perform narrowband light observation (narrow band imaging). The narrowband light observation uses the wavelength dependency of the light absorption in the body tissue and emits light in a narrower band compared with the irradiation light (that is, white light) at normal observation, thereby imaging a predetermined tissue such as a blood vessel of the mucosal surface layer with high contrast. Alternatively, the special light observation may include fluorescence observation to obtain an image by fluorescence generated by emission of excitation light. Fluorescence observation can be performed to observe fluorescence emitted from a body tissue to which excitation light is applied (autofluorescence observation), and can be performed with topical administration of reagent such as indocyanine green (ICG) to the body tissue, and together with this, excitation light corresponding to the fluorescence wavelength of the reagent is emitted to the body tissue to obtain a fluorescent image, or the like. The light source device 11203 can be configured to be capable of supplying narrow band light and/or excitation light corresponding to such special light observation.

Figure 29:
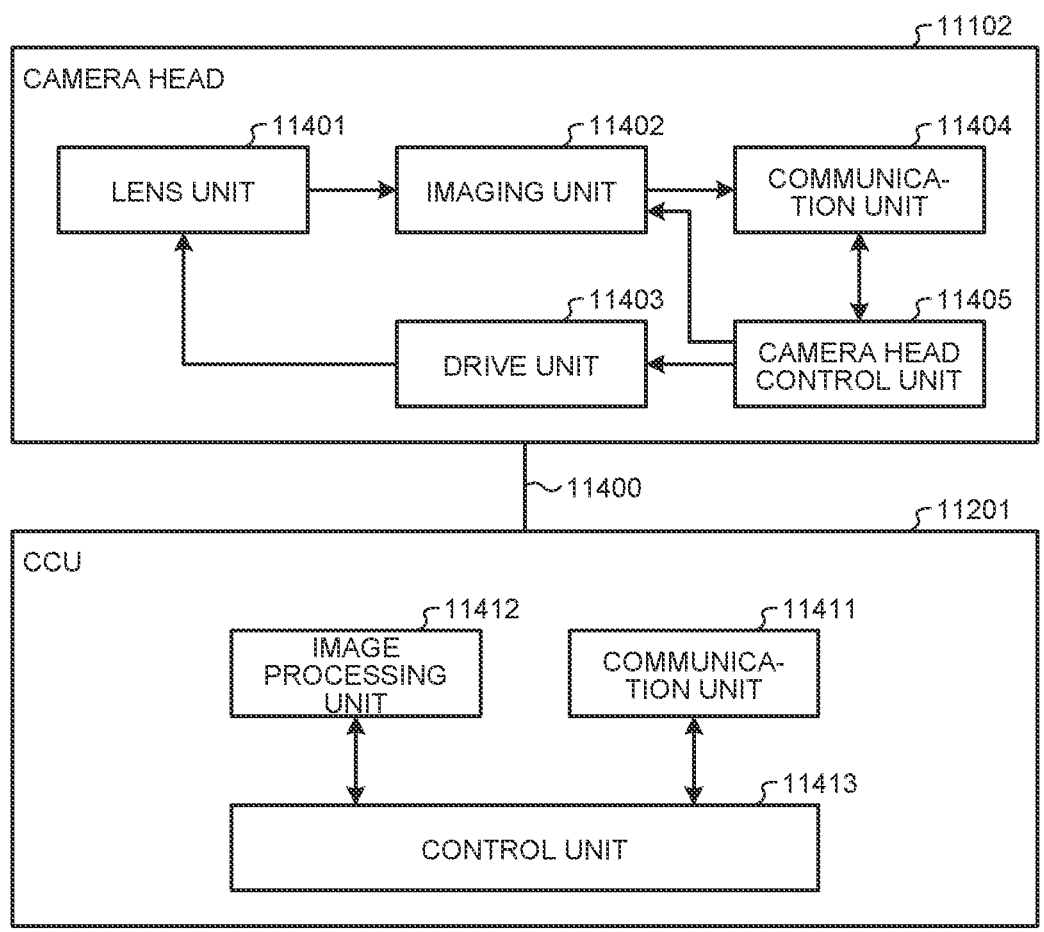
FIG. 29 is a block diagram illustrating an example of a functional configuration of a camera head and a CCU.

FIG. 29 is a block diagram illustrating an example of the functional configuration of the camera head 11102 and the CCU 11201 illustrated in FIG. 28.

The camera head 11102 includes a lens unit 11401, an imaging unit 11402, a drive unit 11403, a communication unit 11404, and a camera head control unit 11405. The CCU 11201 includes a communication unit 11411, an image processing unit 11412, and a control unit 11413. The camera head 11102 and the CCU 11201 are communicatively connected to each other by a transmission cable 11400.

The lens unit 11401 is an optical system provided at a connection portion with the lens barrel 11101. The observation light captured from the distal end of the lens barrel 11101 is guided to the camera head 11102 so as to be incident on the lens unit 11401. The lens unit 11401 is formed by a combination of a plurality of lenses including a zoom lens and a focus lens.

The imaging unit 11402 is constituted with an imaging element. The number of imaging elements forming the imaging unit 11402 may be one (single-plate type) or in plural (multi-plate type). When the imaging unit 11402 is a multi-plate type, for example, each of imaging elements may generate an image signal corresponding to one color of RGB, and a color image may be obtained by combining these individual color image signals. Alternatively, the imaging unit 11402 may include a pair of imaging elements for acquiring image signals individually for the right eye and the left eye corresponding to three-dimensional (3D) display. The 3D display enables a surgeon 11131 to grasp the depth of the living tissue more accurately in the surgical site. When the imaging unit 11402 is a multi-plate type, a plurality of the lens unit 11401 may be provided corresponding to each of the imaging elements.

Furthermore, the imaging unit 11402 does not necessarily have to be provided on the camera head 11102. For example, the imaging unit 11402 may be provided inside the lens barrel 11101 immediately behind the objective lens.

The drive unit 11403 includes an actuator, and moves the zoom lens and the focus lens of the lens unit 11401 by a predetermined distance along the optical axis under the control of the camera head control unit 11405. With this operation, the magnification and focus of the image captured by the imaging unit 11402 can be appropriately adjusted.

The communication unit 11404 includes a communication device for transmitting and receiving various types of information to and from the CCU 11201. The communication unit 11404 transmits the image signal obtained from the imaging unit 11402 as RAW data to the CCU 11201 via the transmission cable 11400.

Furthermore, the communication unit 11404 receives a control signal for controlling the drive of the camera head 11102 from the CCU 11201 and supplies the control signal to the camera head control unit 11405. The control signal includes information associated with imaging conditions, such as information designating a frame rate of a captured image, information designating an exposure value at the time of imaging, and/or information designating the magnification and focus of the captured image.

Note that the imaging conditions such as the frame rate, the exposure value, the magnification, and the focus may be appropriately designated by the user, or may be automatically set by the control unit 11413 of the CCU 11201 based on the acquired image signal. In the latter case, an Auto Exposure (AE) function, an Auto Focus (AF) function, and an Auto White Balance (AWB) function are to be installed in the endoscope 11100.

The camera head control unit 11405 controls the drive of the camera head 11102 based on the control signal from the CCU 11201 received via the communication unit 11404.

The communication unit 11411 includes a communication device for transmitting and receiving various types of information to and from the camera head 11102. The communication unit 11411 receives an image signal transmitted from the camera head 11102 via the transmission cable 11400.

Furthermore, the communication unit 11411 transmits a control signal for controlling the drive of the camera head 11102 to the camera head 11102. The image signal and the control signal can be transmitted by electric communication, optical communication, or the like.

The image processing unit 11412 performs various image processing on the image signal which is the RAW data transmitted from the camera head 11102.

The control unit 11413 performs various controls related to the imaging of the surgical site or the like by the endoscope 11100 and related to the display of the captured image obtained by the imaging of the surgical site or the like. For example, the control unit 11413 generates a control signal for controlling the drive of the camera head 11102.

Furthermore, the control unit 11413 controls the display device 11202 to display the captured image including an image of a surgical site or the like based on the image signal that has undergone image processing by the image processing unit 11412. At this time, the control unit 11413 may recognize various objects in the captured image by using various image recognition techniques. For example, the control unit 11413 detects the shape, color, or the like of an edge of an object included in the captured image, making it possible to recognize a surgical tool such as forceps, a specific living body site, bleeding, a mist at the time of using the energy treatment tool 11112, or the like. When displaying the captured image on the display device 11202, the control unit 11413 may superimpose and display various surgical operation support information on the image of the surgical site by using the recognition result. By displaying the surgery support information in a superimposed manner so as to be presented to the surgeon 11131, it is possible to reduce the burden on the surgeon 11131 and enable the surgeon 11131 to proceed with the operation with higher reliability.

The transmission cable 11400 that connects the camera head 11102 and the CCU 11201 is an electric signal cable that supports electric signal communication, an optical fiber that supports optical communication, or a composite cable thereof.

Here, while FIG. 29 is an example in which wired communication is performed using the transmission cable 11400, the communication between the camera head 11102 and the CCU 11201 may be performed wirelessly.

An example of the endoscopic surgery system to which the technique according to the present disclosure can be applied has been described above. The technique according to the present disclosure can be applied to, for example, the endoscope 11100 and the imaging unit 11402 of the camera head 11102 among the configurations described above. Specifically, the configuration of the above-described imaging devices 1a to 1e, in which four or two position detection coils 32 for detecting the position and tilt amount of the lens 10 (lens holder 11), and four or two OIS coils 31 for moving the lens 10 (lens holder 11) in the X-Y directions are arranged on a same substrate (spacer 30) can be applied to the imaging unit 10402. By applying the technique according to the present disclosure to the imaging unit 10402, it is possible to reduce the size and height of the imaging unit 10402.

Although the endoscopic surgery system has been described here as an example, the technique according to the present disclosure may be applied to, for example, a microscopic surgery system or the like.

(Example of Application to Moving Object)

The technology according to the present disclosure may be further applied to devices mounted on various moving objects such as automobiles, electric vehicles, hybrid electric vehicles, motorcycles, bicycles, personal mobility, airplanes, drones, ships, and robots.

Figure 30:
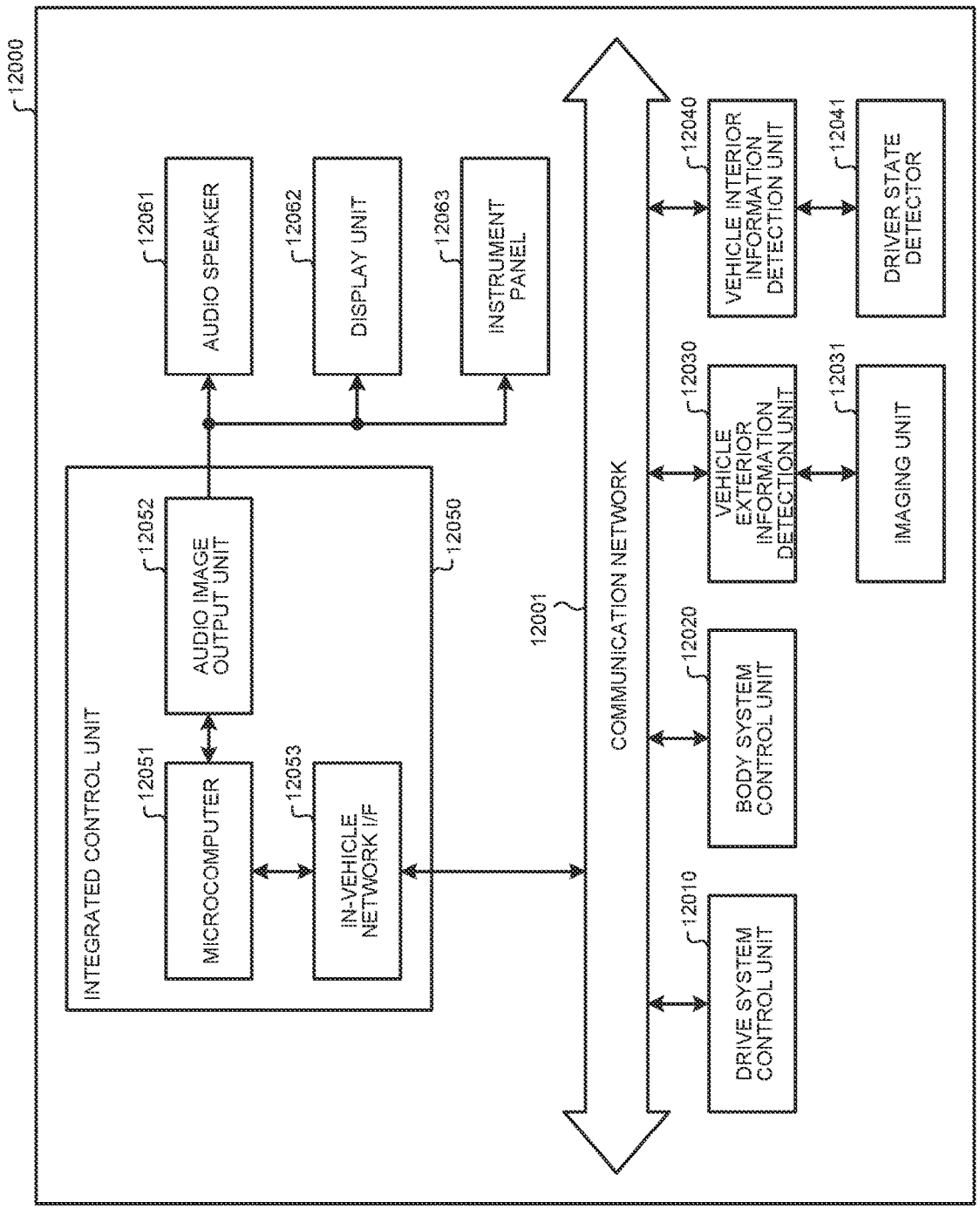
FIG. 30 is a block diagram illustrating an example of a schematic configuration of a vehicle control system.

FIG. 30 is a block diagram illustrating a schematic configuration example of a vehicle control system, which is an example of a moving object control system to which the technique according to the present disclosure is applicable.

A vehicle control system 12000 includes a plurality of electronic control units connected via a communication network 12001. In the example illustrated in FIG. 30, the vehicle control system 12000 includes a drive system control unit 12010, a body system control unit 12020, a vehicle exterior information detection unit 12030, a vehicle interior information detection unit 12040, and an integrated control unit 12050. Furthermore, as a functional configuration of the integrated control unit 12050, a microcomputer 12051, an audio image output unit 12052, and an in-vehicle network interface (I/F) 12053 are illustrated.

The drive system control unit 12010 controls the operation of the device related to the drive system of the vehicle in accordance with various programs. For example, the drive system control unit 12010 functions as a control device of a driving force generation device that generates a driving force of a vehicle such as an internal combustion engine or a driving motor, a driving force transmission mechanism that transmits a driving force to the wheels, a steering mechanism that adjusts steering angle of the vehicle, a braking device that generates a braking force of the vehicle, or the like.

The body system control unit 12020 controls the operation of various devices mounted on the vehicle body in accordance with various programs. For example, the body system control unit 12020 functions as a control device for a keyless entry system, a smart key system, a power window device, or various lamps such as a head lamp, a back lamp, a brake lamp, a turn signal lamp, or a fog lamp. In this case, the body system control unit 12020 can receive input of radio waves transmitted from a portable device that substitutes for the key or signals from various switches. The body system control unit 12020 receives the input of these radio waves or signals and controls the door lock device, the power window device, the lamp, or the like, of the vehicle.

The vehicle exterior information detection unit 12030 detects information outside the vehicle equipped with the vehicle control system 12000. For example, an imaging unit 12031 is connected to the vehicle exterior information detection unit 12030. The vehicle exterior information detection unit 12030 causes the imaging unit 12031 to capture an image of the exterior of the vehicle and receives the captured image. The vehicle exterior information detection unit 12030 may perform an object detection process or a distance detection process of people, vehicles, obstacles, signs, or characters on the road surface based on the received image. The vehicle exterior information detection unit 12030 performs image processing on the received image, for example, and performs an object detection process and a distance detection process based on the result of the image processing.

The imaging unit 12031 is an optical sensor that receives light and outputs an electrical signal corresponding to the amount of received light. The imaging unit 12031 can output the electric signal as an image and also as distance measurement information. Further, the light received by the imaging unit 12031 may be visible light or invisible light such as infrared light.

The vehicle interior information detection unit 12040 detects vehicle interior information. The vehicle interior information detection unit 12040 is connected to a driver state detector 12041 that detects the state of the driver, for example. The driver state detector 12041 may include a camera that images the driver, for example. The vehicle interior information detection unit 12040 may calculate the degree of fatigue or degree of concentration of the driver or may determine whether the driver is dozing off on the basis of the detection information input from the driver state detector 12041.

The microcomputer 12051 can calculate a control target value of the driving force generation device, the steering mechanism, or the braking device on the basis of vehicle external/internal information obtained by the vehicle exterior information detection unit 12030 or the vehicle interior information detection unit 12040, and can output a control command to the drive system control unit 12010. For example, the microcomputer 12051 can perform cooperative control for the purpose of achieving a function of an advanced driver assistance system (ADAS) including collision avoidance or impact mitigation of vehicles, follow-up running based on an inter-vehicle distance, cruise control, vehicle collision warning, vehicle lane departure warning, or the like.

Furthermore, it is allowable such that the microcomputer 12051 controls the driving force generation device, the steering mechanism, the braking device, or the like, on the basis of the information regarding the surroundings of the vehicle obtained by the vehicle exterior information detection unit 12030 or the vehicle interior information detection unit 12040, thereby performing cooperative control for the purpose of autonomous driving or the like, in which the vehicle performs autonomous traveling without depending on the operation of the driver.

Furthermore, the microcomputer 12051 can output a control command to the body system control unit 12020 based on the vehicle exterior information acquired by the vehicle exterior information detection unit 12030. For example, the microcomputer 12051 can control the head lamp in accordance with the position of the preceding vehicle or the oncoming vehicle sensed by the vehicle exterior information detection unit 12030, and thereby can perform cooperative control aiming at antiglare such as switching the high beam to low beam.

The audio image output unit 12052 transmits an output signal in the form of at least one of audio or image to an output device capable of visually or audibly notifying the occupant of the vehicle or the outside of the vehicle of information. In the example of FIG. 30, an audio speaker 12061, a display unit 12062, and an instrument panel 12063 are illustrated as exemplary output devices. The display unit 12062 may include, for example, at least one of an onboard display and a head-up display.

Figure 31:
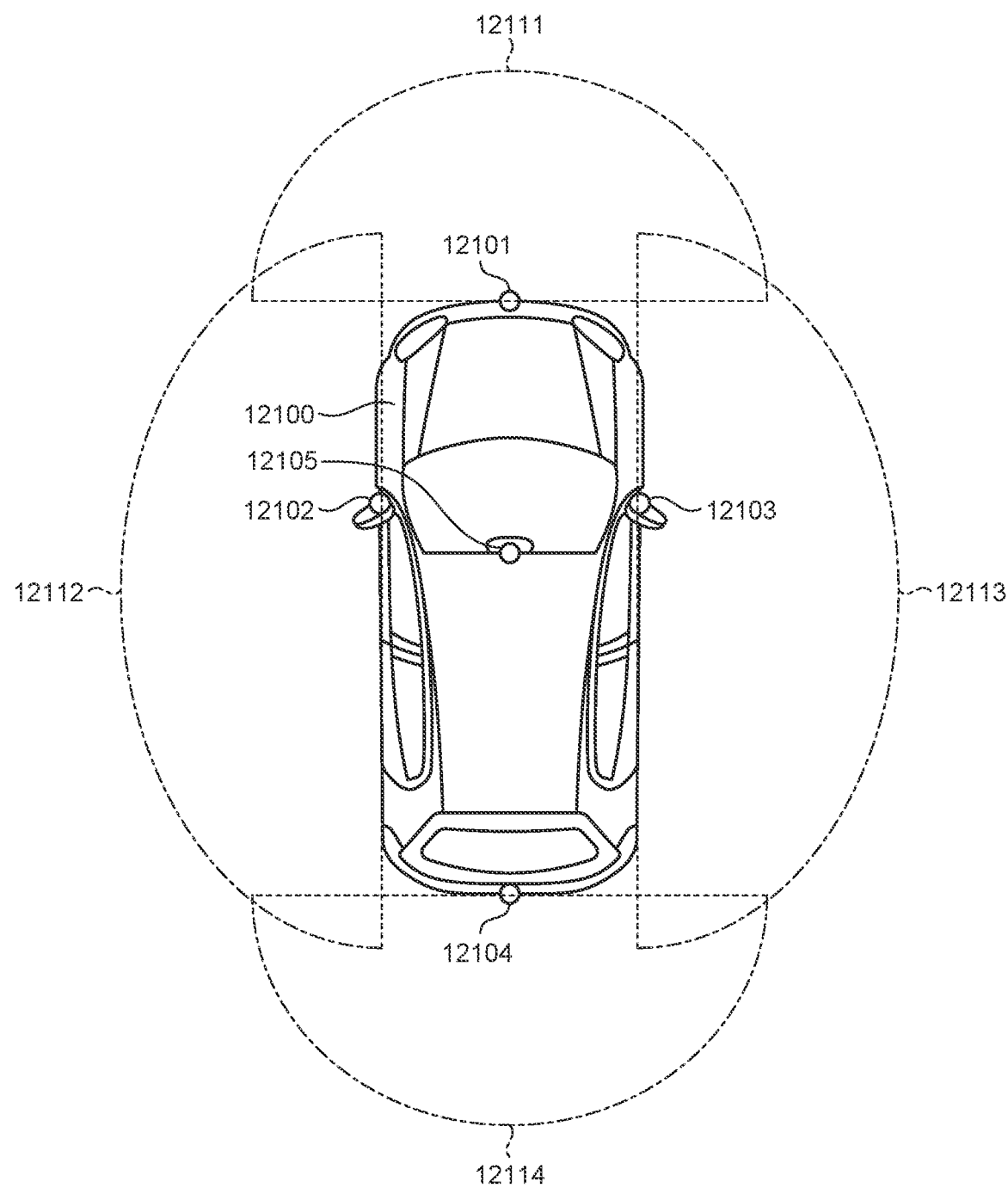
FIG. 31 is a diagram illustrating an example of installation positions of a vehicle exterior information detection unit and an imaging unit.

FIG. 31 is a diagram illustrating an example of an installation position of the imaging unit 12031. In FIG. 31, the vehicle 12100 has imaging units 12101, 12102, 12103, 12104 and 12105 as imaging units 12031.

For example, the imaging units 12101, 12102, 12103, 12104, and 12105 are installed at positions on a vehicle 12100, including a nose, a side mirror, a rear bumper, a back door, an upper portion of the windshield in a vehicle interior, or the like. The imaging unit 12101 provided on the front nose and the imaging unit 12105 provided on the upper portion of the windshield in the vehicle interior mainly acquire an image in front of the vehicle 12100. The imaging units 12102 and 12103 provided in the side mirrors mainly acquire images of the side of the vehicle 12100. The imaging unit 12104 provided on the rear bumper or the back door mainly acquires an image behind the vehicle 12100. The images in front acquired by the imaging units 12101 and 12105 are mainly used for detecting a preceding vehicle or a pedestrian, an obstacle, a traffic light, a traffic sign, a lane, or the like.

Note that FIG. 31 illustrates an example of the imaging range of the imaging units 12101 to 12104. An imaging range 12111 indicates an imaging range of the imaging unit 12101 provided on the front nose, imaging ranges 12112 and 12113 indicate imaging ranges of the imaging units 12102 and 12103 provided on the side mirrors, respectively, and an imaging range 12114 indicates an imaging range of the imaging unit 12104 provided on the rear bumper or the back door. For example, by superimposing pieces of image data captured by the imaging units 12101 to 12104, it is possible to obtain a bird's-eye view image of the vehicle 12100 as viewed from above.

At least one of the imaging units 12101 to 12104 may have a function of acquiring distance information. For example, at least one of the imaging units 12101 to 12104 may be a stereo camera including a plurality of imaging elements, or an imaging element having pixels for phase difference detection.

For example, the microcomputer 12051 can calculate a distance to each of three-dimensional objects in the imaging ranges 12111 to 12114 and a temporal change (relative speed with respect to the vehicle 12100) of the distance based on the distance information obtained from the imaging units 12101 to 12104, and thereby can extract a three-dimensional object traveling at a predetermined speed (for example, 0 km/h or more) in substantially the same direction as the vehicle 12100 being the closest three-dimensional object on the traveling path of the vehicle 12100, as a preceding vehicle. Furthermore, the microcomputer 12051 can set an inter-vehicle distance to be ensured in front of the preceding vehicle in advance, and can perform automatic brake control (including follow-up stop control), automatic acceleration control (including follow-up start control), or the like. In this manner, it is possible to perform cooperative control for the purpose of autonomous driving or the like, in which the vehicle autonomously travels without depending on the operation of the driver.

For example, based on the distance information obtained from the imaging units 12101 to 12104, the microcomputer 12051 can extract three-dimensional object data regarding the three-dimensional object with classification into three-dimensional objects, such as a two-wheeled vehicle, a regular vehicle, a large vehicle, a pedestrian, and other three-dimensional objects such as a utility pole, and can use the data for automatic avoidance of obstacles. For example, the microcomputer 12051 distinguishes obstacles around the vehicle 12100 into obstacles having high visibility to the driver of the vehicle 12100 and obstacles having low visibility to the driver. Subsequently, the microcomputer 12051 determines a collision risk indicating the risk of collision with each of obstacles. When the collision risk is a set value or more and there is a possibility of collision, the microcomputer 12051 can output an alarm to the driver via the audio speaker 12061 and the display unit 12062, and can perform forced deceleration and avoidance steering via the drive system control unit 12010, thereby achieving driving assistance for collision avoidance.

At least one of the imaging units 12101 to 12104 may be an infrared camera that detects infrared rays. For example, the microcomputer 12051 can recognize a pedestrian by determining whether a pedestrian is present in the captured images of the imaging units 12101 to 12104. Such pedestrian recognition is performed, for example, by a procedure of extracting feature points in a captured image of the imaging units 12101 to 12104 as an infrared camera, and by a procedure of performing pattern matching processing on a series of feature points indicating the contour of the object to discriminate whether it is a pedestrian. When the microcomputer 12051 determines that a pedestrian is present in the captured images of the imaging units 12101 to 12104 and recognizes a pedestrian, the audio image output unit 12052 controls the display unit 12062 to perform superimposing display of a rectangular contour line for emphasis to the recognized pedestrian. Furthermore, the audio image output unit 12052 may control the display unit 12062 to display an icon indicating a pedestrian or the like at a desired position.

Hereinabove, an example of the vehicle control system to which the technology according to the present disclosure is applicable has been described. The technology according to the present disclosure is applicable to the imaging unit 12031, for example, among the configurations described above. Specifically, the configuration of the above-described imaging devices 1*a* to 1*e*, in which four or two position detection coils 32 for detecting the position and tilt amount of the lens 10 (lens holder 11), and four or two OIS coils 31 for moving the lens 10 (lens holder 11) in the X-Y directions are arranged on a same substrate (spacer 30) can be applied to the imaging unit 12031. By applying the technique according to the present disclosure to the imaging unit 12031, it is possible to reduce the size and height of the imaging unit 12031.

The effects described in the present specification are merely examples, and thus, there may be other effects, not limited to the exemplified effects.

Note that the present technology can also have the following configurations.

(1) An imaging device comprising:
a first coil that moves a lens that collects light from a subject, in an optical axis direction of the light in accordance with a first magnetic field and that moves together with the lens;
a second coil for moving the lens in a direction perpendicular to the optical axis in accordance with a second magnetic field; and
a third coil for detecting the first magnetic field,
wherein the second coil and the third coil are arranged on a same substrate.

(2) The imaging device according to (1),
wherein four pieces of the third coils are individually disposed at positions corresponding to four sides of a rectangular region including a region corresponding to the lens, on the substrate, and
two pieces of the third coils, out of the four third coils, which are disposed so as to be arranged at positions corresponding to two facing sides of the rectangular region, are disposed at positions where individual centers of the coils are arranged to be point-symmetrical with respect to the center of the rectangular region and where the individual centers of the coils do not come on a line connecting the centers of the two sides.

(3) The imaging device according to (1) or (2),
wherein the second coil and the third coil are formed by being printed on the substrate.
(4) The imaging device according to any one of (1) to (3), further comprising a position detection circuit that detects a position of the lens based on outputs of four pieces of the third coils,
wherein the position detection circuit performs detection of the position of the lens in the optical axis direction, the position of the lens in a direction perpendicular to the optical axis, and a tilt angle of the lens.
(5) The imaging device according to (4),
wherein the position detection circuit performs detection of the tilt angle based on each of outputs of the four third coils in a case where each of the outputs satisfies a predetermined condition.
(6) The imaging device according to (4),
wherein the position detection circuit performs detection of the position in the optical axis direction based on an integrated value of each of outputs of the four third coils.
(7) The imaging device according to (4),
wherein the position detection circuit performs detection of the position in a direction perpendicular to the optical axis based on outputs of the four third coils and a detection result of the tilt angle.
(8) The imaging device according to (4),
wherein the position detection circuit performs the detection at a regular cycle.
(9) The imaging device according to (4),
wherein the position detection circuit performs the detection in accordance with sensing of vibration in the imaging device.
(10) The imaging device according to (1),
wherein two pieces of the third coils are individually disposed at positions corresponding to two intersecting sides of the four sides of a rectangular region including a region corresponding to the lens, on the substrate.
(11) An imaging device including:
a second coil for moving a lens that collects light from a subject, in a direction perpendicular to an optical axis of the light in accordance with a magnetic field; and a third coil for detecting the magnetic field,
in which the second coil and the third coil are arranged on a same substrate.
(12) The imaging device according to (11), in which four pieces of the third coils are individually disposed at positions corresponding to four sides of a rectangular region including a region corresponding to the lens, on the substrate, and
two pieces of the third coils, out of the four third coils, which are disposed so as to be arranged at positions corresponding to two facing sides of the rectangular region, are disposed at positions where individual centers of the coils are arranged to be point-symmetrical with respect to the center of the rectangular region and where the individual centers of the coils do not come on a line connecting the centers of the two sides.
(13) The imaging device according to (11) or (12),
in which the second coil and the third coil are formed by being printed on the substrate.
(14) The imaging device according to any one of (11) to (13), further including a position detection circuit that performs detection of a position of the lens based on outputs of the four third coils,
in which the position detection circuit performs the detection at a regular cycle.
(15) The imaging device according to any one of (11) to (13), further including a position detection circuit that performs detection of a position of the lens based on outputs of the four third coils,
in which the position detection circuit performs the detection based on sensing of vibration in the imaging device.

REFERENCE SIGNS LIST 1a, 1b, 1c, 1d, 1e IMAGING DEVICE
10 LENS
11 LENS HOLDER
12 AF COIL
13 ACTUATOR
14, 14a, 14b, 14c, 14d MAGNET
20 IMAGING ELEMENT
25 GYRO SENSOR
30 SPACER
30a FIRST SPACER SUBSTRATE
30b SECOND SPACER SUBSTRATE
31, 31a, 31b, 31c, 31d OIS COIL
32, 32a, 32b, 32c, 32d POSITION DETECTION COIL
50 POSITION DETECTION/CONTROL UNIT
53 AF/OIS CONTROL UNIT
130 OIS HOLDER
300 TERMINAL DEVICE

The invention claimed is:

1. An imaging device, comprising:
a first coil configured to move a lens based on a first magnetic field, wherein
the lens collects light from a subject,
the movement of the lens is in an optical axis direction of the light, and
the first coil moves together with the lens;
a second coil configured to move the lens in a direction perpendicular to the optical axis direction based on a second magnetic field; and
a plurality of third coils configured to detect the first magnetic field, wherein
the second coil and the plurality of third coils are on a substrate,
the plurality of third coils includes four third coils,
the second coil is spaced apart from each third coil of the four third coils,
the four third coils are individually disposed at positions corresponding to four sides of a rectangular region of the substrate,
the rectangular region includes a region corresponding to the lens,
two third coils of the four third coils are at positions corresponding to two opposite sides of the rectangular region,
individual centers of the two third coils are point-symmetrical with respect to a center of the rectangular region, and
the individual centers of the two third coils are not on a line connecting centers of the two opposite sides.

2. The imaging device according to claim 1, wherein the second coil and the plurality of third coils are printed on the substrate.

3. The imaging device according to claim 1, further comprising a position detection circuit configured to detect each of a position of the lens in the optical axis direction, a position of the lens in the direction perpendicular to the optical axis direction, and a tilt angle of the lens, wherein the detection of the position of the lens is based on outputs of the four third coils.

4. The imaging device according to claim 3, wherein in a case where each of the outputs satisfies a condition, the position detection circuit is configured to execute the detection of the tilt angle based on each of the outputs of the four third coils.

5. The imaging device according to claim 3, wherein the position detection circuit is further configured to execute the detection of the position in the optical axis direction based on an integrated value of each of the outputs of the four third coils.

6. The imaging device according to claim 3, wherein the position detection circuit is further configured to execute the detection of the position in the direction perpendicular to the optical axis direction based on the outputs of the four third coils and a detection result of the detection of the tilt angle.

7. The imaging device according to claim 3, wherein the position detection circuit is further configured to execute the detection at a regular cycle.

8. The imaging device according to claim 3, further comprising a sensor configured to execute a sensing operation to sense vibration in the imaging device, wherein the position detection circuit is further configured to execute the detection based on the sensing operation of the vibration in the imaging device.

9. The imaging device according to claim 1, wherein
two third coils of the four third coils are individually disposed at positions corresponding to two intersecting sides of four sides of the rectangular region on the substrate, and
the two third coils at the positions corresponding to the two opposite sides of the rectangular region are different from the two third coils individually disposed at the positions corresponding to the two intersecting sides of the rectangular region.

10. An imaging device, comprising:
a first coil configured to move a lens based on a first magnetic field, wherein
the lens collects light from a subject,
the movement of the lens is in an optical axis direction of the light, and
the first coil moves together with the lens;
a second coil is configured to move the lens in a direction perpendicular to the optical axis direction based on a second magnetic field; and
a plurality of third coils configured to detect the first magnetic field, wherein
the second coil and the plurality of third coils are on a substrate,
the plurality of third coils includes four third coils,
the four third coils are individually disposed at positions corresponding to four sides of a rectangular region of the substrate,
the rectangular region includes a region corresponding to the lens,
two third coils of the four third coils are at positions corresponding to two opposite sides of the rectangular region,
individual centers of the two third coils are point-symmetrical with respect to a center of the rectangular region, and
the individual centers of the two third coils are not on a line connecting centers of the two opposite sides.

11. An imaging device, comprising:
a first coil configured to move a lens based on a first magnetic field, wherein
the lens collects light from a subject,
the movement of the lens is in an optical axis direction of the light, and
the first coil moves together with the lens;
a second coil is configured to move the lens in a direction perpendicular to the optical axis direction based on a second magnetic field;
a plurality of third coils configured to detect the first magnetic field, wherein
the second coil and the plurality of third coils are on a substrate, and
the plurality of third coils includes four third coils; and
a position detection circuit configured to detect each of a position of the lens in the optical axis direction, a position of the lens in the direction perpendicular to the optical axis direction, and a tilt angle of the lens, wherein
the detection of the position of the lens is based on outputs of the four third coils, and
the detection of the position in the direction perpendicular to the optical axis direction is based on the outputs of the four third coils and a detection result of the detection of the tilt angle.

* * * * *